(12) United States Patent
Suzuki et al.

(10) Patent No.: US 8,810,628 B2
(45) Date of Patent: Aug. 19, 2014

(54) IMAGE PROCESSING APPARATUS AND IMAGE PROCESSING METHOD

(75) Inventors: Teruhiko Suzuki, Kanagawa (JP); Yoshitomo Takahashi, Kanagawa (JP); Takuya Kitamura, Tokyo (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 12/891,269

(22) Filed: Sep. 27, 2010

(65) Prior Publication Data

US 2011/0090309 A1    Apr. 21, 2011

(30) Foreign Application Priority Data

Oct. 16, 2009    (JP) .................................. 2009-239708

(51) Int. Cl.
*H04N 5/76*    (2006.01)
*G01S 17/89*    (2006.01)

(52) U.S. Cl.
USPC .......................................... 348/43; 348/139

(58) Field of Classification Search
USPC .......................................................... 348/43
See application file for complete search history.

(56) References Cited

U.S. PATENT DOCUMENTS

| | | | |
|---|---|---|---|
| 7,277,121 B2 * | 10/2007 | Mashitani et al. | 348/51 |
| 7,388,598 B2 * | 6/2008 | Lee et al. | 348/42 |
| 7,580,463 B2 * | 8/2009 | Routhier et al. | 375/240.25 |
| 8,204,340 B2 * | 6/2012 | Kanazawa et al. | 382/285 |
| 8,339,441 B2 * | 12/2012 | Yamada | 348/43 |
| 8,405,890 B2 * | 3/2013 | Rosen | 359/9 |
| 8,600,151 B2 * | 12/2013 | Beato et al. | 382/154 |
| 2009/0092335 A1 | 4/2009 | Kim et al. | |
| 2009/0103619 A1 * | 4/2009 | Sohn et al. | 375/240.16 |
| 2012/0301118 A1 * | 11/2012 | Ju | 386/326 |

OTHER PUBLICATIONS

Office Action issued Feb. 26, 2014, in Chinese Patent Application No. 201210287847.3, with English-language Translation.

* cited by examiner

*Primary Examiner* — Sath V Perungavoor
*Assistant Examiner* — Howard D Brown, Jr.
(74) *Attorney, Agent, or Firm* — Oblon, Spivak, McClelland, Maier & Neustadt, L.L.P.

(57) ABSTRACT

An image processing apparatus includes a receiving unit configured to receive an encoded stream, an image capture type, and image capturing order information, the encoded stream being produced by encoding image data of multi-viewpoint images including images from multiple viewpoints that form a stereoscopic image, the image capture type indicating that the multi-viewpoint images have been captured at different timings, the image capturing order information indicating an image capturing order in which the multi-viewpoint images have been captured; a decoding unit configured to decode the encoded stream received by the receiving unit to generate image data; and a control unit configured to control a display apparatus to display multi-viewpoint images corresponding to the image data generated by the decoding unit in the same order as the image capturing order in accordance with the image capture type and image capturing order information received by the receiving unit.

21 Claims, 34 Drawing Sheets

FIG. 8

| stereo_3D_capturing(payloadSize) { | C | DESCRIPTOR |
|---|---|---|
| stereo_3d_capturing_type | 5 | u(1) |
| TS_type |  | u(2) |
| if(stereo_3d_capturing_type) { |  | u(1) |
| is_left_first |  | u(1) |
| } |  |  |
| reserved | 5 | u(6) |

FIG. 9

| pic_timing(payloadSize) { | C | DESCRIPTOR |
|---|---|---|
| if(CpbDpbDelaysPresentFlag) { | | |
| cpb_removal_delay | 5 | u(v) |
| dpb_output_delay | 5 | u(v) |
| } | | |
| if(pic_struct_present_flag) { | | |
| pic_struct | 5 | u(4) |
| for (i=0; i<NumClockTS; i++) { | | |
| clock_timestamp_flag[i] | 5 | u(1) |
| if(clock_timestamp_flag[i]) { | | |
| ct_type | 5 | u(2) |
| nuit_field_based_flag | 5 | u(1) |
| counting_type | 5 | u(5) |
| full_timestamp_flag | 5 | u(1) |
| discontinuity_flag | 5 | u(1) |
| cnt_dropped_flag | 5 | u(1) |
| n_frames | 5 | u(8) |
| if(full_timestamp_flag) { | | |
| seconds_value/*0..59*/ | 5 | u(6) |
| minutes_value/*0..59*/ | 5 | u(6) |
| hours_value/*0..23*/ | 5 | u(5) |
| }else{ | | |
| seconds_flag | 5 | u(1) |
| if(seconds_flag) { | | |
| seconds_value/*range0..59*/ | 5 | u(6) |
| minutes_flag | 5 | u(1) |
| if(minutes_flag) { | | |
| minutes_value/*0..59*/ | 5 | u(6) |
| hours_flag | 5 | u(1) |
| if(hours_flag) | | |
| hours_value/*0..23*/ | 5 | u(5) |
| } | | |
| } | | |
| } | | |
| if(time_offset_length>0) | | |
| time_offset | 5 | i(v) |
| } | | |
| } | | |
| } | | |
| } | | |

IMAGE PROCESSING APPARATUS AND IMAGE PROCESSING METHOD

BACKGROUND OF THE INVENTION

1. Field of the Invention

The present invention relates to an image processing apparatus and an image processing method. More specifically, the present invention relates to an image processing apparatus and an image processing method which allow display of a natural-looking stereoscopic image when a stereoscopic image composed of images from multiple viewpoints captured at different consecutive timings is displayed in such a manner that the images from the respective viewpoints are displayed at different consecutive timings.

2. Description of the Related Art

In recent years, apparatuses that support compression schemes such as Moving Picture Expert Group (MPEG), in which image information is handled as digital signals and is compressed using an orthogonal transform such as a discrete cosine transform and motion compensation, by utilizing redundancy specific to image information for the purpose of realizing high-efficiency transmission and accumulation of information have been increasingly prevalent for use in both distribution of information from broadcast stations and receipt of information at general consumer homes.

Specifically, for example, encoding apparatuses and decoding apparatuses that are used when image information (bit streams) compressed using an encoding scheme that utilizes an orthogonal transform such as a discrete cosine transform or a Karhunen-Loève transform and motion compensation, such as MPEG or H.26x, is received via a network medium such as satellite broadcasting, cable television (TV), or the Internet or is processed on a storage medium such as an optical disk, a magnetic disk, or a flash memory have been increasingly prevalent.

For example, MPEG-2 (International Organization for Standardization (ISO)/International Electrotechnical Commission (IEC) 13818-2) is defined as a general-purpose image encoding method, and is a standard that covers both interlaced scanned images (interlaced images) and progressive scanned images (progressive images) as well as standard-definition images and high-definition images, which is now widely used for a wide variety of applications including professional applications and consumer applications. The MPEG-2 compression scheme facilitates the high compression ratio and high quality implementation of images by, for example, assigning a code rate (bit rate) of 4 to 8 Mbps to a standard-definition interlaced scanned image having 720×480 pixels in the lateral and longitudinal directions or a code rate of 18 to 22 Mbps to a high-definition interlaced scanned image having 1920×1088 pixels in the lateral and longitudinal directions.

MPEG-2 mainly provides high-quality encoding suitable for broadcasting, but does not support encoding systems of a lower code rate (bit rate), that is, a higher compression ratio, than that of MPEG-1. With the increase in popularity of mobile terminals, the demand for such encoding systems will increase in the future. To meet the demand, the MPEG-4 encoding was standardized. As to image encoding, the ISO/IEC 14496-2 standard was approved as an international standard in December 1998.

In addition, Advanced Video Coding (AVC) (MPEG-4 part 10, ISO/IEC 14496-10, International Telecommunication Union-Telecommunication Standardization Sector (ITU-T) H.264) is also standardized. The AVC standard is developed by Joint Video Team (JVT) jointly established by ITU-T and ISO/IEC to promote standardization of image encoding.

AVC is, like MPEG-2 or MPEG-4, a hybrid coding scheme including motion compensation coding and discrete cosine transform coding. In general, AVC involves a larger amount of computation for encoding and decoding than existing encoding schemes such as MPEG-2 and MPEG-4, but makes a higher encoding efficiency feasible.

Meanwhile, with the recent advancement of stereoscopic image capture and display technologies capable of stereovision, content of images to be encoded using the encoding schemes described above may include content of stereoscopic images as well as content of two-dimensional images.

Specifically, an extension of AVC to encoding of stereoscopic images is developed, and standardization of Multiview Video Coding (MVC) that enables encoding of multi-viewpoint images captured using a plurality of image capture apparatuses, which form a stereoscopic image, is developed. A method for encoding and decoding multi-viewpoint images is disclosed in, for example, Japanese Unexamined Patent Application Publication No. 2008-182669.

In the following, multi-viewpoint images that form a stereoscopic image will be described in the context of a three-dimensional (3D) image (stereo image), which is composed of two-view images having the minimum number of viewpoints, by way of example.

A left-eye image (hereinafter referred to as an "L image") that is an image observed with the left eye and a right-eye image (hereinafter referred to as an "R image") that is an image observed with the right eye, which form a 3D image, may be images captured at the same capture timing or images captured at different consecutive capture timings.

Further, a stereoscopic image is displayed using a dedicated image display apparatus. The display method of the image display apparatus may be a method for displaying an L image and an R image, which form a 3D image, at different consecutive timings, or a method for simultaneously displaying the L image and the R image.

SUMMARY OF THE INVENTION

In an existing image display apparatus configured to display an L image and an R image at different consecutive timings, the L image and the R image are displayed in a predetermined order regardless of what capture timings the L image and the R image have been photographed at.

Therefore, an L image and an R image captured at different consecutive capture timings may be displayed in an order different from the actual image capturing order. This may cause a user to feel a resulting image unnatural.

It is therefore desirable to display a natural-looking stereoscopic image when a stereoscopic image composed of images from multiple viewpoints captured at different consecutive timings is displayed in such a manner that the images from the respective viewpoints are displayed at different consecutive timings.

A first embodiment of the present invention provides an image processing apparatus including receiving means for receiving an encoded stream, an image capture type, and image capturing order information, the encoded stream being produced by encoding image data of multi-viewpoint images including images from multiple viewpoints that form a stereoscopic image, the image capture type indicating that the multi-viewpoint images have been captured at different timings, the image capturing order information indicating an image capturing order in which the multi-viewpoint images have been captured; decoding means for decoding the encoded stream received by the receiving means to generate image data; and control means for controlling a display apparatus to display multi-viewpoint images corresponding to the image data generated by the decoding means in the same order as the image capturing order in accordance with the image capture type and image capturing order information received by the receiving means.

The first embodiment of the present invention further provides an image processing method corresponding to the image processing apparatus according to the first embodiment of the present invention.

According to the first embodiment of the present invention, an encoded stream produced by encoding image data of multi-viewpoint images including images from multiple viewpoints that form a stereoscopic image, an image capture type indicating that the multi-viewpoint images have been captured at different timings, and image capturing order information indicating an image capturing order in which the multi-viewpoint images have been captured are received; the encoded stream is decoded to generate image data; and multi-viewpoint images corresponding to the generated image data are displayed on a display apparatus in the same order as the image capturing order in accordance with the received image capture type and image capturing order information.

A second embodiment of the present invention provides an image processing apparatus including encoding means for encoding image data of multi-viewpoint images including images from multiple viewpoints that form a stereoscopic image to generate an encoded stream; and transmitting means for transmitting the encoded stream generated by the encoding means in such a manner that an image capture type and image capturing order information are concatenated with the encoded stream, the image capture type indicating that the multi-viewpoint images that form the stereoscopic image have been captured at different timings, the image capturing order information indicating an image capturing order in which the multi-viewpoint images have been captured.

The second embodiment of the present invention further provides an image processing method corresponding to the image processing apparatus according to the second embodiment of the present invention.

According to the second embodiment of the present invention, image data of multi-viewpoint images including images from multiple viewpoints that form a stereoscopic image is encoded to generate an encoded stream; and the encoded stream is transmitted in such a manner that an image capture type indicating that the multi-viewpoint images that form the stereoscopic image have been captured at different timings and image capturing order information indicating an image capturing order in which the multi-viewpoint images have been captured are concatenated with the encoded stream.

A third embodiment of the present invention provides an image processing apparatus including receiving means for receiving image data of multi-viewpoint images including images from multiple viewpoints that form a stereoscopic image, an image capture type indicating that the multi-viewpoint images have been captured at different timings, and image capturing order information indicating that an image capturing order in which the multi-viewpoint images have been captured; and control means for controlling a display apparatus to display multi-viewpoint images corresponding to the image data received by the receiving means in the same order as the image capturing order in accordance with the image capture type and image capturing order information received by the receiving means.

The third embodiment of the present invention further provides an image processing method corresponding to the image processing apparatus according to the third embodiment of the present invention.

According to the third embodiment of the present invention, image data of multi-viewpoint images including images from multiple viewpoints that form a stereoscopic image, an image capture type indicating that the multi-viewpoint images have been captured at different timings, and image capturing order information indicating that an image capturing order in which the multi-viewpoint images have been captured are received; and multi-viewpoint images corresponding to the received image data are displayed on a display apparatus in the same order as the image capturing order in accordance with the received image capture type and image capturing order information.

The image processing apparatuses according to the first and second embodiments, or the image processing apparatuses according to the second and third embodiments may be independent apparatuses or may be internal blocks that form a single apparatus.

Further, the image processing apparatuses according to the first to third embodiments may be implemented by causing a computer to execute a program.

According to the first and third embodiments of the present invention, when a stereoscopic image composed of images from multiple viewpoints captured at different consecutive timings is displayed in such a manner that the images from the respective viewpoints are displayed at different consecutive timings, a natural-looking stereoscopic image can be displayed.

According to the second embodiment of the present invention, if multi-viewpoint images that form a stereoscopic image are images captured at different consecutive timings, an apparatus that handles image data of the multi-viewpoint images can be notified of the image capture type and image capturing order of the multi-viewpoint images. Therefore, for example, an image processing apparatus configured to display a stereoscopic image composed of images from multiple viewpoints in such a manner that the images from the respective viewpoints are displayed at different consecutive timings can display a natural-looking stereoscopic image.

BRIEF DESCRIPTION OF THE DRAWINGS

FIG. 8 is a diagram illustrating an example of the syntax of VS_TYPE;

FIG. 9 is a diagram illustrating an example of the syntax of display time information;

DESCRIPTION OF THE PREFERRED EMBODIMENTS

First Embodiment

Example Configuration of Encoding System According to First Embodiment

Figure 1:
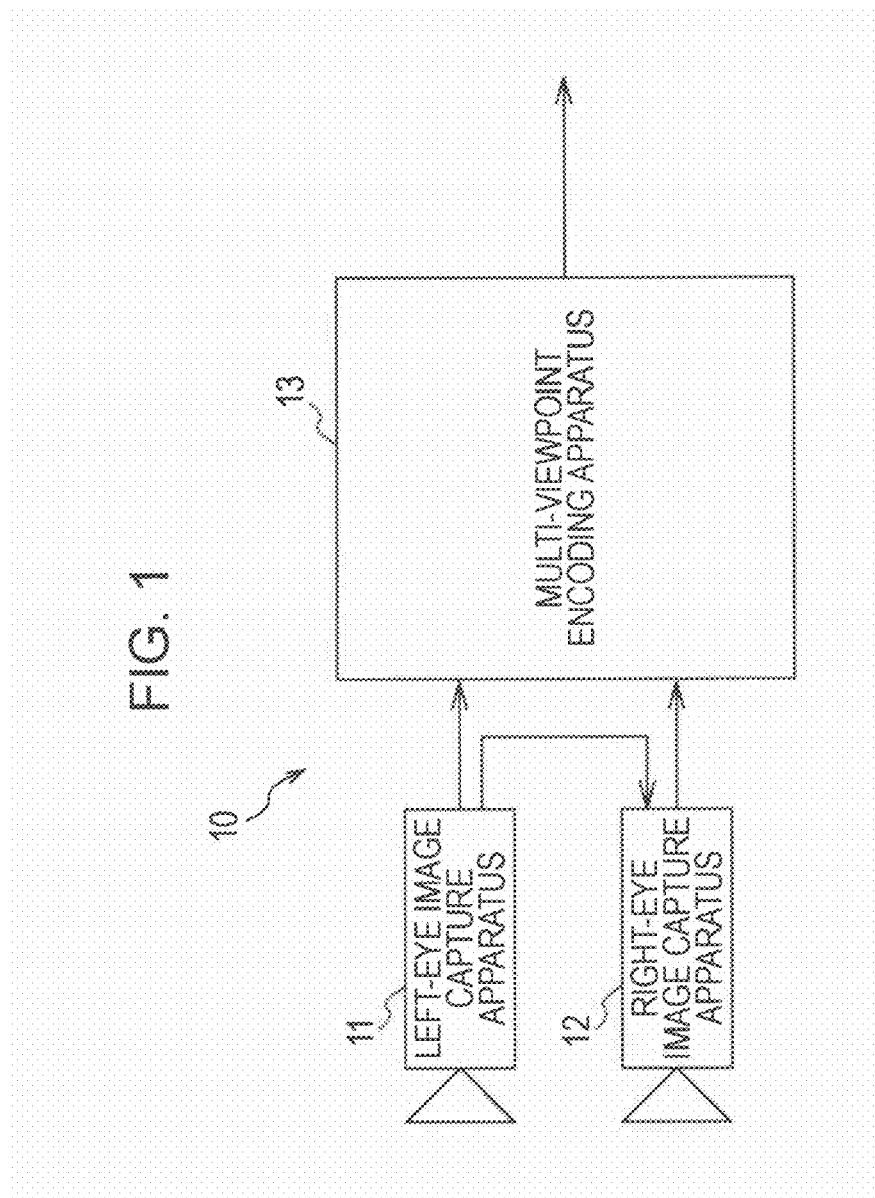
FIG. 1 is a block diagram illustrating an example configuration of an encoding system according to a first embodiment of the present invention.

FIG. 1 is a block diagram illustrating an example configuration of an encoding system 10 according to a first embodiment of the present invention.

The encoding system 10 illustrated in FIG. 1 includes a left-eye image capture apparatus 11, a right-eye image capture apparatus 12, and a multi-viewpoint encoding apparatus 13.

The left-eye image capture apparatus 11 is an image capture apparatus configured to capture an L image, and the right-eye image capture apparatus 12 is an image capture apparatus configured to capture an R image. A synchronization signal is input from the left-eye image capture apparatus 11 to the right-eye image capture apparatus 12, and the left-eye image capture apparatus 11 and the right-eye image capture apparatus 12 are synchronized with each other. The left-eye image capture apparatus 11 and the right-eye image capture apparatus 12 capture images at a predetermined capture timing.

The multi-viewpoint encoding apparatus 13 receives an image signal of the L image captured by the left-eye image capture apparatus 11, and an image signal of the R image captured by the right-eye image capture apparatus 12. The multi-viewpoint encoding apparatus 13 encodes the image signals of the L image and the R image in accordance with an MVC encoding scheme. The multi-viewpoint encoding apparatus 13 multiplexes encoded data (encoded stream) obtained as a result of encoding the image signal of the L image and encoded data obtained as a result of encoding the image signal of the R image, and outputs a single bit stream.

Image Capture Method of Encoding System

Figure 2:
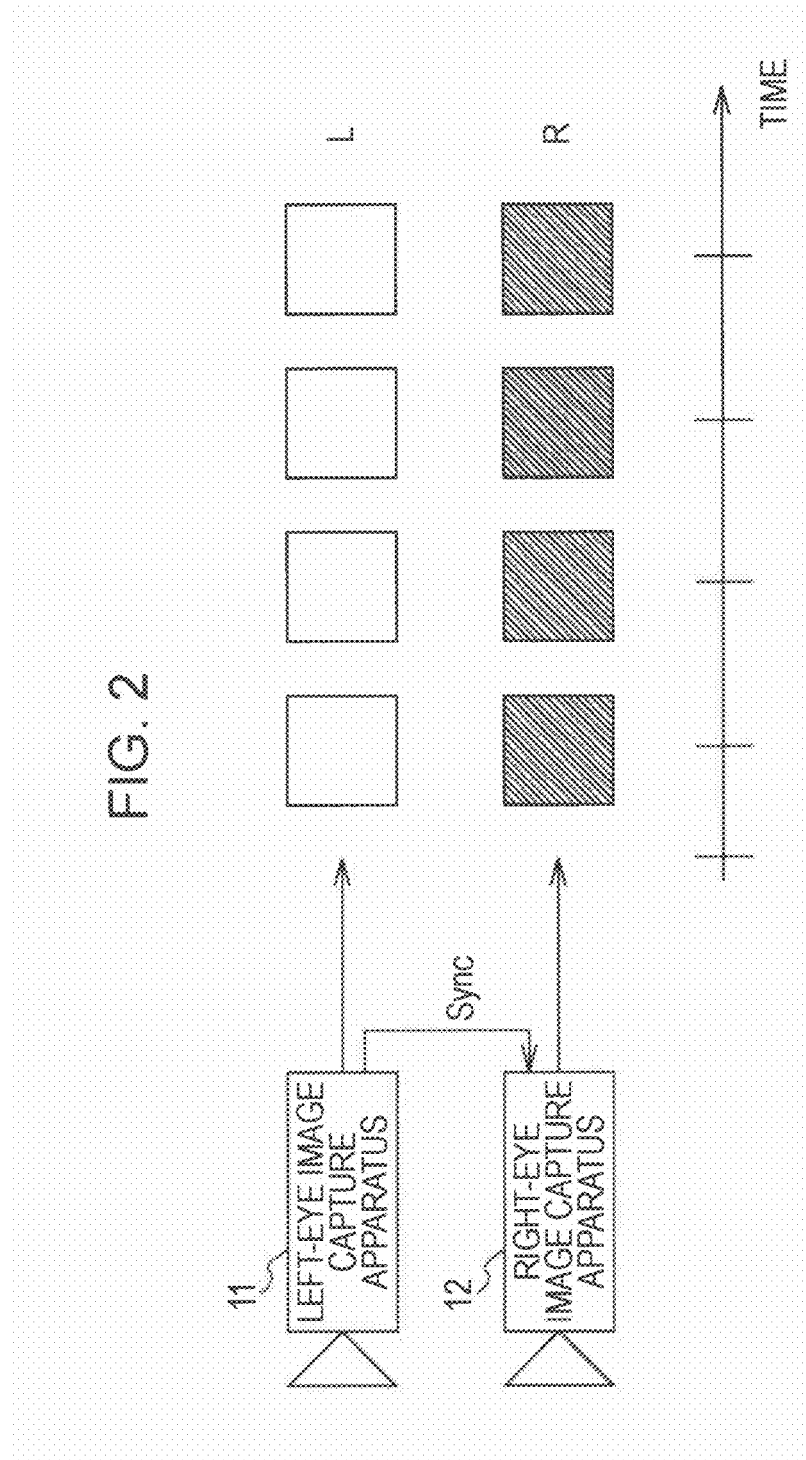
FIG. 2 is a diagram depicting an image capture type in the encoding system.
Figure 3:
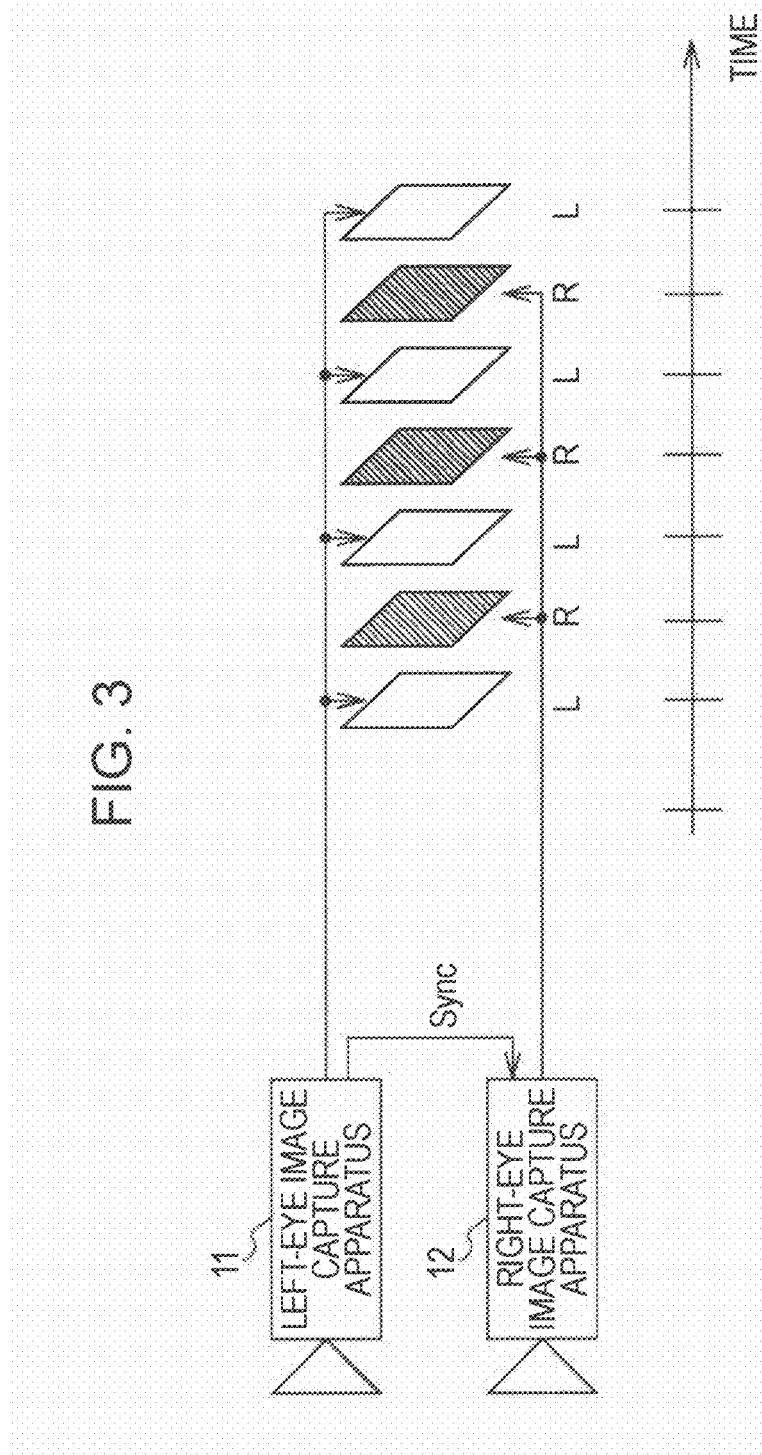
FIG. 3 is a diagram depicting an image capture type in the encoding system.

FIGS. 2 and 3 are diagrams depicting an image capture type in the encoding system 10.

In the encoding system 10, a first image capture type may be a type in which the capture timings of an L image and an R image (hereinafter referred to as an "L-R pair") that form a 3D image are the same. In the first image capture type, as illustrated in FIG. 2, the left-eye image capture apparatus 11 and the right-eye image capture apparatus 12 capture images at the same capture timing, and image signals of an L image and an R image are obtained at the same timing.

A second image capture type is a type in which the capture timings of an L-R pair are different consecutive timings. In the second image capture type, for example, as illustrated in FIG. 3, the left-eye image capture apparatus 11 and the right-eye image capture apparatus 12 alternately capture images, and image signals of L images and R images are alternately obtained.

Example Configuration of Multi-Viewpoint Encoding Apparatus

Figure 4:
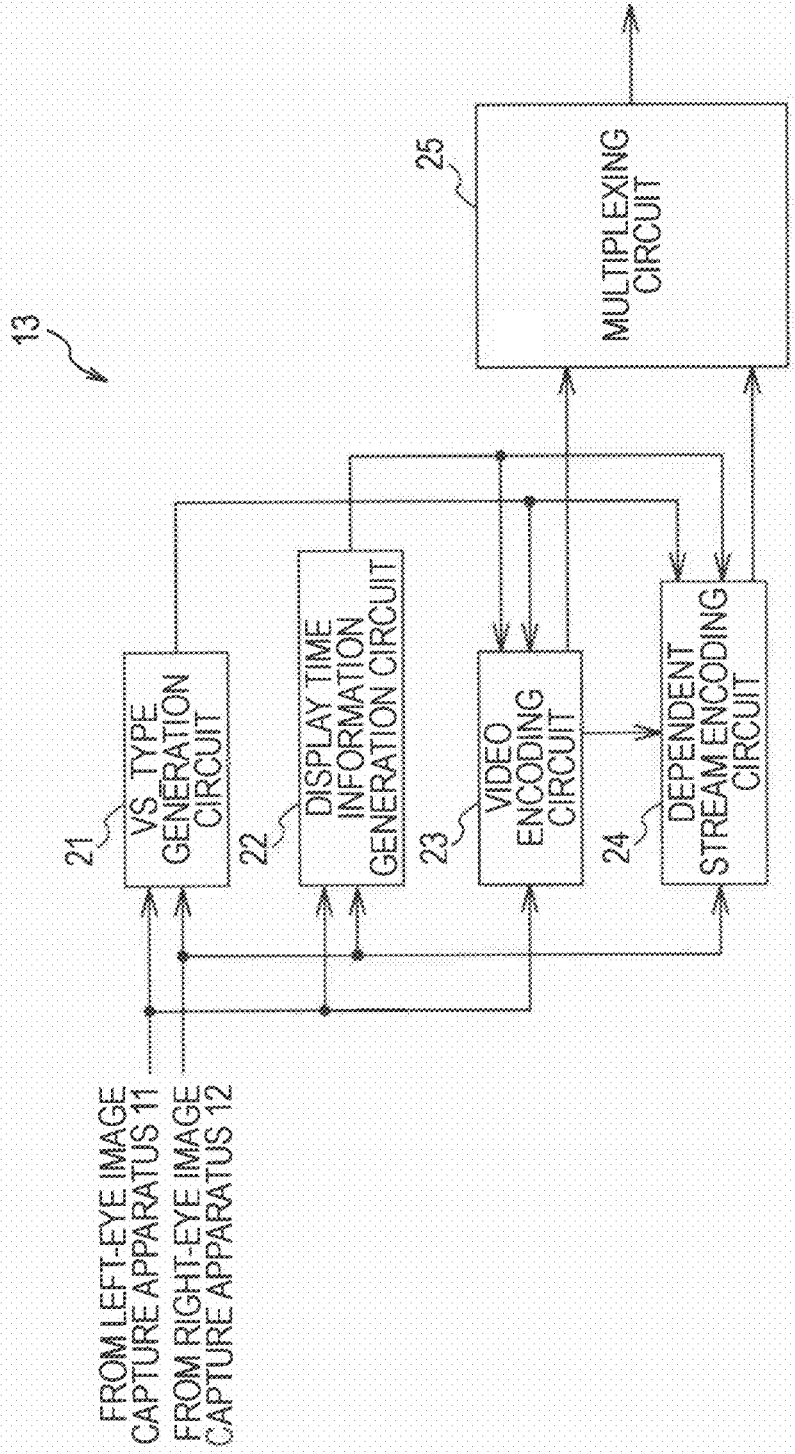
FIG. 4 is a block diagram illustrating an example configuration of a multi-viewpoint encoding apparatus illustrated in FIG. 1.

FIG. 4 is a block diagram illustrating an example configuration of the multi-viewpoint encoding apparatus 13 illustrated in FIG. 1.

The multi-viewpoint encoding apparatus 13 illustrated in FIG. 4 includes a VS_TYPE generation circuit 21, a display time information generation circuit 22, a video encoding circuit 23, a dependent stream encoding circuit 24, and a multiplexing circuit 25.

An image signal of an L image input from the left-eye image capture apparatus 11 to the multi-viewpoint encoding apparatus 13 is supplied to the VS_TYPE generation circuit 21, the display time information generation circuit 22, and the video encoding circuit 23. An image signal of an R image input from the right-eye image capture apparatus 12 to the multi-viewpoint encoding apparatus 13 is supplied to the VS_TYPE generation circuit 21, the display time information generation circuit 22, and the dependent stream encoding circuit 24.

The VS_TYPE generation circuit 21 recognizes an image capture type in accordance with the input timing of image signals of the L-R pair. When the image capture type is the second image capture type, the VS_TYPE generation circuit 21 generates image capturing order information indicating the image capturing order of the L-R pair in accordance with the input timings of the image signals of the L-R pair.

When the image capture type is the first image capture type, the VS_TYPE generation circuit 21 sets the first image capture type as VS_TYPE. When the image capture type is the second image capture type, the VS_TYPE generation circuit 21 sets the second image capture type and the image capturing order information as VS_TYPE. The VS_TYPE generation circuit 21 supplies the VS_TYPE to the video encoding circuit 23 and the dependent stream encoding circuit 24.

The display time information generation circuit 22 determines the display time of the L-R pair on the basis of the input timings of the image signals of the L-R pair. The display time information generation circuit 22 supplies display time information indicating the display time of the L image in the L-R pair to the video encoding circuit 23, and supplies display time information indicating the display time of the R image to the dependent stream encoding circuit 24.

The video encoding circuit 23 encodes the image signal of the L image input from the left-eye image capture apparatus 11 in accordance with the MVC encoding scheme as an image signal of a base stream that does not refer to image signals of other streams. Then, the video encoding circuit 23 adds the VS_TYPE from the VS_TYPE generation circuit 21 and the display time information from the display time information generation circuit 22 to encoded data of the L image obtained as a result of encoding, and supplies the resulting data to the multiplexing circuit 25. Further, the video encoding circuit 23 supplies a decoded image, which is used for encoding, to the dependent stream encoding circuit 24.

The dependent stream encoding circuit 24 encodes the image signal of the R image input from the right-eye image capture apparatus 12 in accordance with the MVC encoding scheme as an image signal of a dependent stream using the decoded image from the video encoding circuit 23. Then, the dependent stream encoding circuit 24 adds the VS_TYPE from the VS_TYPE generation circuit 21 and the display time information from the display time information generation circuit 22 to encoded data of the R image obtained as a result of encoding, and supplies the resulting data to the multiplexing circuit 25.

The multiplexing circuit 25 multiplexes the encoded data of the L image supplied from the video encoding circuit 23 and the encoded data of the R image supplied from the dependent stream encoding circuit 24, and outputs a single bit stream.

Description of MVC Encoding Scheme

Figure 5:
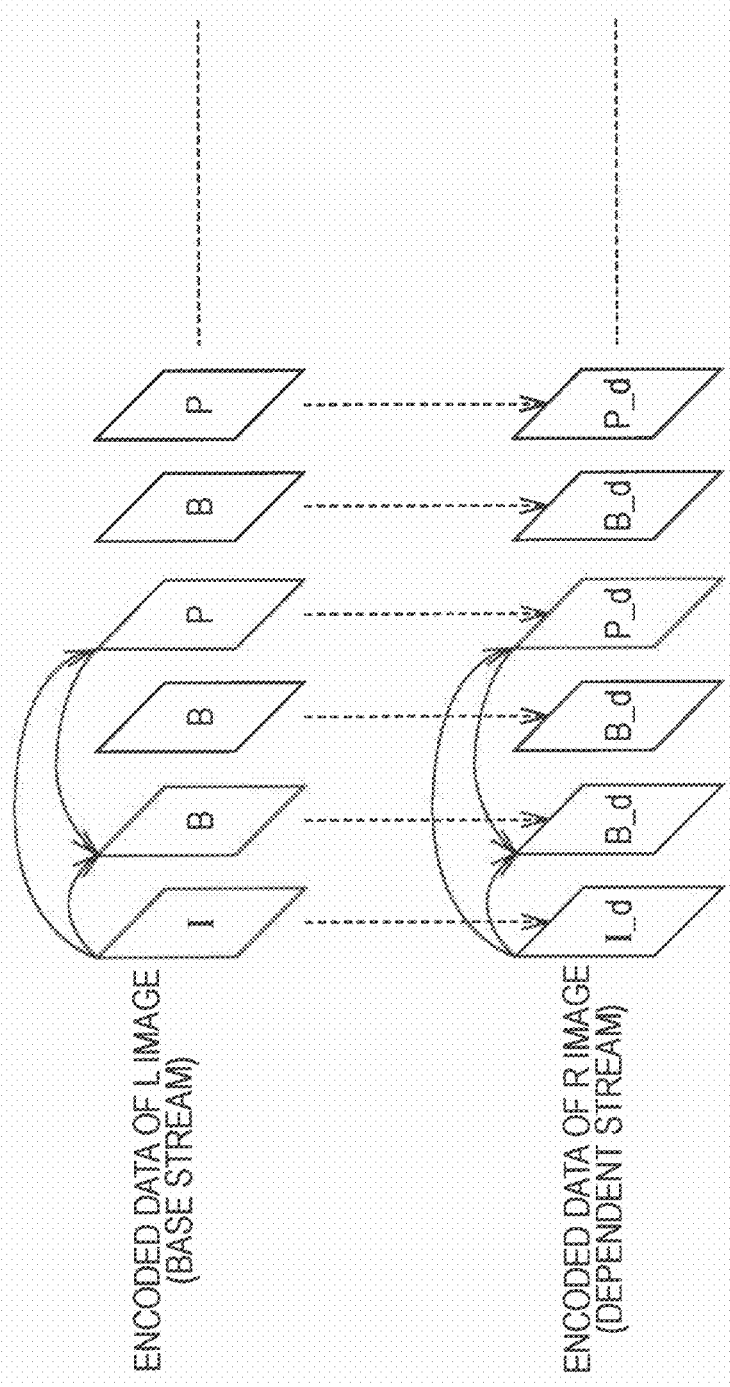
FIG. 5 is a diagram depicting the MVC encoding scheme.

FIG. 5 is a diagram depicting the MVC encoding scheme. As illustrated in FIG. 5, the video encoding circuit 23 performs encoding in a manner similar to that for a normal AVC encoding scheme (for example, AVC high profile), and obtains encoded data of the L image as a base stream. Therefore, the encoded data of the L image can be decoded using an existing decoding apparatus of the AVC encoding scheme.

In the encoding of the R image using the dependent stream encoding circuit 24, on the other hand, as illustrated in FIG. 5, in addition to prediction in the time direction at the same viewpoint, which is similar to that in a normal AVC encoding scheme, prediction from another viewpoint at the same time is performed. That is, in addition to prediction in the time direction within an R image, prediction from an L image in the same 3D image is also performed. Thus, even if prediction in the time direction is not satisfactory, the encoding efficiency can be improved.

Example Configuration of Video Encoding Circuit

Figure 6:
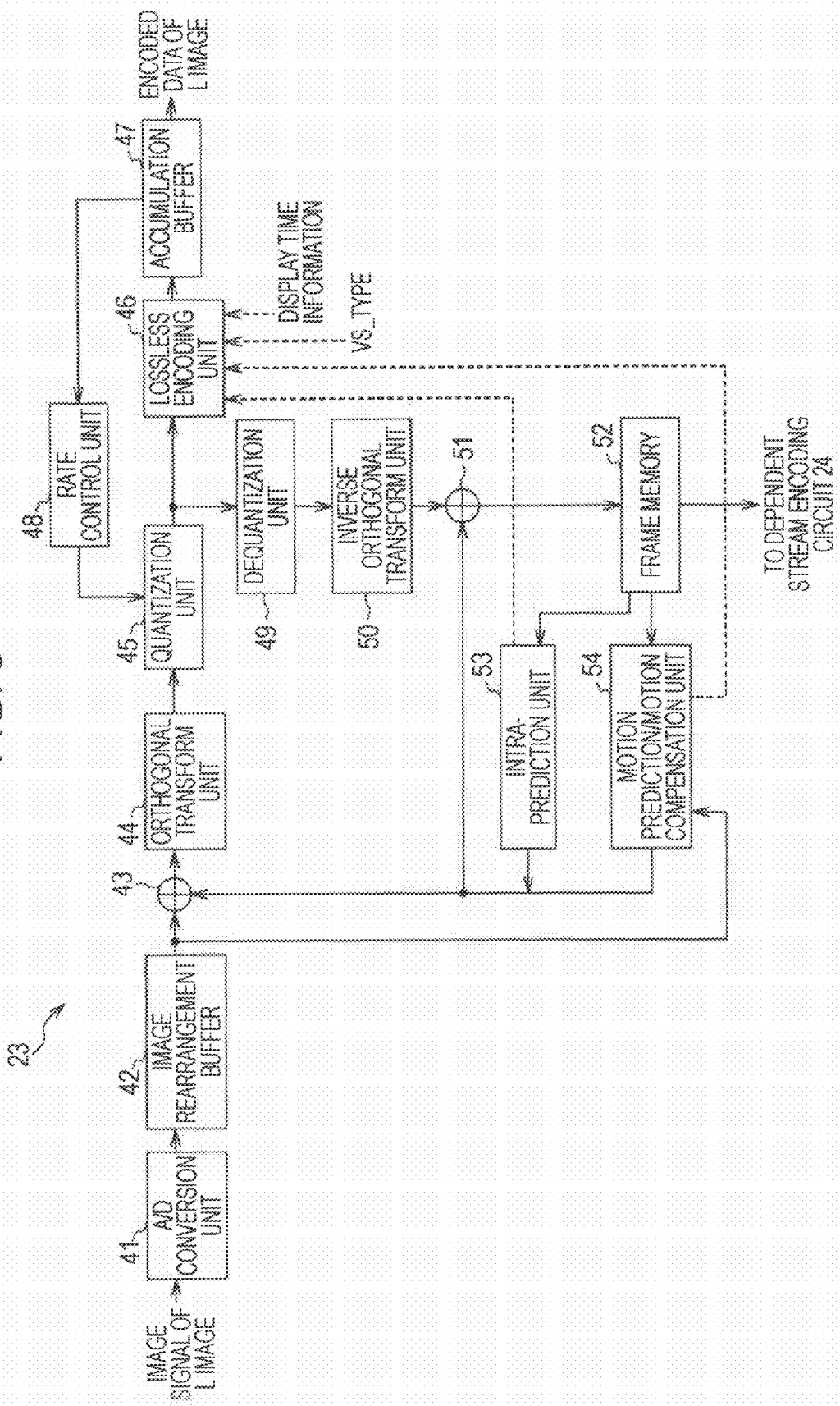
FIG. 6 is a block diagram illustrating an example configuration of a video encoding circuit illustrated in FIG. 4.

FIG. 6 is a block diagram illustrating an example configuration of the video encoding circuit 23 illustrated in FIG. 4.

The video encoding circuit 23 performs encoding in accordance with, for example, the AVC high profile.

More specifically, an analog-to-digital (A/D) conversion unit 41 performs A/D conversion on the image signal which is an analog signal of the L image supplied from the left-eye image capture apparatus 11, and obtains image data which is a digital signal. Then, the A/D conversion unit 41 supplies the image data to an image rearrangement buffer 42.

The image rearrangement buffer 42 temporarily stores the image data supplied from the A/D conversion unit 41, and reads the image data, as desired, to perform rearrangement in which pictures (frames) (fields) of the image data are rearranged in the encoding order in accordance with the Group of Pictures (GOP) structure of the encoded data output from the video encoding circuit 23.

An intra picture to be subjected to intra-coding among the pictures read from the image rearrangement buffer 42 is supplied to a calculation unit 43.

The calculation unit 43 subtracts the pixel value of a prediction image supplied from an intra-prediction unit 53 from the pixel value of the intra picture supplied from the image rearrangement buffer 42, as desired, and supplies the resulting value to an orthogonal transform unit 44.

The orthogonal transform unit 44 applies an orthogonal transform such as a discrete cosine transform or a Karhunen-Loève transform to (the pixel value of) the intra picture (or to the subtraction value obtained by subtracting the pixel value of the prediction image from the pixel value of the intra picture), and supplies a resulting transform coefficient to a quantization unit 45. The discrete cosine transform performed by the orthogonal transform unit 44 may be an integer transform approximating a real discrete cosine transform. Further, the transform method of the discrete cosine transform may be implemented using a method for performing an integer-coefficient transform with a 4×4 block size.

The quantization unit 45 quantizes the transform coefficient supplied from the orthogonal transform unit 44, and supplies a resulting quantized value to a lossless encoding unit 46.

The lossless encoding unit 46 performs lossless coding such as variable length coding or arithmetic coding on the quantized value supplied from the quantization unit 45, and supplies resulting encoded data of the L image to an accumulation buffer 47.

The accumulation buffer 47 temporarily stores the encoded data of the L image supplied from the lossless encoding unit 46, and outputs the encoded data of the L image at a predetermined rate.

A rate control unit 48 monitors the amount of encoded data accumulated in the accumulation buffer 47, and controls the behavior of the quantization unit 45, such as the quantization step of the quantization unit 45, in accordance with the amount of accumulated data.

The quantized value obtained by the quantization unit 45 is supplied to the lossless encoding unit 46, and is also supplied to a dequantization unit 49. The dequantization unit 49 dequantizes the quantized value supplied from the quantization unit 45 into a transform coefficient, and supplies the transform coefficient to an inverse orthogonal transform unit 50.

The inverse orthogonal transform unit 50 performs an inverse orthogonal transform on the transform coefficient supplied from the dequantization unit 49, and supplies a result to a calculation unit 51.

The calculation unit 51 adds the pixel value of the prediction image supplied from the intra-prediction unit 53, as desired, to the data supplied from the inverse orthogonal transform unit 50 to obtain a decoded image of the intra picture, and supplies the decoded image to a frame memory 52.

The frame memory 52 temporarily stores the decoded image supplied from the calculation unit 51, and supplies the decoded image to the intra-prediction unit 53 or a motion prediction/motion compensation unit 54, as desired, as a reference image that is used to generate a prediction image. Further, the frame memory 52 also supplies the stored decoded image to the dependent stream encoding circuit 24.

The intra-prediction unit 53 generates a prediction image from a pixel that has already been stored in the frame memory 52 among pixels near a portion (block) to be processed by the calculation unit 43 within the intra picture, and supplies the prediction image to the calculation units 43 and 51.

For a picture to be subjected to intra-coding, as described above, when a prediction image is supplied from the intra-prediction unit 53 to the calculation unit 43, the calculation unit 43 subtracts the prediction image supplied from the intra-prediction unit 53 from the picture supplied from the image rearrangement buffer 42.

Further, the calculation unit 51 adds the prediction image subtracted by the calculation unit 43 to the data supplied from the inverse orthogonal transform unit 50.

In contrast, a non-intra picture to be subjected to inter-coding is supplied from the image rearrangement buffer 42 to the calculation unit 43 and the motion prediction/motion compensation unit 54.

The motion prediction/motion compensation unit 54 reads from the frame memory 52, as a reference image, a picture of the decoded image that is referred to for motion prediction of the non-intra picture supplied from the image rearrangement buffer 42. Further, the motion prediction/motion compensation unit 54 detects a motion vector for the non-intra picture supplied from the image rearrangement buffer 42 using the reference image supplied from the frame memory 52.

Then, the motion prediction/motion compensation unit 54 generates a prediction image of the non-intra picture by applying motion compensation to the reference image in accordance with the motion vector, and supplies the prediction image to the calculation units 43 and 51. The block size during motion compensation may be fixed or variable.

The calculation unit 43 subtracts the prediction image supplied from the intra-prediction unit 53 from the non-intra picture supplied from the image rearrangement buffer 42, and subsequently performs encoding in a manner similar to that for an intra picture.

An intra-prediction mode, which is a mode in which the intra-prediction unit 53 generates a prediction image, is supplied from the intra-prediction unit 53 to the lossless encoding unit 46. Further, the motion vector obtained by the motion prediction/motion compensation unit 54 and a motion compensation prediction mode, which is a mode in which the motion prediction/motion compensation unit 54 performs motion compensation, are supplied from the motion prediction/motion compensation unit 54 to the lossless encoding unit 46.

Further, the VS_TYPE supplied from the VS_TYPE generation circuit 21, and the display time information supplied from the display time information generation circuit 22 are also supplied to the lossless encoding unit 46.

The lossless encoding unit 46 losslessly encodes the intra-prediction mode, the motion vector, the motion compensation prediction mode, and other information necessary for decoding, such as the picture type of each picture, which are included in the header of the encoded data of the L image.

Further, the lossless encoding unit 46 adds the VS_TYPE and the display time information to the encoded data of the L image.

Example Configuration of Dependent Stream Encoding Circuit

Figure 7:
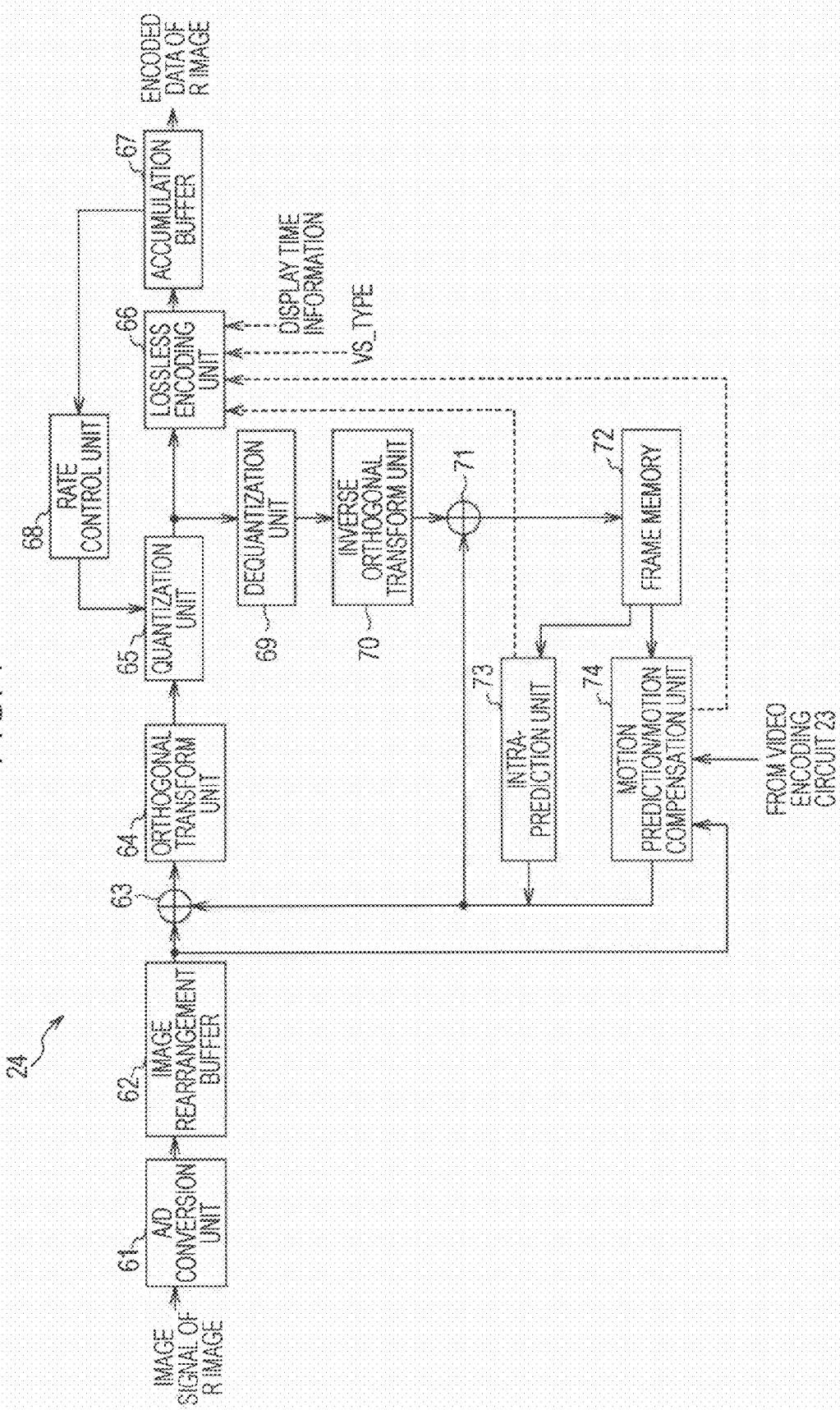
FIG. 7 is a block diagram illustrating an example configuration of a dependent stream encoding circuit illustrated in FIG. 4.

FIG. 7 is a block diagram illustrating an example configuration of the dependent stream encoding circuit 24 illustrated in FIG. 4.

The dependent stream encoding circuit 24 illustrated in FIG. 7 includes an A/D conversion unit 61, an image rearrangement buffer 62, a calculation unit 63, an orthogonal transform unit 64, a quantization unit 65, a lossless encoding unit 66, an accumulation buffer 67, a rate control unit 68, a dequantization unit 69, an inverse orthogonal transform unit 70, a calculation unit 71, a frame memory 72, an intra-prediction unit 73, and a motion prediction/motion compensation unit 74.

The processes of the respective units in the dependent stream encoding circuit 24 illustrated in FIG. 7 are similar to those in the video encoding circuit 23, except for the processes of the frame memory 72 and the motion prediction/motion compensation unit 74. Thus, only the different processes will be described.

The frame memory 72 of the dependent stream encoding circuit 24 temporarily stores a decoded image supplied from the calculation unit 71, and supplies the decoded image to the intra-prediction unit 73 or the motion prediction/motion compensation unit 74, as desired, as a reference image that is used to generate a prediction image.

The motion prediction/motion compensation unit 74 reads from the frame memory 72, as a reference image, a picture of the decoded image that is referred to for motion prediction of a non-intra picture supplied from the image rearrangement buffer 62. The motion prediction/motion compensation unit 74 also reads, from the frame memory 52 of the video encoding circuit 23, as a reference image, a picture of the decoded image that is referred to for motion prediction of the non-intra picture. Then, the motion prediction/motion compensation unit 74 detects a motion vector for the non-intra picture supplied from the image rearrangement buffer 62 using the reference images supplied from the frame memories 72 and 52.

Then, the motion prediction/motion compensation unit 74 generates a prediction image of the non-intra picture by applying motion compensation to the reference images in accordance with the motion vector, and supplies the prediction image to the calculation units 63 and 71. Further, the motion prediction/motion compensation unit 74 supplies the motion vector and the motion compensation prediction mode to the lossless encoding unit 66.

Example of Syntax of VS_TYPE

FIG. 8 is a diagram illustrating an example of the syntax of the VS_TYPE.

As illustrated in FIG. 8, the VS_TYPE includes a 1-bit image capture type (stereo_3d_capturing_type) and a 2-bit transport stream (TS) type (TS type). For example, the image capture type has a value 0 when the image capture type is the first image capture type, or a value 1 when the image capture type is the second image capture type. That is, the image capture type serves as a flag indicating whether or not the capture timings of an L-R pair are different.

Further, the TS type is an addition type of display time information. Here, four TS types are provided: a "non-TS type" in which no display time information is added to encoded data of any of the L-R pair, a "same-time type" in which the same display time information is added to encoded data of both of the L-R pair, an "either type" in which the same display time information is added to encoded data of only the L image in the L-R pair, and, a "different-time type" in which different display time information is added to encoded data of the L-R pair.

The "same-time type" and the "different-time type" are set in accordance with the function of the display time information generation circuit 22. Specifically, when the display time information generation circuit 22 has a function for setting the display times of the L-R pair to the same value, the TS type is set to the "same-time type". When the display time information generation circuit 22 has a function for setting the display times of the L-R pair to different values, the TS type is set to the "different-time type". Further, the "non-TS type" and the "either type" are set by, for example, a user.

As illustrated in FIG. 8, when the image capture type is the second type, the VS_TYPE also includes 1-bit image capturing order information (is_left_first). For example, the image capturing order information has a value 1 when the image capturing order information indicates the order of the L image and the R image, or a value 0 when the image capturing order information indicates the order of the R image and the L image. That is, the image capturing order information serves as a flag indicating whether or not the L image in the L-R pair is earlier in the image capturing order.

Example of Syntax of Display Time Information

FIG. 9 is a diagram illustrating an example of the syntax of the display time information.

In FIG. 9, elements in the rows after the sixth row from the top represent the display time information.

Description of Process of Multi-Viewpoint Encoding Apparatus

Figure 10:
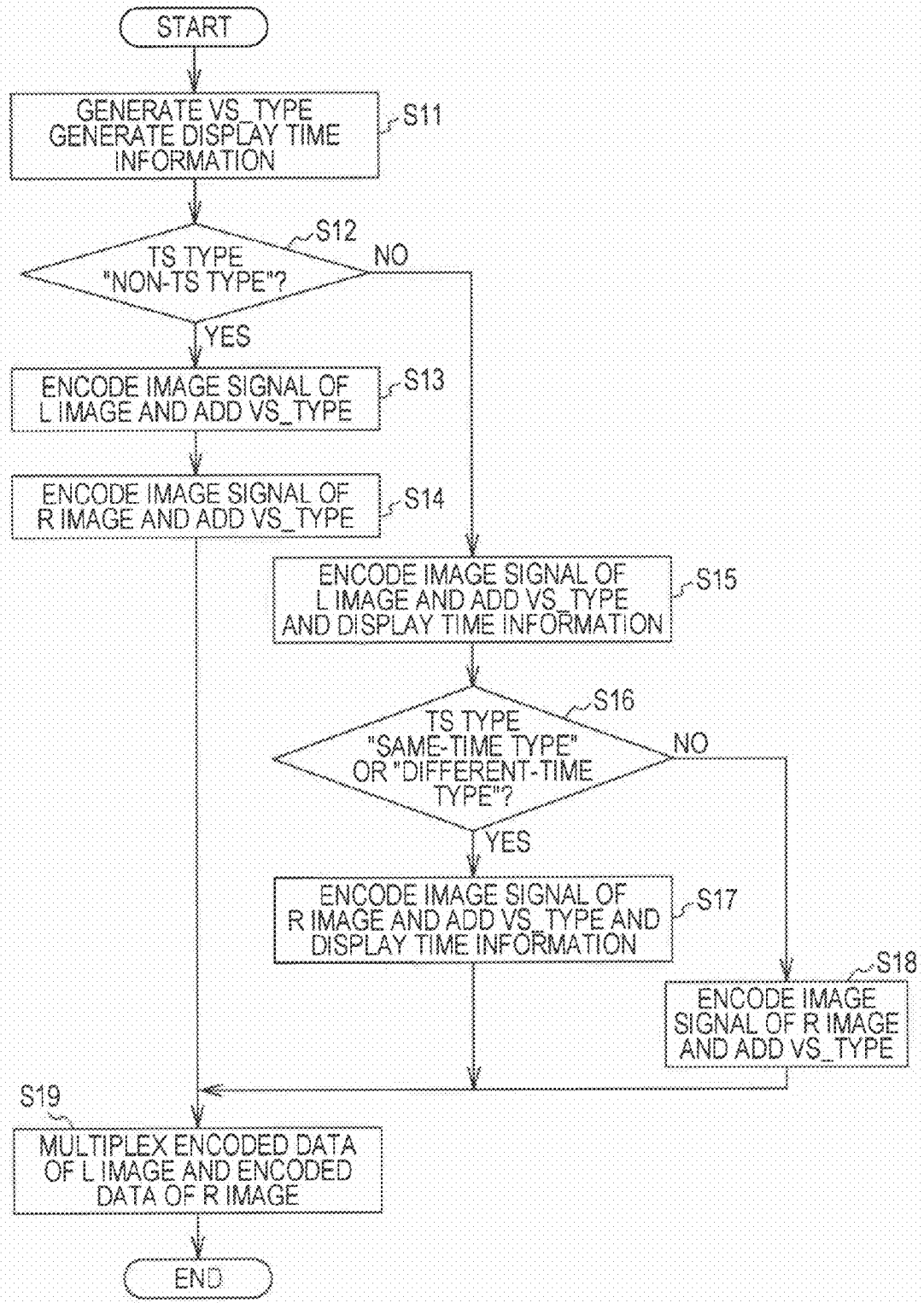
FIG. 10 is a flowchart depicting an encoding process performed by the multi-viewpoint encoding apparatus.

FIG. 10 is a flowchart depicting an encoding process performed by the multi-viewpoint encoding apparatus 13.

Referring to FIG. 10, in step S11, the VS_TYPE generation circuit 21 generates the VS_TYPE based on the input timings of the image signals of the L-R pair. The details of the VS_TYPE generation process for generating VS_TYPE will be described below with reference to FIG. 11.

Further, in step S11, the display time information generation circuit 22 generates display time information about the L-R pair indicating that the display times are the same or different in accordance with the input timings of the image signals of the L-R pair.

Specifically, the display time information generation circuit 22 determines, based on the input timings of the image signals of the L-R pair, one display time as the display time of the L-R pair, or two different display times as the display time of the L image and the display time of the R image of the L-R pair so that the image capturing order of the L-R pair is the same as the display order of the L-R pair. Then, the display time information generation circuit 22 generates display time information indicating the determined display time of the L image in the L-R pair and display time information indicating the determined display time of the R image.

In step S12, the lossless encoding unit 46 of the video encoding circuit 23 and the lossless encoding unit 66 of the dependent stream encoding circuit 24 determine whether or not the TS type included in the VS_TYPE supplied from the VS_TYPE generation circuit 21 is the "non-TS type".

If it is determined in step S12 that the TS type is the "non-TS type", the process proceeds to step S13. In step S13, the video encoding circuit 23 encodes the image signal of the L image supplied from the left-eye image capture apparatus 11, adds the VS_TYPE supplied from the VS_TYPE generation circuit 21 to the encoded signal, and outputs the resulting signal to the multiplexing circuit 25.

In step S14, the dependent stream encoding circuit 24 encodes the image signal of the R image supplied from the right-eye image capture apparatus 12, adds the VS_TYPE supplied from the VS_TYPE generation circuit 21 to the encoded signal, and outputs the resulting signal to the multiplexing circuit 25.

If it is determined in step S12 that the TS type is not the "non-TS type", the process proceeds to step S15. In step S15, the video encoding circuit 23 encodes the image signal of the L image, adds the VS_TYPE supplied from the VS_TYPE generation circuit 21 and the display time information supplied from the display time information generation circuit 22 to the encoded signal, and outputs the resulting signal to the multiplexing circuit 25.

In step S16, the lossless encoding unit 66 of the dependent stream encoding circuit 24 determines whether or not the TS type included in the VS_TYPE supplied from the VS_TYPE generation circuit 21 is the "same-time type" or the "different-time type".

If it is determined in step S16 that the TS type is the "same-time type" or the "different-time type", the process proceeds to step S17. In step S17, the dependent stream encoding circuit 24 encodes the image signal of the R image, adds the VS_TYPE supplied from the VS_TYPE generation circuit 21 and the display time information supplied from the display time information generation circuit 22 to the encoded signal, and outputs the resulting signal to the multiplexing circuit 25.

If it is determined in step S16 that the TS type is not the "same-time type" or the "different-time type", that is, the TS type is the "either type", the process proceeds to step S18.

In step S18, the dependent stream encoding circuit 24 encodes the image signal of the R image, adds the VS_TYPE supplied from the VS_TYPE generation circuit 21 to the encoded signal, and outputs the resulting signal to the multiplexing circuit 25.

After the processing of step S14, S17, or S18, in step S19, the multiplexing circuit 25 multiplexes the encoded data of the L image supplied from the video encoding circuit 23 and the encoded data of the R image supplied from the dependent stream encoding circuit 24. Then, the multiplexing circuit 25 outputs a single bit stream obtained as a result of multiplexing, and the process ends.

Figure 11:
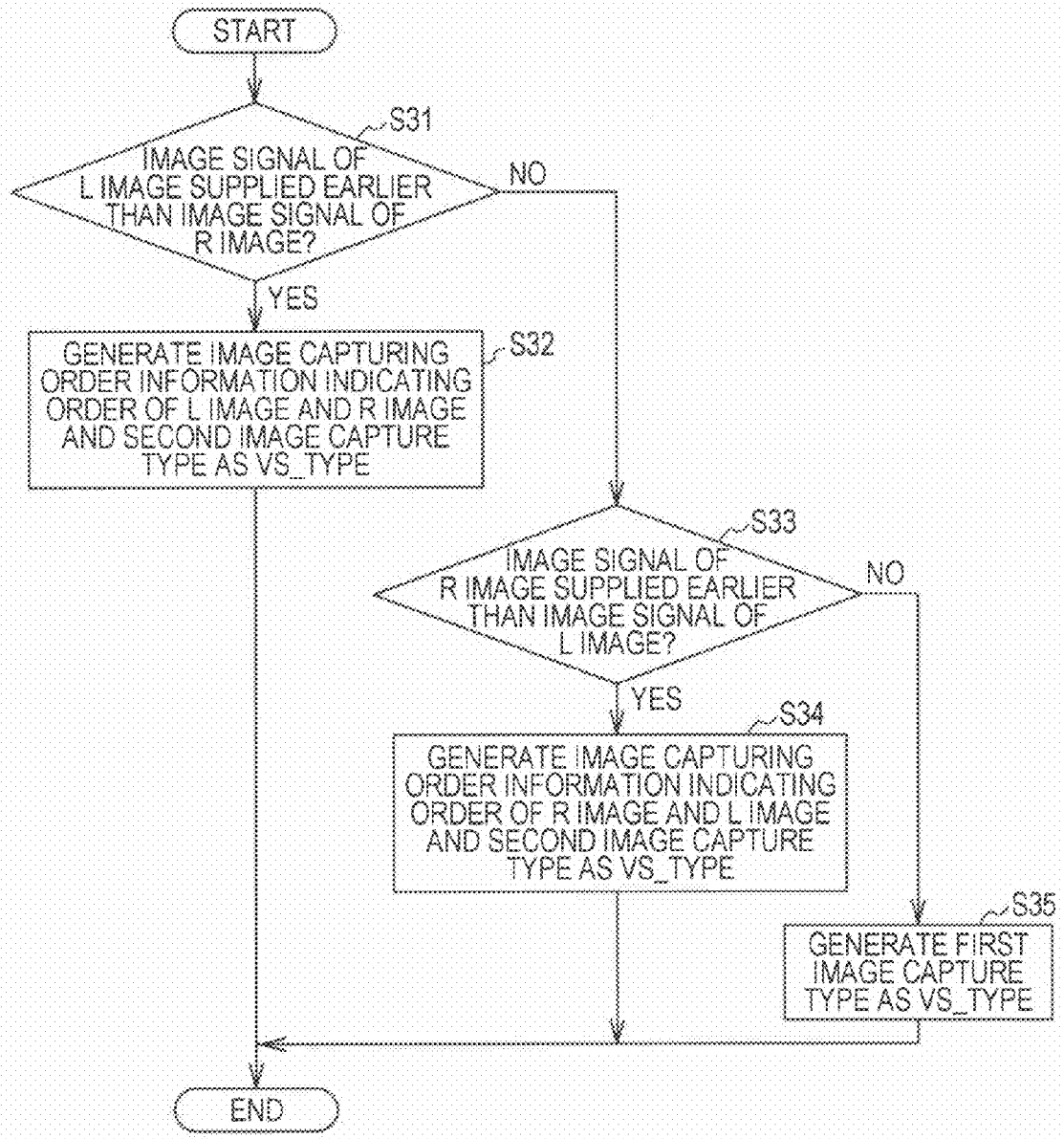
FIG. 11 is a flowchart depicting a VS_TYPE generation process performed by a VS_TYPE generation circuit.

FIG. 11 is a flowchart depicting the VS_TYPE generation process performed by the VS_TYPE generation circuit 21.

In step S31, the VS_TYPE generation circuit 21 determines whether or not the image signal of the L image in the L-R pair has been supplied earlier than the image signal of the R image. If it is determined in step S31 that the image signal of the L image has been supplied earlier than the image signal of the R image, then in step S32, the VS_TYPE generation circuit 21 generates, as VS_TYPE, image capturing order information indicating the order of the L image and the R image and the second image capture type, and the process ends.

If it is determined in step S31 that the image signal of the L image has not been supplied earlier than the image signal of the R image, then in step S33, it is determined whether the image signal of the R image in the L-R pair has been supplied earlier than the image signal of the L image.

If it is determined in step S33 that the image signal of the R image has been supplied earlier than the image signal of the L image, then in step S34, the VS_TYPE generation circuit 21 generates, as VS_TYPE, image capturing order information indicating the order of the R image and the L image and the second image capture type, and the process ends.

If it is determined in step S33 that the image signal of the R image has not been supplied earlier than the image signal of the L image, that is, the image signals of the L-R pair have been supplied at the same timing, the process proceeds to step S35.

In step S35, the VS_TYPE generation circuit 21 generates the first image capture type as VS_TYPE, and the process ends.

Another Example Configuration of Encoding System According to First Embodiment

Figure 12:
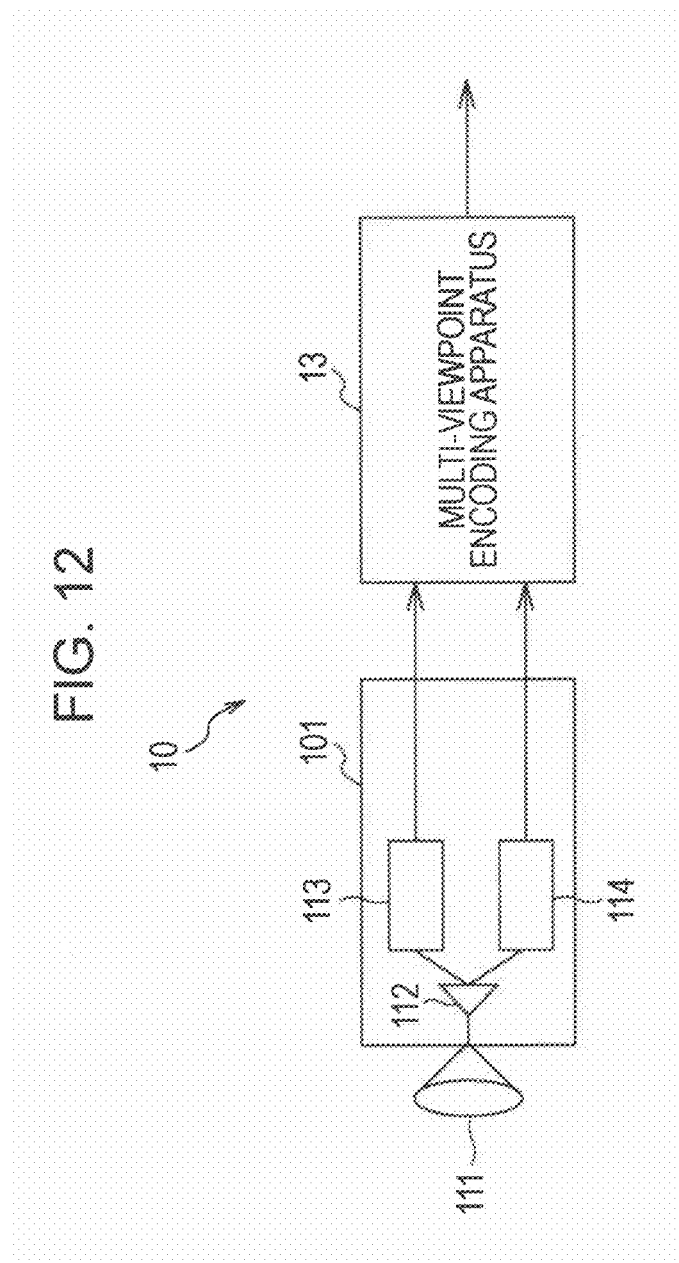
FIG. 12 is a block diagram illustrating another example configuration of the encoding system according to the first embodiment of the present invention.

FIG. 12 is a block diagram illustrating another example configuration of the encoding system 10 according to the first embodiment of the present invention.

In the configuration illustrated in FIG. 12, elements that are the same as or similar to those in FIG. 1 are assigned the same numerals. Redundant descriptions are appropriately omitted.

The configuration of the encoding system 10 illustrated in FIG. 12 is different from that illustrated in FIG. 1 in that a common image capture apparatus 101 is provided in place of the left-eye image capture apparatus 11 and the right-eye image capture apparatus 12. In the encoding system 10 illustrated in FIG. 12, an L image and an R image are captured in a time-shared manner using a single image capture apparatus 101, and image signals of the L image and the R image are input in parallel to the multi-viewpoint encoding apparatus 13.

Specifically, the image capture apparatus 101 includes an image capture unit 111, a splitting unit 112, and two image capture processing units 113 and 114. The image capture unit 111 captures an image under the control of the image capture processing unit 113, and supplies an obtained image signal to the image capture processing unit 113 via the splitting unit 112. The image capture unit 111 further captures an image under the control of the image capture processing unit 114, and supplies an obtained image signal to the image capture processing unit 114 via the splitting unit 112.

The image capture processing unit 113 controls the image capture unit 111 to capture an image at the same capture timing as or at a different capture timing consecutive to the capture timing of the image capture processing unit 114. The image capture processing unit 113 supplies an image signal supplied as a result from the splitting unit 112 to the multi-viewpoint encoding apparatus 13 as an image signal of the L image.

The image capture processing unit 114 controls the image capture unit 111 to capture an image at the same capture timing as or at a different capture timing consecutive to the capture timing of the image capture processing unit 113. The image capture processing unit 114 supplies an image signal supplied as a result from the splitting unit 112 to the multi-viewpoint encoding apparatus 13 as an image signal of the R image.

Another Example Configuration of Encoding System According to First Embodiment

Figure 13:
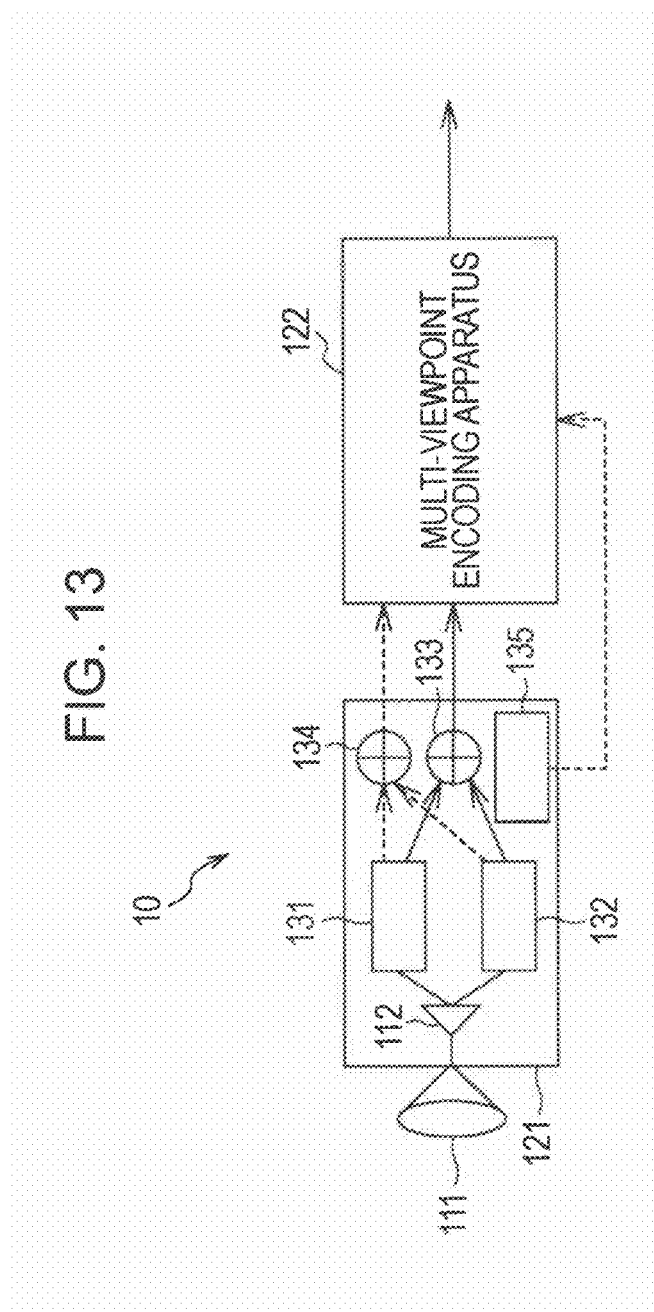
FIG. 13 is a block diagram illustrating another example configuration of the encoding system according to the first embodiment of the present invention.

FIG. 13 is a block diagram illustrating another example configuration of the encoding system 10 according to the first embodiment of the present invention.

The encoding system 10 illustrated in FIG. 13 includes an image capture apparatus 121 and a multi-viewpoint encoding apparatus 122. The image capture apparatus 121 includes an image capture unit 111, a splitting unit 112, image capture processing units 131 and 132, combining units 133 and 134, and an image capture type setting unit 135. In the encoding system 10, an L image and an R image are captured using the single image capture apparatus 121, and image signals of the L image and the R image are input serially to the multi-viewpoint encoding apparatus 122 in a predetermined order.

In the configuration illustrated in FIG. 13, elements that are the same as or similar to those in FIG. 12 are assigned the same numerals. Redundant descriptions are appropriately omitted.

The image capture processing unit 131 of the image capture apparatus 121 controls the image capture unit 111 to capture an image at the same capture timing as or at a different capture timing consecutive to the capture timing of the image capture processing unit 132 in accordance with the image capture type set by the image capture type setting unit 135. The image capture processing unit 131 supplies a resulting image signal to the combining unit 133 as an image signal of the L image. Further, the image capture processing unit 131 supplies the image capture time to the combining unit 134.

The image capture processing unit 132 controls the image capture unit 111 to capture an image at the same capture timing as or at a different capture timing consecutive to the capture timing of the image capture processing unit 131 in accordance with the image capture type set by the image capture type setting unit 135. The image capture processing unit 132 supplies a resulting image signal to the combining unit 133 as an image signal of the R image. Further, the image capture processing unit 132 supplies the image capture time to the combining unit 134.

The combining unit 133 outputs the image signal of the L image supplied from the image capture processing unit 131 and the image signal of the R image supplied from the image capture processing unit 132 to the multi-viewpoint encoding apparatus 122 in a predetermined order.

The combining unit 134 outputs the image capture time supplied from the image capture processing unit 131 and the image capture time supplied from the image capture processing unit 132 to the multi-viewpoint encoding apparatus 122 in a predetermined order.

The image capture type setting unit 135 sets an image capture type, and supplies the image capture type to the image capture processing unit 131, the image capture processing unit 132, and the multi-viewpoint encoding apparatus 122.

The multi-viewpoint encoding apparatus 122 encodes the image signal of the L image and the image signal of the R image supplied from the combining unit 133. The multi-viewpoint encoding apparatus 122 adds VS_TYPE that is based on the image capture times supplied from the combining unit 134 and the image capture type supplied from the image capture type setting unit 135, and display time information to the encoded data of the L image and the encoded data of the R image obtained as a result of encoding. Then, the multi-viewpoint encoding apparatus 122 multiplexes the encoded data of the L image and the encoded data of the R image to which the VS_TYPE and the display time information are added, and outputs the multiplexed data.

Figure 14:
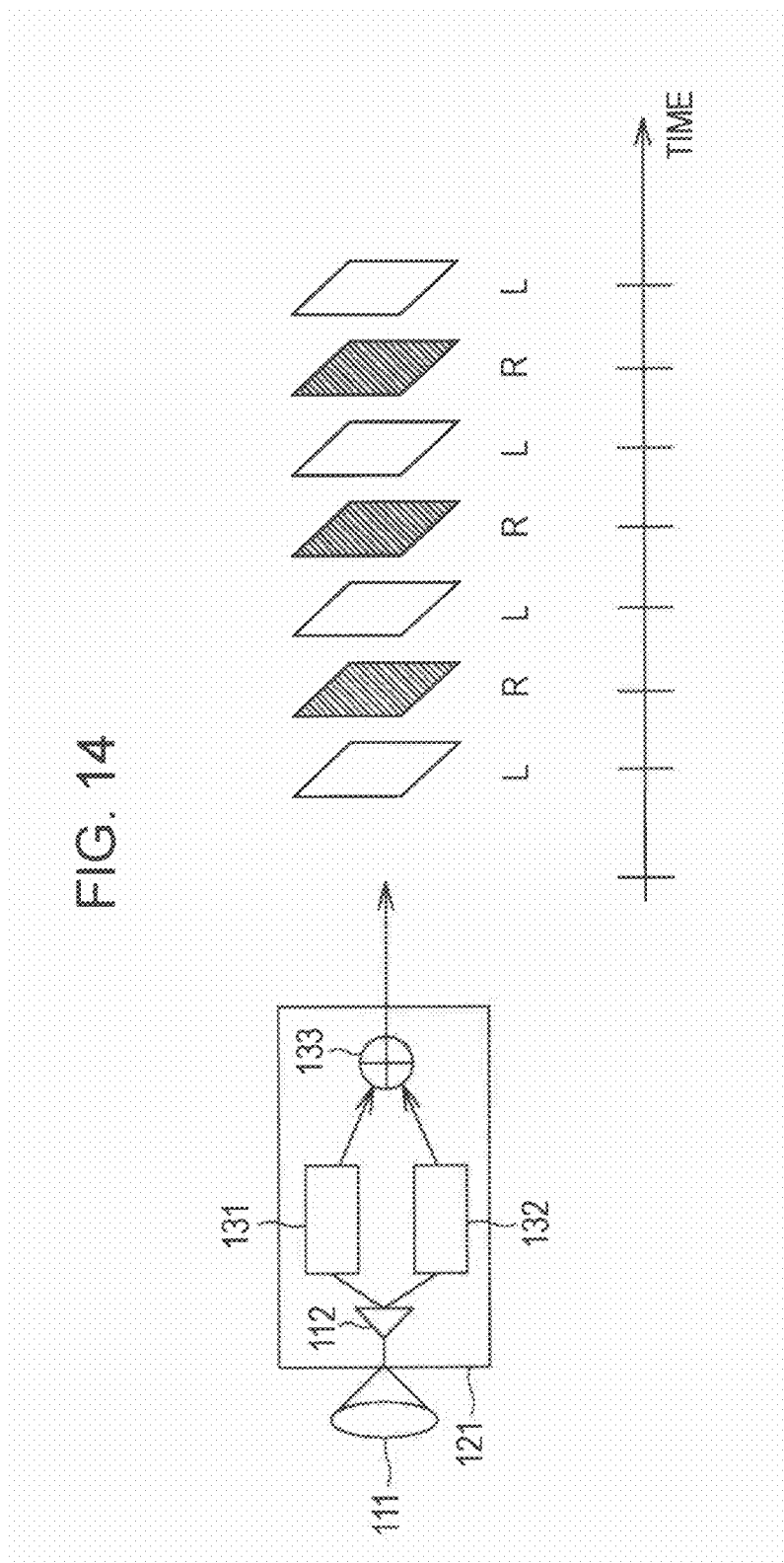
FIG. 14 is a diagram depicting image signals output from a combining unit.

FIG. 14 is a diagram depicting image signals output from the combining unit 133.

As illustrated in FIG. 14, the image capture apparatus 121 outputs the image signal of the L image captured under the control of the image capture processing unit 131 and the image signal of the R image captured under the control of the image capture processing unit 132 from the combining unit 133 in a predetermined order (in the example of FIG. 14, in the order of the L image and the R image) at a high frame rate.

Example Configuration of Multi-Viewpoint Encoding Apparatus

Figure 15:
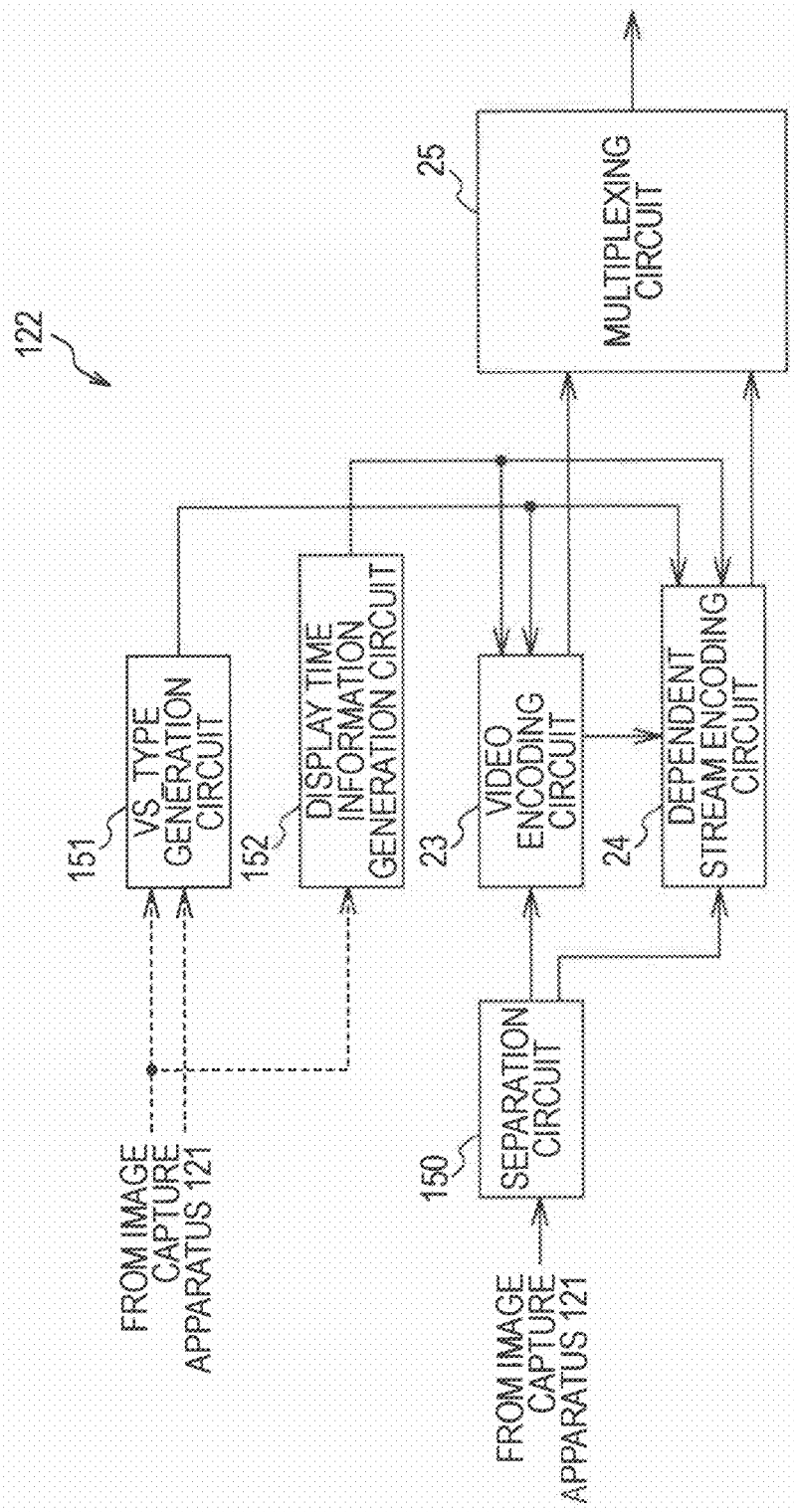
FIG. 15 is a block diagram illustrating an example configuration of a multi-viewpoint encoding apparatus illustrated in FIG. 13.

FIG. 15 is a block diagram illustrating an example configuration of the multi-viewpoint encoding apparatus 122 illustrated in FIG. 13.

The configuration of the multi-viewpoint encoding apparatus 122 illustrated in FIG. 15 is different from that illustrated in FIG. 4 in that a separation circuit 150 is further provided and that a VS_TYPE generation circuit 151 and a display time information generation circuit 152 are provided in place of the VS_TYPE generation circuit 21 and the display time information generation circuit 22, respectively.

In the configuration illustrated in FIG. 15, elements that are the same as or similar to those in FIG. 4 are assigned the same numerals. Redundant descriptions are appropriately omitted.

The separation circuit 150 supplies the image signal of the L image and the image signal of the R image in the image signals supplied from the combining unit 134 to the video encoding circuit 23 and the dependent stream encoding circuit 24, respectively.

When the image capture type supplied from the image capture type setting unit 135 is the first image capture type, the VS_TYPE generation circuit 151 supplies the first image capture type as VS_TYPE to the video encoding circuit 23 and the dependent stream encoding circuit 24.

When the image capture type supplied from the image capture type setting unit 135 is the second image capture type, the VS_TYPE generation circuit 151 generates image capturing order information based on the image capture times of the L-R pair supplied from the combining unit 134. Then, the VS_TYPE generation circuit 151 supplies the second image capture type and the image capturing order information as VS_TYPE to the video encoding circuit 23 and the dependent stream encoding circuit 24.

The display time information generation circuit 152 determines the display time of the L image and the display time of the R image in the L-R pair in accordance with the image capture times of the L-R pair supplied from the combining unit 134. Then, the display time information generation circuit 152 supplies display time information indicating the display time of the L image in the L-R pair to the video encoding circuit 23, and display time information indicating the display time of the R image to the dependent stream encoding circuit 24.

Description of VS_Type Generation Process

Figure 16:
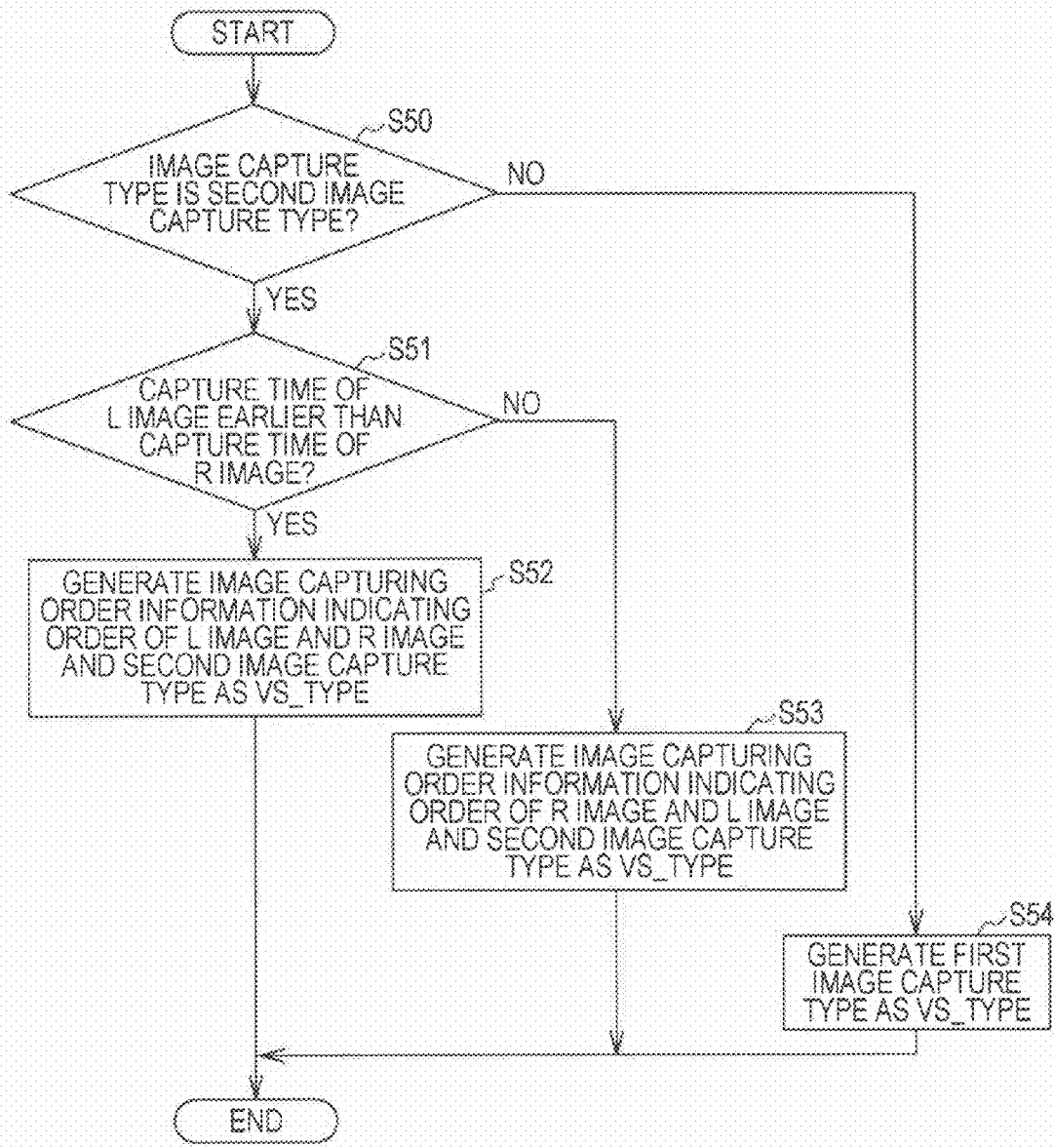
FIG. 16 is a flowchart depicting a VS_TYPE generation process performed by a VS_TYPE generation circuit.

FIG. 16 is a flowchart depicting a VS_TYPE generation process performed by the VS_TYPE generation circuit 151.

Referring to FIG. 16, in step S50, the VS_TYPE generation circuit 151 determines whether or not the image capture type supplied from the image capture type setting unit 135 is the second image capture type.

If it is determined in step S50 that the image capture type is the second image capture type, then in step S51, the VS_TYPE generation circuit 151 determines whether or not the image capture time of the L image in the L-R pair supplied from the combining unit 134 is earlier than the image capture time of the R image. If it is determined in step S51 that the image capture time of the L image is earlier than the image capture time of the R image, the process proceeds to step S52.

In step S52, the VS_TYPE generation circuit 151 generates, as VS_TYPE, image capturing order information indicating the order of the L image and the R image and the second image capture type, and the process ends.

If it is determined in step S51 that the image capture time of the L image is not earlier than the image capture time of the R image, that is, the image capture time of the R image is earlier than the image capture time of the L image, the process proceeds to step S53.

In step S53, the VS_TYPE generation circuit 151 generates, as VS_TYPE, image capturing order information indicating the order of the R image and the L image and the second image capture type, and the process ends.

If it is determined in step S50 that the image capture type is the first image capture type, then in step S54, the VS_TYPE generation circuit 151 generates the first image capture type as VS_TYPE, and the process ends.

While the encoding system 10 illustrated in FIG. 13 is configured such that an image capture type is input from the image capture apparatus 121 to the multi-viewpoint encoding apparatus 122, an image capture type may not necessarily be input to the multi-viewpoint encoding apparatus 122. In this case, the VS_TYPE generation circuit 151 determines an image capture type based on the image capture times of the L-R pair.

Another Example Configuration of Encoding System According to First Embodiment

Figure 17:
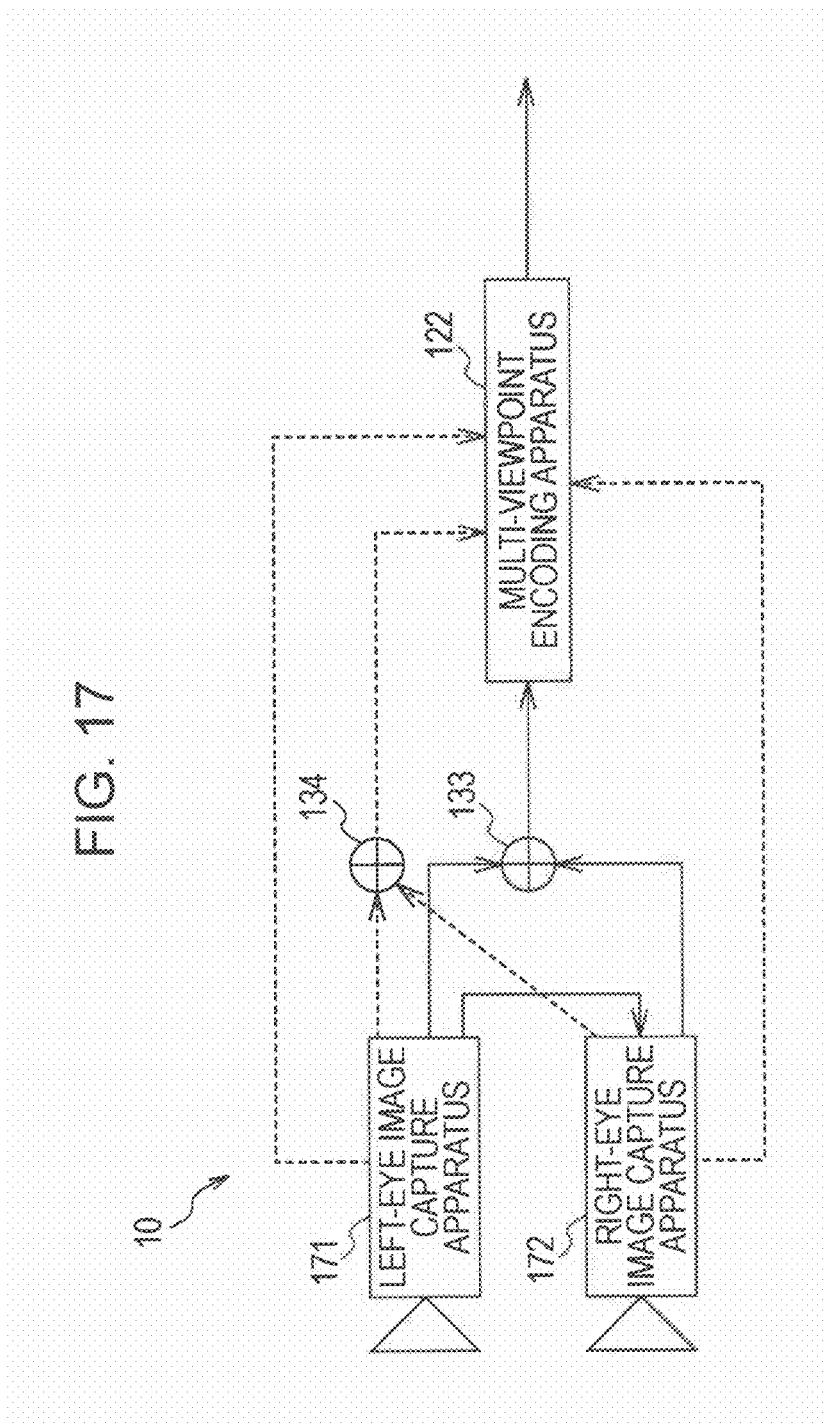
FIG. 17 is a block diagram illustrating another example configuration of the encoding system according to the first embodiment of the present invention.

FIG. 17 is a block diagram illustrating another example configuration of the encoding system 10 according to the first embodiment of the present invention.

The configuration of the encoding system 10 illustrated in FIG. 17 is different from that illustrated in FIG. 13 in that a left-eye image capture apparatus 171 and a right-eye image capture apparatus 172 are provided in place of the image capture apparatus 121 and that the combining units 133 and 134 are provided outside the image capture apparatuses 171 and 172. Specifically, in the encoding system 10, an L image and an R image are captured using different image capture apparatuses, and image signals of the L image and the R image are input serially to the multi-viewpoint encoding apparatus 122 in a predetermined order.

In the configuration illustrated in FIG. 17, elements that are the same as or similar to those in FIG. 13 are assigned the same numerals. Redundant descriptions are appropriately omitted.

The left-eye image capture apparatus 171 in the encoding system 10 is an image capture apparatus configured to capture an L image, and the right-eye image capture apparatus 172 is an image capture apparatus configured to capture an R image. A synchronization signal is input from the left-eye image capture apparatus 171 to the right-eye image capture apparatus 172, and the left-eye image capture apparatus 171 and the right-eye image capture apparatus 172 are synchronized with each other.

The left-eye image capture apparatus 171 captures an image at the same capture timing as or at a different capture timing consecutive to the capture timing of the right-eye image capture apparatus 172, and supplies a resulting image signal to the combining unit 133 as an image signal of the L image. Further, the left-eye image capture apparatus 171 supplies the image capture time to the combining unit 134. The left-eye image capture apparatus 171 further supplies an image capture type to the multi-viewpoint encoding apparatus 122.

The right-eye image capture apparatus 172 captures an image at the same capture timing as or at a different capture timing consecutive to the capture timing of the left-eye image capture apparatus 171, and supplies a resulting image signal to the combining unit 133 as an image signal of the R image. Further, the right-eye image capture apparatus 172 supplies the image capture time to the combining unit 134. The right-eye image capture apparatus 172 further supplies an image capture type to the multi-viewpoint encoding apparatus 122.

The image capture type output from the right-eye image capture apparatus 172 is the same as the image capture type output from the left-eye image capture apparatus 171. Therefore, the image capture type may be output from one of the left-eye image capture apparatus 171 and the right-eye image capture apparatus 172.

Figure 18:
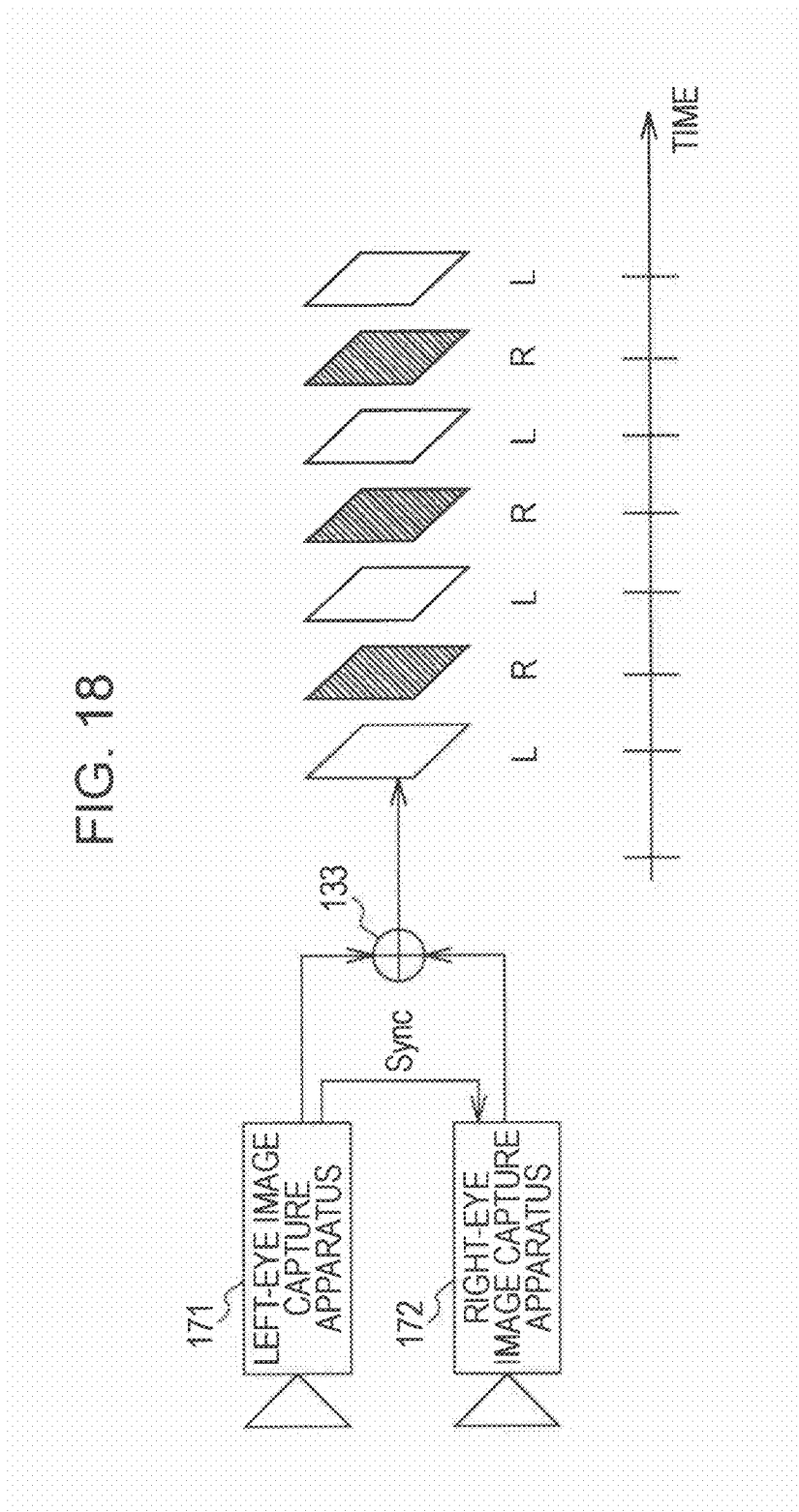
FIG. 18 is a diagram depicting image signals output from a combining unit.

FIG. 18 is a diagram depicting image signals output from the combining unit 133.

As illustrated in FIG. 18, the image signal of the L image obtained as a result of image capture by the left-eye image capture apparatus 171 and the image signal of the R image obtained as a result of image capture by the right-eye image capture apparatus 172 are output from the combining unit 133 in a predetermined order (in the example of FIG. 18, in the order of the L image and the R image) at a high frame rate.

In the foregoing description, encoded data of the L image and encoded data of the R image are multiplexed into a single bit stream. However, encoded data of the L image and encoded data of the R image are multiplexed into two or more bit streams.

Example Configuration of Decoding System

Figure 19:
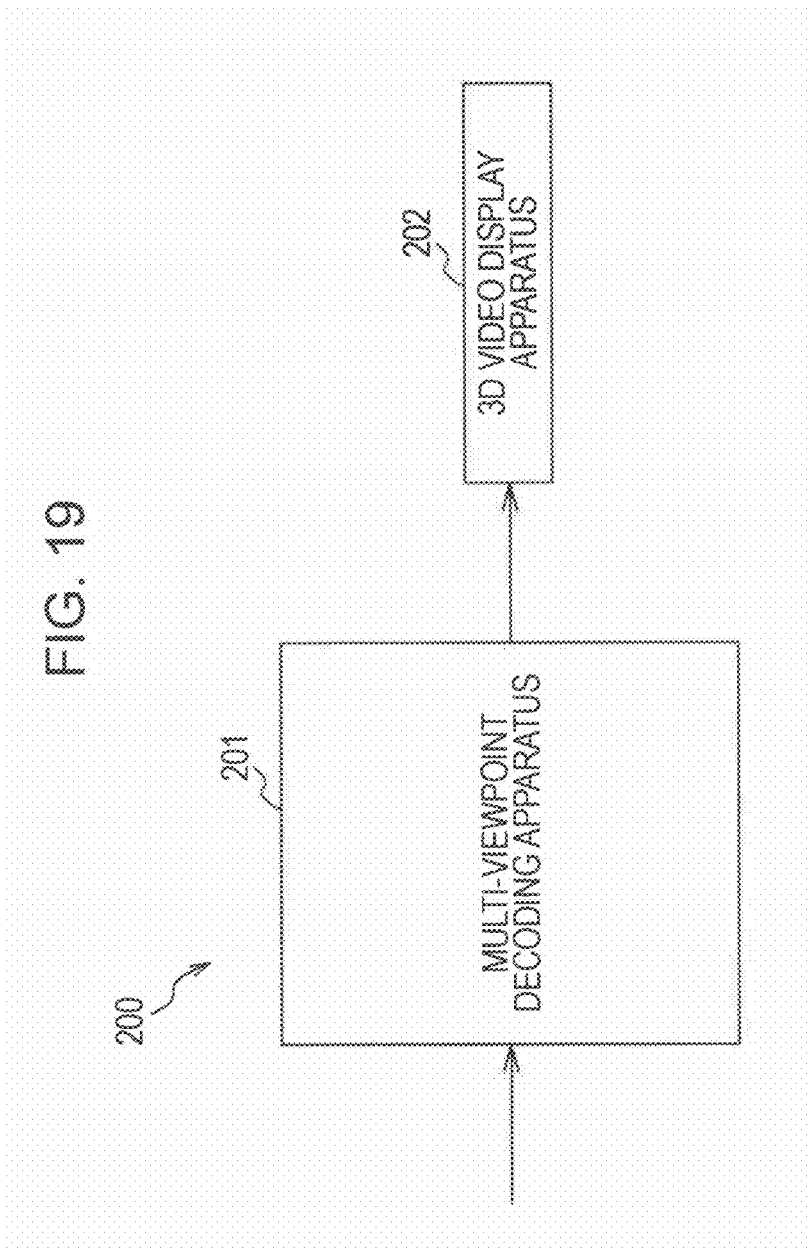
FIG. 19 is a block diagram illustrating an example configuration of a decoding system.

FIG. 19 is a block diagram illustrating an example configuration of a decoding system 200 configured to decode a bit stream output from the encoding system 10 described above.

The decoding system 200 illustrated in FIG. 19 includes a multi-viewpoint decoding apparatus 201 and a 3D video display apparatus 202.

The multi-viewpoint decoding apparatus 201 decodes a bit stream output from the encoding system 10 using a scheme corresponding to the MVC encoding scheme. The multi-viewpoint decoding apparatus 201 outputs image signals of the L-R pair, which are analog signals obtained as a result, to the 3D video display apparatus 202 at different consecutive timings.

The 3D video display apparatus 202 displays an image based on an image signal of the L image or the R image input from the multi-viewpoint decoding apparatus 201. Thus, the L-R pair are displayed on the 3D video display apparatus 202 at different consecutive timings. Therefore, a user can view a stereoscopic image.

L images and R images may be displayed on a field-by-field basis or on a frame-by-frame basis.

Example Configuration of Multi-Viewpoint Decoding Apparatus

Figure 20:
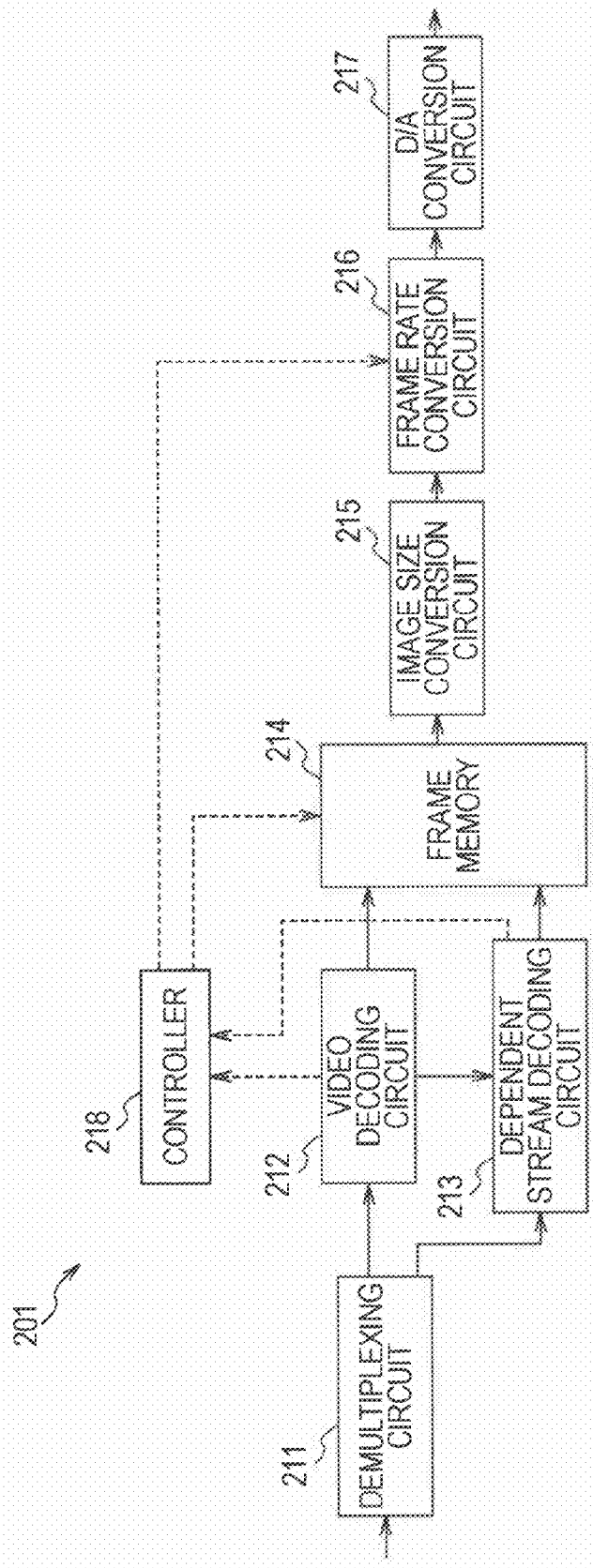
FIG. 20 is a block diagram illustrating an example configuration of a multi-viewpoint decoding apparatus illustrated in FIG. 19.

FIG. 20 is a block diagram illustrating an example configuration of the multi-viewpoint decoding apparatus 201 illustrated in FIG. 19.

As illustrated in FIG. 20, the multi-viewpoint decoding apparatus 201 includes a demultiplexing circuit 211, a video decoding circuit 212, a dependent stream decoding circuit 213, a frame memory 214, an image size conversion circuit 215, a frame rate conversion circuit 216, a digital-to-analog (D/A) conversion circuit 217, and a controller 218.

The demultiplexing circuit 211 receives a bit stream output from the encoding system 10. The demultiplexing circuit 211 demultiplexes the encoded data of the L image and the encoded data of the R image, which are multiplexed, from the bit stream. The demultiplexing circuit 211 supplies the encoded data of the L image to the video decoding circuit 212, and the encoded data of the R image to the dependent stream decoding circuit 213.

The video decoding circuit 212 decodes the encoded data of the L image supplied from the demultiplexing circuit 211 as a base stream using the scheme corresponding to the MVC encoding scheme. The video decoding circuit 212 supplies image data that is a digital signal of the L image obtained as a result of decoding to the dependent stream decoding circuit 213 and the frame memory 214. The video decoding circuit 212 further supplies VS_TYPE and display time information obtained as a result of decoding to the controller 218.

The dependent stream decoding circuit 213 decodes the encoded data of the R image supplied from the demultiplexing circuit 211 as a dependent stream using the scheme corresponding to the MVC encoding scheme by utilizing the image data of the L image supplied from the video decoding circuit 212. The dependent stream decoding circuit 213 supplies image data that is a digital signal of the R image obtained as a result of decoding to the frame memory 214. The dependent stream decoding circuit 213 further supplies VS_TYPE and display time information obtained as a result of decoding to the controller 218.

The frame memory 214 stores the image data of the L image supplied from the video decoding circuit 212 and the image data of the R image supplied from the dependent stream decoding circuit 213. The frame memory 214 consecutively reads the image data of the L image and the image data of the R image in the L-R pair, which are stored in the frame memory 214, in accordance with the control of the controller 218, and outputs the image data of the L image and the image data of the R image to the image size conversion circuit 215.

The image size conversion circuit 215 increases or reduces the image size of the image data of the L image or the R image supplied from the frame memory 214 to a predetermined size, and supplies the enlarged or reduced image data of the L image or the R image to the frame rate conversion circuit 216.

The frame rate conversion circuit 216 outputs the image data of the L image and the R image supplied from the image size conversion circuit 215 while controlling the output timing of the image data of the L image and the R image in accordance with the control of the controller 218 so that the frame rate of the L image and the R image can become a predetermined rate.

The controller 218 determines the display time of the L image and the display time of the R image in accordance with the VS_TYPE and display time information supplied from the video decoding circuit 212 and the dependent stream decoding circuit 213. The controller 218 controls the frame memory 214 so that the image data of the L image and R image is output from the frame memory 214 at the timings based on the display time of the L image and the display time of the R image. The controller 218 further controls the frame rate conversion circuit 216 in accordance with the display time of the L image and the display time of the R image to convert the frame rate of the image data of the L image and R image output from the image size conversion circuit 215 into a predetermined frame rate and to output the resulting image data.

The D/A conversion circuit 217 performs D/A conversion on the image data of the L image or the R image output from the frame rate conversion circuit 216, and outputs an image signal that is an analog signal as a result to the 3D video display apparatus 202.

The frame memory 214, the image size conversion circuit 215, the frame rate conversion circuit 216, and the D/A conversion circuit 217 may not necessarily be provided in the multi-viewpoint decoding apparatus 201, but may be provided in the 3D video display apparatus 202.

Example Configuration of Video Decoding Circuit

Figure 21:
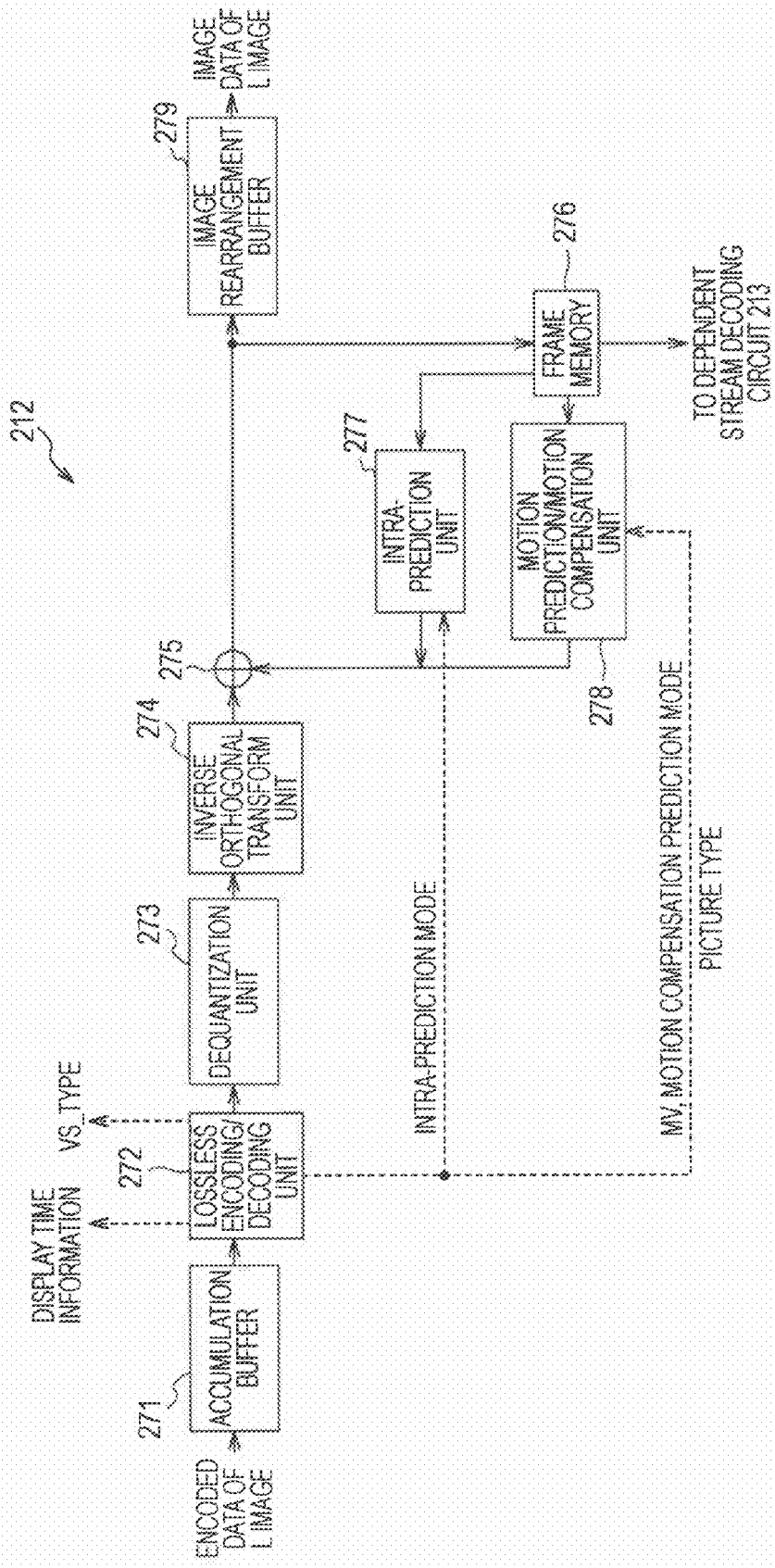
FIG. 21 is a block diagram illustrating an example configuration of a video decoding circuit illustrated in FIG. 20.

FIG. 21 is a block diagram illustrating an example configuration of the video decoding circuit 212 illustrated in FIG. 20.

The encoded data of the L image supplied from the demultiplexing circuit 211 is supplied to the accumulation buffer 271. The accumulation buffer 271 temporarily stores the supplied encoded data, and supplies the encoded data to a lossless encoding/decoding unit 272.

The lossless encoding/decoding unit 272 performs processing, such as variable length decoding or arithmetic decoding, on the encoded data supplied from the accumulation buffer 271 in accordance with the format of the encoded data to decode the quantized value and information included in the header of the encoded data, including the intra-prediction mode, the motion vector, the motion compensation prediction mode, and other information necessary for decoding an image, such as the picture type of each picture.

The quantized value obtained by the lossless encoding/decoding unit 272 is supplied to a dequantization unit 273, and the intra-prediction mode is supplied to an intra-prediction unit 277. Further, the motion vector (MV), motion compensation prediction mode, and picture type obtained by the lossless encoding/decoding unit 272 are supplied to a motion prediction/motion compensation unit 278.

Furthermore, the lossless encoding/decoding unit 272 extracts VS_TYPE and display time information from the encoded data, and supplies the VS_TYPE and the display time information to the controller 218.

The dequantization unit 273, an inverse orthogonal transform unit 274, a calculation unit 275, a frame memory 276, the intra-prediction unit 277, and the motion prediction/motion compensation unit 278 perform processes similar to those of the dequantization unit 49, the inverse orthogonal transform unit 50, the calculation unit 51, the frame memory 52, the intra-prediction unit 53, and the motion prediction/motion compensation unit 54 illustrated in FIG. 6, respectively. Therefore, an image is decoded (a decoded image is obtained).

That is, the dequantization unit 273 dequantizes the quantized value supplied from the lossless encoding/decoding unit 272 into a transform coefficient, and supplies the transform coefficient to the inverse orthogonal transform unit 274.

The inverse orthogonal transform unit 274 performs an inverse orthogonal transform, such as an inverse discrete cosine transform or an inverse Karhunen-Loève transform, on the transform coefficient supplied from the dequantization unit 273 in accordance with the format of the encoded data, and supplies the resulting data to the calculation unit 275.

The calculation unit 275 adds the pixel value of a prediction image supplied from the intra-prediction unit 277, as desired, to the data of an intra picture in the data supplied from the inverse orthogonal transform unit 274 to obtain a decoded image of the intra picture. Further, the calculation unit 275 adds the pixel value of a prediction image supplied from the motion prediction/motion compensation unit 278 to the data of a non-intra picture in the data supplied from the inverse orthogonal transform unit 274 to obtain a decoded image of the non-intra picture.

The decoded images obtained by the calculation unit 275 are supplied to the frame memory 276, as desired, and are also supplied to an image rearrangement buffer 279.

The frame memory 276 temporarily stores the decoded images supplied from the calculation unit 275, and supplies the decoded images to the intra-prediction unit 277 or the motion prediction/motion compensation unit 278, as desired, as reference images that are used to generate prediction images. Further, the frame memory 276 supplies a stored decoded image to the dependent stream decoding circuit 213 as a reference image that is used to generate a prediction image using the dependent stream decoding circuit 213.

When the data to be processed by the calculation unit 275 is data of an intra picture, the intra-prediction unit 277 generates a prediction image for the intra picture using a decoded image as a reference image supplied from the frame memory 276, as desired, and supplies the prediction image to the calculation unit 275.

Specifically, the intra-prediction unit 277 generates a prediction image from a pixel that has already been stored in the frame memory 276 among pixels near a portion (block) to be processed by the calculation unit 275 in accordance with the intra-prediction mode supplied from the lossless encoding/decoding unit 272, and supplies the prediction image to the calculation unit 275.

When the data to be processed by the calculation unit 275 is data of a non-intra picture, on the other hand, the motion prediction/motion compensation unit 278 generates a prediction image for the non-intra picture, and supplies the prediction image to the calculation unit 275.

Specifically, the motion prediction/motion compensation unit 278 reads as a reference image a picture of a decoded image that is used to generate a prediction image from the frame memory 276 in accordance with the picture type or the like supplied from the lossless encoding/decoding unit 272. The motion prediction/motion compensation unit 278 further performs motion compensation on the reference image supplied from the frame memory 276 in accordance with the motion vector and motion compensation prediction mode supplied from the lossless encoding/decoding unit 272 to generate a prediction image, and supplies the prediction image to the calculation unit 275.

The calculation unit 275 adds the prediction image supplied from the intra-prediction unit 277 or the motion prediction/motion compensation unit 278 in the manner described above to the data supplied from the inverse orthogonal transform unit 274. Therefore, the (pixel value of the) picture is decoded.

The image rearrangement buffer 279 temporarily stores the pictures (decoded images) supplied from the calculation unit 275, and reads the pictures to rearrange the pictures into the original arrangement (display order). Then, the image rearrangement buffer 279 supplies the rearranged pictures to the frame memory 214.

Example Configuration of Dependent Stream Decoding Circuit

Figure 22:
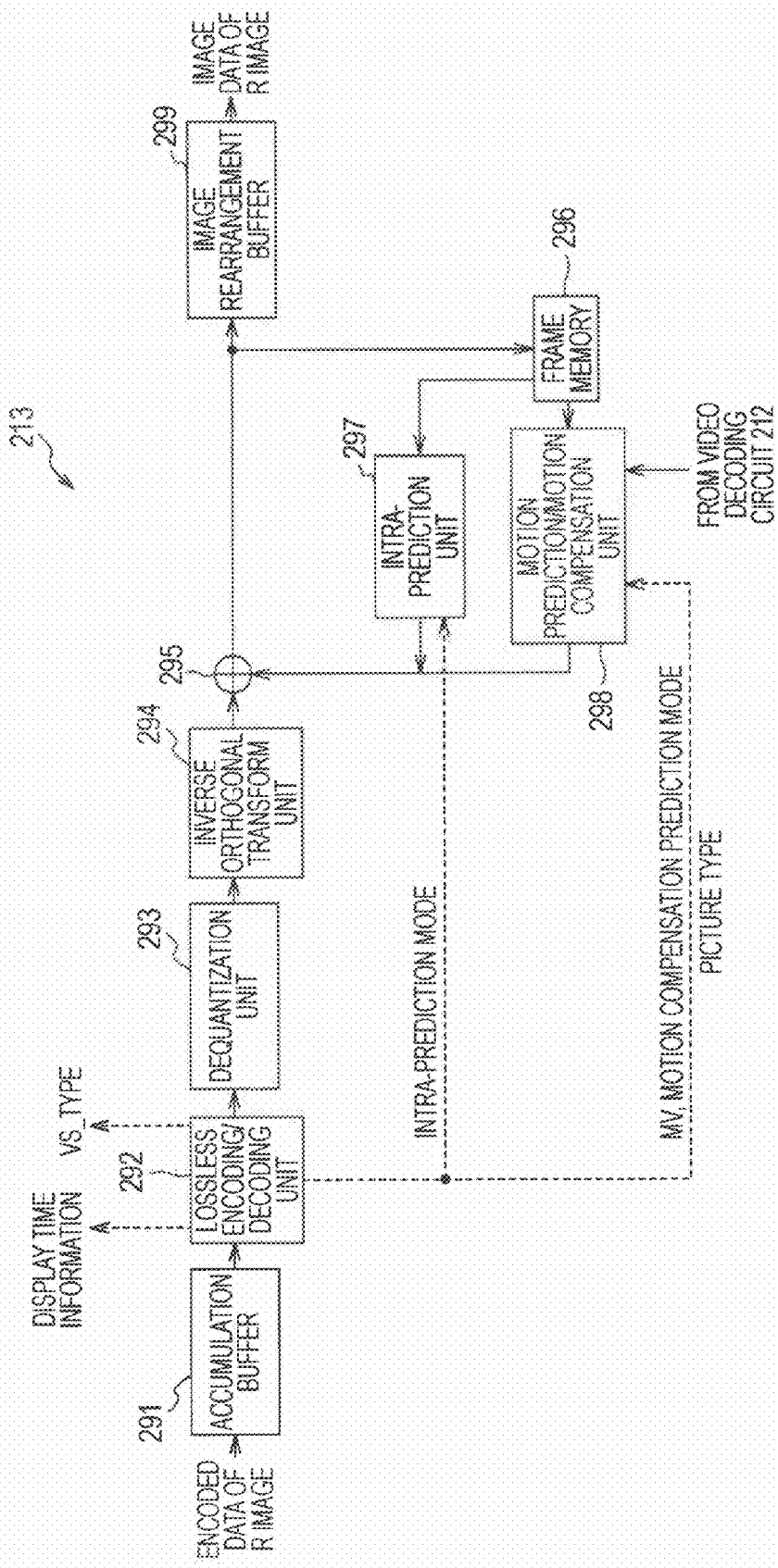
FIG. 22 is a block diagram illustrating an example configuration of a dependent stream decoding circuit illustrated in FIG. 20.

FIG. 22 is a block diagram illustrating an example configuration of the dependent stream decoding circuit 213 illustrated in FIG. 20.

As illustrated in FIG. 22, the dependent stream decoding circuit 213 includes an accumulation buffer 291, a lossless encoding/decoding unit 292, a dequantization unit 293, an inverse orthogonal transform unit 294, a calculation unit 295, a frame memory 296, an intra-prediction unit 297, a motion prediction/motion compensation unit 298, and an image rearrangement buffer 299.

The processes of the respective units in the dependent stream decoding circuit 213 illustrated in FIG. 22 are similar to those in the video decoding circuit 212, except for the processes of the frame memory 296 and the motion prediction/motion compensation unit 298. Thus, only the different processes will be described.

The frame memory 296 of the dependent stream decoding circuit 213 temporarily stores the decoded image supplied from the calculation unit 295, and supplies the decoded image to the intra-prediction unit 297 or the motion prediction/motion compensation unit 298, as desired, as a reference image that is used to generate a prediction image.

The motion prediction/motion compensation unit 298 reads as a reference image a picture of a decoded image that is used to generate a prediction image from the frame memory 296 in accordance with the picture type or the like supplied from the lossless encoding/decoding unit 292. Further, the motion prediction/motion compensation unit 298 reads as a reference image a picture of a decoded image that is used to generate a prediction image from the frame memory 276 of the video decoding circuit 212 in accordance with the picture type or the like supplied from the lossless encoding/decoding unit 292. Then, the motion prediction/motion compensation unit 298 generates a prediction image by performing motion compensation on the reference images supplied from the frame memories 296 and 276 in accordance with the motion vector and motion compensation prediction mode supplied from the lossless encoding/decoding unit 292, and supplies the prediction image to the calculation unit 295.

Description of Process of Decoding System

Figure 23:
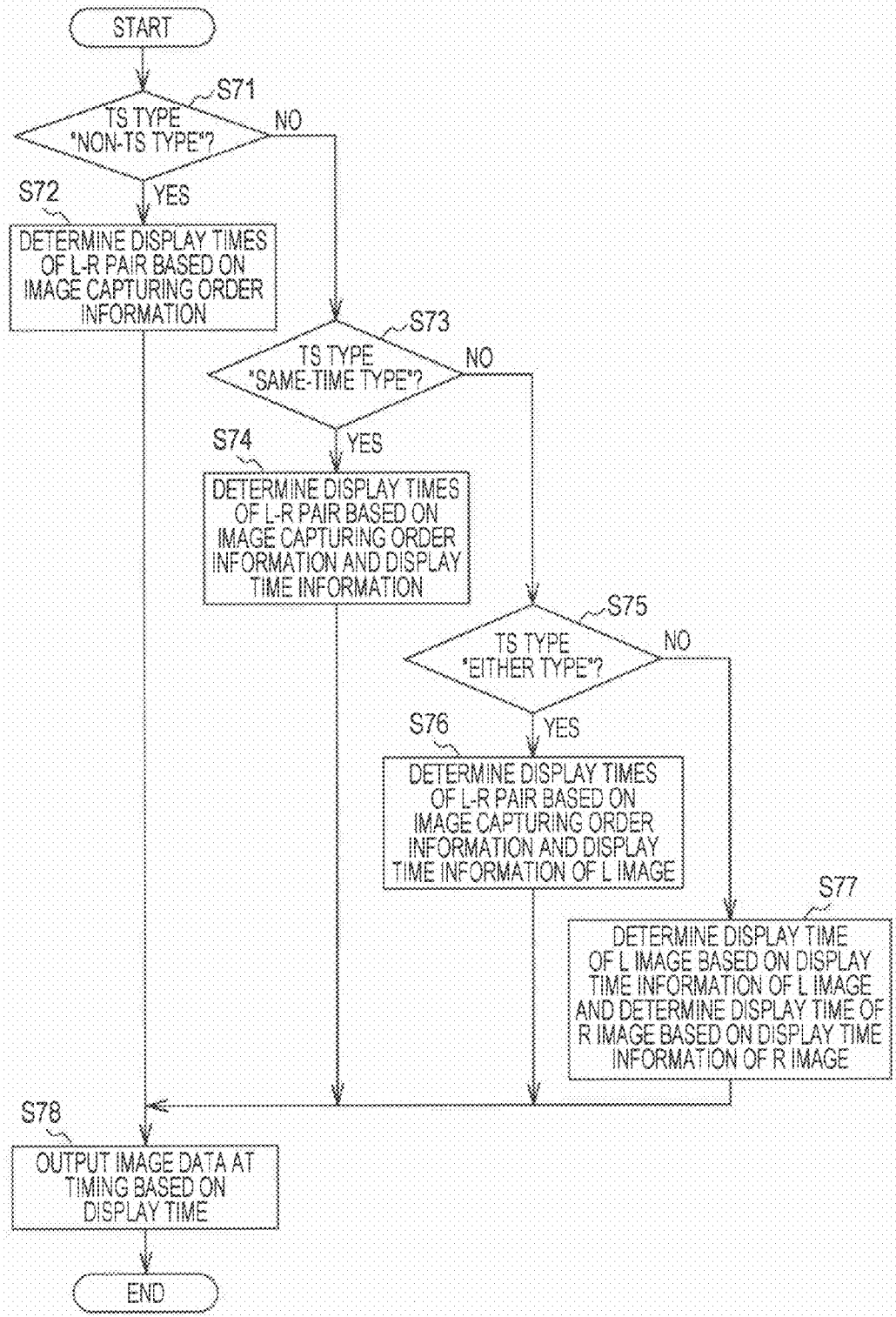
FIG. 23 is a flowchart depicting a display control process performed by a controller.

FIG. 23 is a flowchart depicting a display control process performed by the controller 218 in the decoding system 200. The display control process is performed for, for example, each L-R pair when the image capture type included in the VS_TYPE of the L-R pair supplied to the controller 218 is the second image capture type.

In step S71, the controller 218 determines whether or not the TS type included in the VS_TYPE of the L-R pair supplied from the video decoding circuit 212 and the dependent stream decoding circuit 213 is the "non-TS type".

If it is determined in step S71 that the TS type is the "non-TS type", then in step S72, the controller 218 determines the display times of the L-R pair in accordance with the image capturing order information so that the image capturing order is the same as the display order.

Specifically, when the image capturing order information indicates the order of the L image and the R image, the controller 218 determines the display times of the L-R pair so that the display time of the L image in the L-R pair can be earlier than the display time of the R image by a predetermined period of time. When the image capturing order information indicates the order of the R image and the L image, the controller 218 determines the display times of the L-R pair so that the display time of the R image in the L-R pair can be earlier than the display time of the L image by a predetermined period of time.

If it is determined in step S71 that the TS type is not the "non-TS type", then in step S73, the controller 218 determines whether or not the TS type is the "same-time type".

If it is determined in step S73 that the TS type is the "same-time type", then in step S74, the controller 218 determines the display times of the L-R pair in accordance with the image capturing order information and the display time information so that the image capturing order is the same as the display order.

Specifically, when the image capturing order information indicates the order of the L image and the R image, for example, the controller 218 sets the display time of the L image to the display time indicated by the display time information, and sets the display time of the R image to the display time that is later than the display time by a predetermined period of time. When the image capturing order information indicates the order of the R image and the L image, for example, the controller 218 sets the display time of the R image to the display time indicated by the display time information, and sets the display time of the L image to the display time that is later than the display time by a predetermined period of time.

If it is determined in step S73 that the TS type is not the "same-time type", then in step S75, the controller 218 determines whether or not the TS type is the "either type".

If it is determined in step S75 that the TS type is the "either type", then in step S76, the controller 218 determines the display times of the L-R pair in accordance with the image capturing order information and the display time information about the L image so that the image capturing order is the same as the display order.

Specifically, when the image capturing order information indicates the order of the L image and the R image, the controller 218 sets the display time of the L image to the display time indicated by the display time information about the L image, and sets the display time of the R image to the display time that is later than the display time by a predetermined period of time. When the image capturing order information indicates the order of the R image and the L image, the controller 218 sets the display time of the L image to the display time indicated by the display time information about the L image, and sets the display time of the R image to the display time that is earlier than the display time by a predetermined period of time.

If it is determined in step S75 that the TS type is not the "either type", that is, the TS type is the "different-time type", the process proceeds to step S77.

In step S77, the controller 218 determines the display time of the L image in accordance with the display time information about the L image, and determines the display time of the R image in accordance with the display time information about the R image.

After the processing of step S72, S74, S76, or S77, the process proceeds to step S78. In step S78, the controller 218 controls the frame memory 214 to read and output the image data of the L image and the image data of the R image at the timings based on the display times of the L-R pair determined in step S72, S74, S76, or S77. Then, the process ends.

As described above, the encoding system 10 adds the second image capture type and the image capturing order information to the encoded data of the L-R pair captured at different consecutive timings. Therefore, the decoding system 200 can display the L-R pair, which have been captured at the different consecutive timings, in the same order as the image capturing order in accordance with the second image capture type and image capturing order information added to the encoded data. Consequently, a natural-looking stereoscopic image in which natural movements during image capture are faithfully reproduced can be displayed. Thus, a stereoscopic image with improved reality can be obtained.

Second Embodiment

Example Configuration of Encoding System According to Second Embodiment

Figure 24:
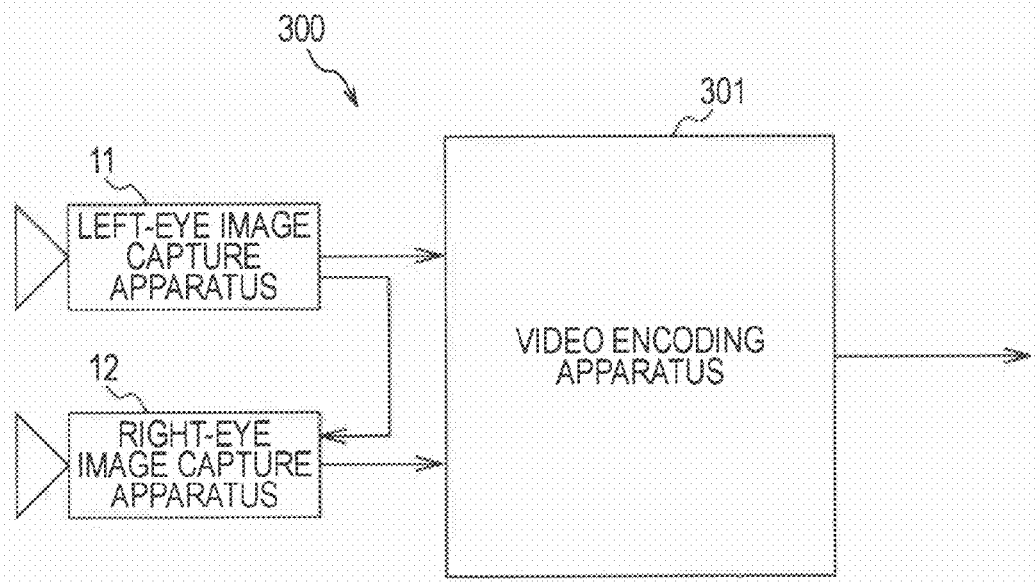
FIG. 24 is a block diagram illustrating an example configuration of an encoding system according to a second embodiment of the present invention.

FIG. 24 is a block diagram illustrating an example configuration of an encoding system 300 according to a second embodiment of the present invention.

In the configuration illustrated in FIG. 24, elements that are the same as or similar to those in FIG. 1 are assigned the same numerals. Redundant descriptions are appropriately omitted.

The configuration of the encoding system 300 illustrated in FIG. 24 is different from that illustrated in FIG. 1 in that a video encoding apparatus 301 is provided in place of the multi-viewpoint encoding apparatus 13. In the encoding system 300 illustrated in FIG. 24, image signals of an L image and an R image are encoded in accordance with the AVC encoding scheme instead of the MVC encoding scheme.

More specifically, the video encoding apparatus 301 encodes an image signal of an L image captured using the left-eye image capture apparatus 11 and an image signal of an R image captured using the right-eye image capture apparatus 12 in a predetermined order in accordance with the AVC encoding scheme. The video encoding apparatus 301 outputs encoded data obtained as a result of encoding as a bit stream.

Example Configuration of Video Encoding Apparatus

Figure 25:
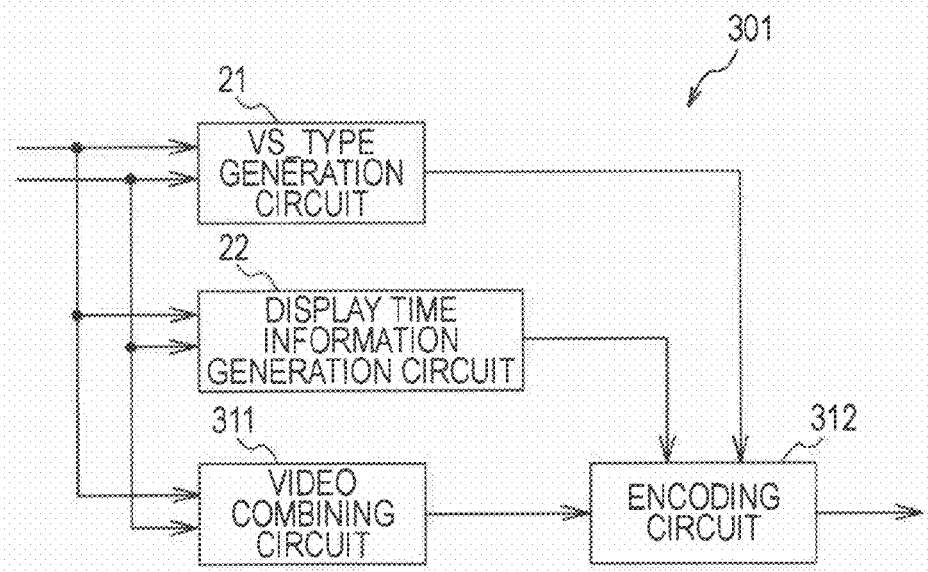
FIG. 25 is a block diagram illustrating an example configuration of a video encoding apparatus illustrated in FIG. 24.

FIG. 25 is a block diagram illustrating an example configuration of the video encoding apparatus 301 illustrated in FIG. 24.

As illustrated in FIG. 25, the video encoding apparatus 301 includes a VS_TYPE generation circuit 21, a display time information generation circuit 22, a video combining circuit 311, and an encoding circuit 312.

In the configuration illustrated in FIG. 25, elements that are the same as or similar to those in FIG. 4 are assigned the same numerals. Redundant descriptions are appropriately omitted.

The video combining circuit 311 supplies consecutively supplies, for each L-R pair, an image signal of an L image captured using the left-eye image capture apparatus 11 and an image signal of an R image captured using the right-eye image capture apparatus 12 to the encoding circuit 312 in a predetermined order.

The encoding circuit 312 encodes an image signal input from the video combining circuit 311 in accordance with the AVC encoding scheme. That is, the encoding circuit 312 consecutively encodes the image signals of the L image and R image in the L-R pair in a predetermined order. Then, the encoding circuit 312 adds the VS_TYPE supplied from the VS_TYPE generation circuit 21 and the display time information supplied from the display time information generation circuit 22 to the encoded data obtained as a result of encoding, and outputs the result as a bit stream.

Example Configuration of Encoding Circuit

Figure 26:
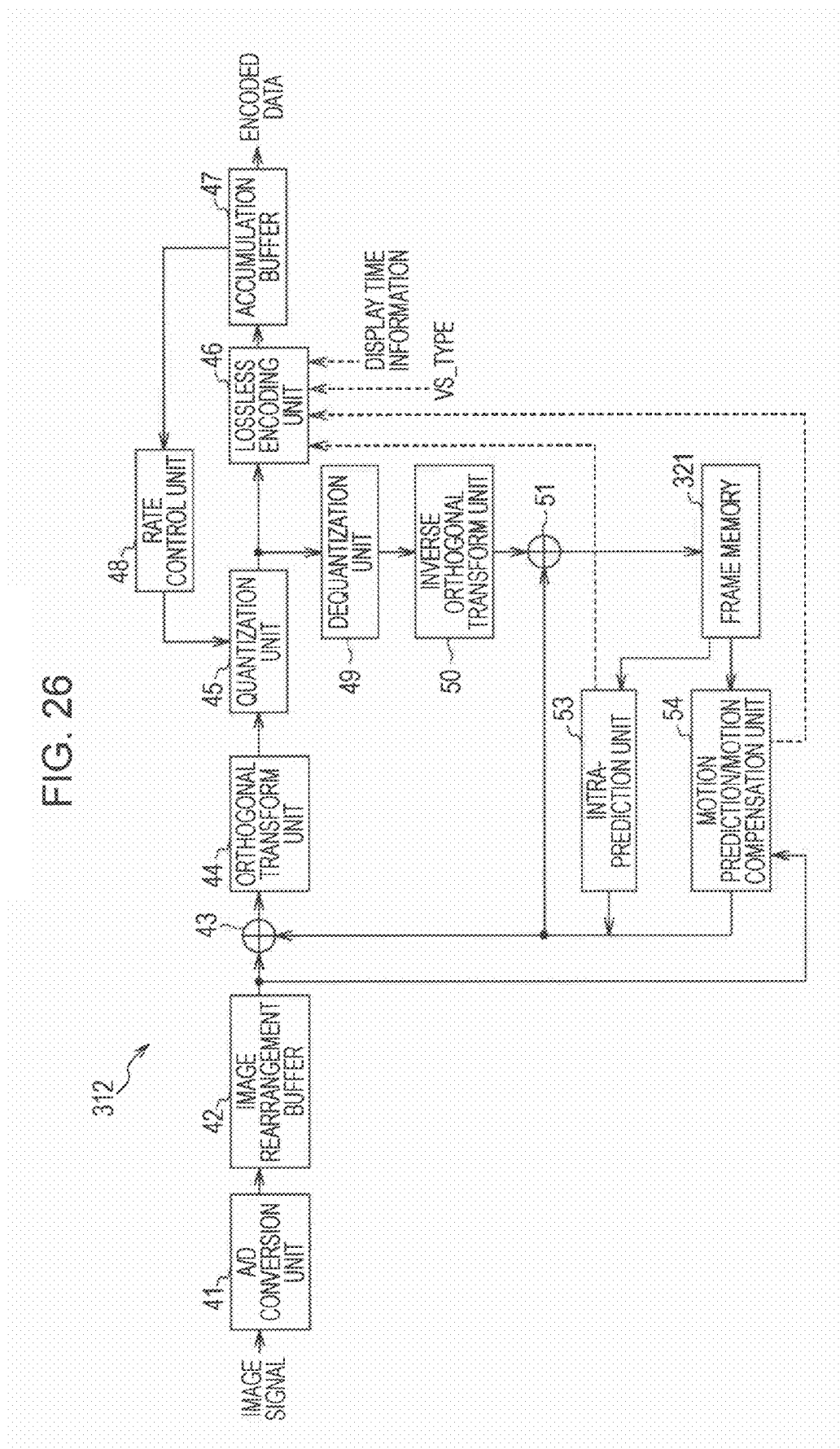
FIG. 26 is a block diagram illustrating an example configuration of an encoding circuit illustrated in FIG. 25.

FIG. 26 is a block diagram illustrating an example configuration of the encoding circuit 312 illustrated in FIG. 25.

In the configuration illustrated in FIG. 26, elements that are the same as or similar to those in FIG. 6 are assigned the same numerals. Redundant descriptions are appropriately omitted.

The configuration of the encoding circuit 312 illustrated in FIG. 26 is different from that of the video encoding circuit 23 illustrated in FIG. 6 in that a frame memory 321 is provided in place of the frame memory 52. The encoding circuit 312 illustrated in FIG. 26 is configured such that a decoded image is used only within the encoding circuit 312.

Description of Process of Video Encoding Apparatus

Figure 27:
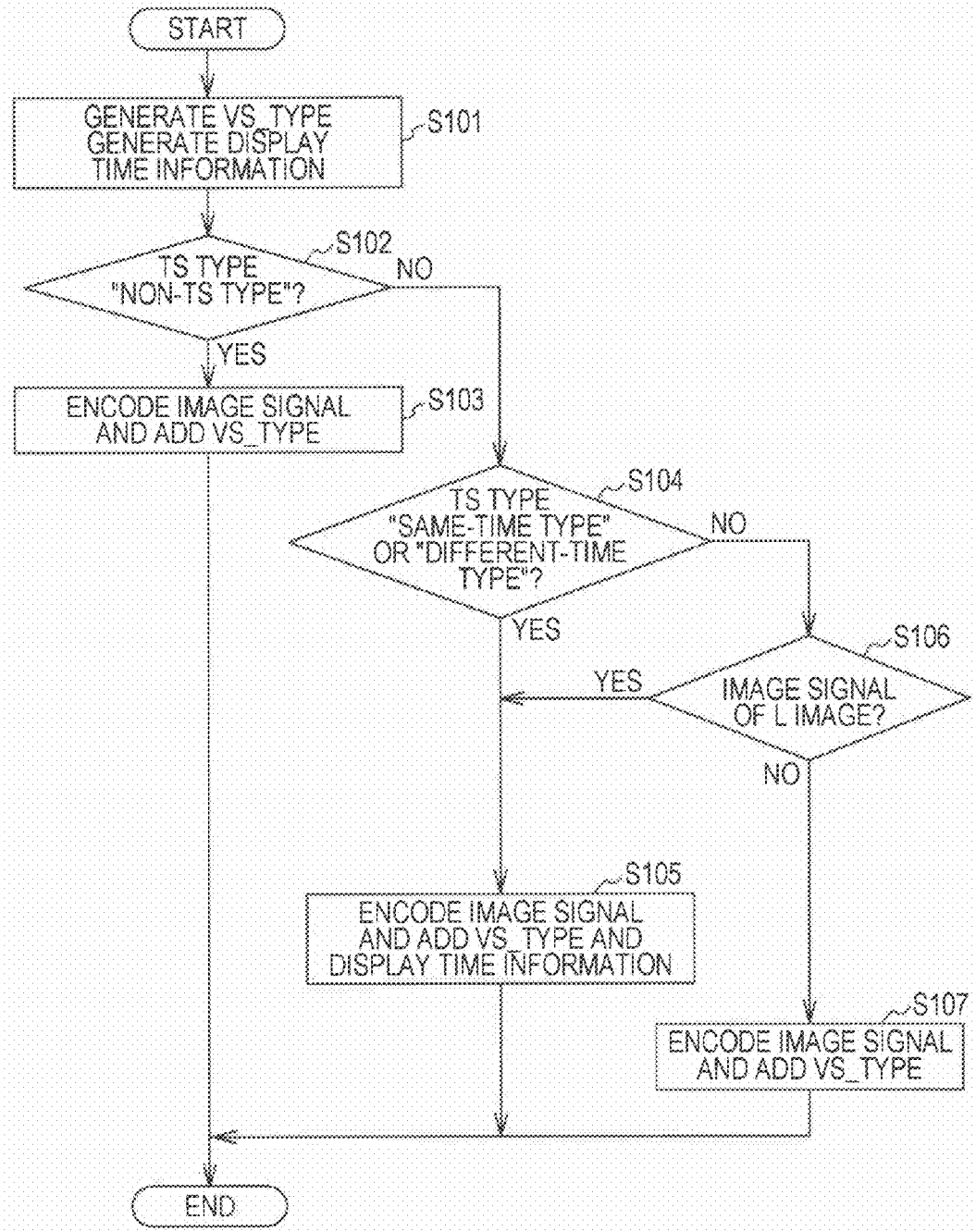
FIG. 27 is a flowchart depicting an encoding process performed by the video encoding apparatus.

FIG. 27 is a flowchart depicting an encoding process performed by the video encoding apparatus 301.

Referring to FIG. 27, in step S101, as in the processing of step S11 in FIG. 10, the VS_TYPE generation circuit 21 generates VS_TYPE on the basis of the input timings of the image signals of the L-R pair. Further, as in the processing of step S11, the display time information generation circuit 22 generates display time information about the L-R pair indicating the same display time or different display times on the basis of the input timings of the image signals of the L-R pair.

In step S102, the lossless encoding unit 46 of the encoding circuit 312 determines whether or not the TS type included in the VS_TYPE supplied from the VS_TYPE generation circuit 21 is the "non-TS type".

If it is determined in step S102 that the TS type is the "non-TS type", then in step S103, the encoding circuit 312 encodes the image signal supplied from the video combining circuit 311, and adds the VS_TYPE supplied from the VS_TYPE generation circuit 21. Then, the encoding circuit 312 outputs the resulting encoded data as a bit stream, and the process ends.

If it is determined in step S102 that the TS type is not the "non-TS type", the process proceeds to step S104. In step S104, the lossless encoding unit 46 of the encoding circuit 312 determines whether or not the TS type included in the VS_TYPE supplied from the VS_TYPE generation circuit 21 is the "same time type" or the "different-time type".

If it is determined in step S104 that the TS type is the "same time type" or the "different-time type", the process proceeds to step S105. In step 5105, the encoding circuit 312 encodes the image signal supplied from the video combining circuit 311, and adds the VS_TYPE supplied from the VS_TYPE generation circuit 21 and the display time information supplied from the display time information generation circuit 22. Then, the encoding circuit 312 outputs the resulting encoded data as a bit stream, and the process ends.

If it is determined in step S104 that the TS type is not the "same-time type" or the "different-time type", that is, the TS type is the "either type", the process proceeds to step S106.

In step S106, the encoding circuit 312 determines whether or not the image signal supplied from the video combining circuit 311 is the image signal of the L image.

If it is determined in step S106 that the image signal is the image signal of the L image, the process proceeds to step S105 described above, and the encoding circuit 312 encodes the image signal of the L image supplied from the video combining circuit 311, and adds the VS_TYPE and the display time information. Then, the encoding circuit 312 outputs the resulting encoded data as a bit stream, the process ends.

If it is determined in step S106 that the image signal is not the image signal of the L image, that is, the image signal is the image signal of the R image, the process proceeds to step S107. In step 5107, the encoding circuit 312 encodes the image signal of the R image supplied from the video combining circuit 311, and adds the VS_TYPE supplied from the VS_TYPE generation circuit 21. Then, the encoding circuit 312 outputs the resulting encoded data as a bit stream, and the process ends.

In the encoding system 300, an image capture apparatus used to capture an L image and an image capture apparatus used to capture an R image are provided separately. However, as in the case illustrated in FIG. 12, an L image and an R image may be captured using a single image capture apparatus.

In the encoding system 300, furthermore, an L image and an R image are output in parallel from the image capture apparatuses. However, as in the case illustrated in FIG. 13 or 17, an L image and an R image may be output serially. In this case, the video encoding apparatus 301 is not provided with the video combining circuit 311.

Example Configuration of Decoding System

Figure 28:
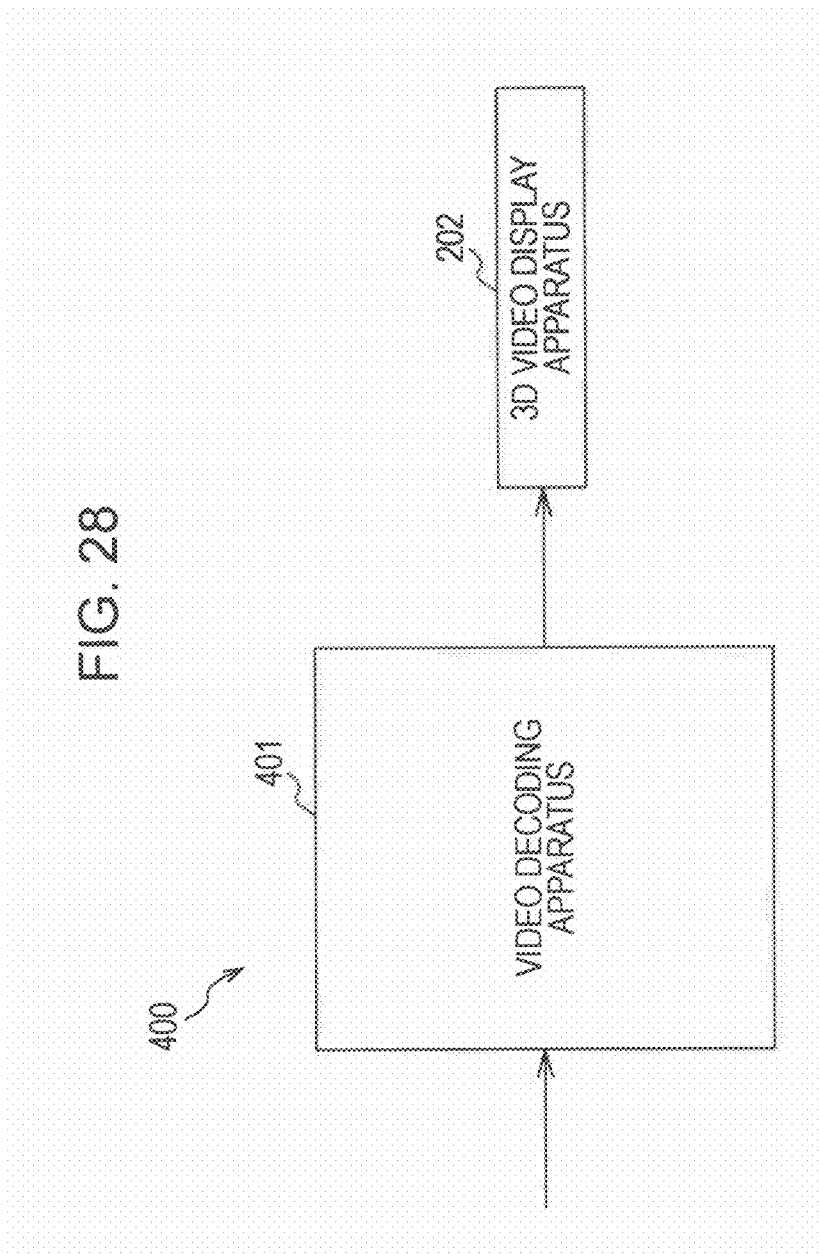
FIG. 28 is a block diagram illustrating an example configuration of a decoding system.

FIG. 28 is a block diagram illustrating an example configuration of a decoding system 400 configured to decode a bit stream output from the encoding system 300 described above.

In the configuration illustrated in FIG. 28, elements that are the same as or similar to those in FIG. 19 are assigned the same numerals. Redundant descriptions are appropriately omitted.

The configuration of the decoding system 400 illustrated in FIG. 28 is different from that illustrated in FIG. 19 in that a video decoding apparatus 401 is provided in place of the multi-viewpoint decoding apparatus 201. In the decoding system 400 illustrated in FIG. 28, a bit stream is decoded in accordance with the scheme corresponding to the AVC encoding scheme instead of the MVC encoding scheme.

The video decoding apparatus 401 decodes a bit stream output from the encoding system 300 using the scheme corresponding to the AVC encoding scheme. The video decoding apparatus 401 outputs image signals of the L-R pair, which are analog signals obtained as a result, to the 3D video display apparatus 202 at different consecutive timings.

Example Configuration of Video Decoding Apparatus

Figure 29:
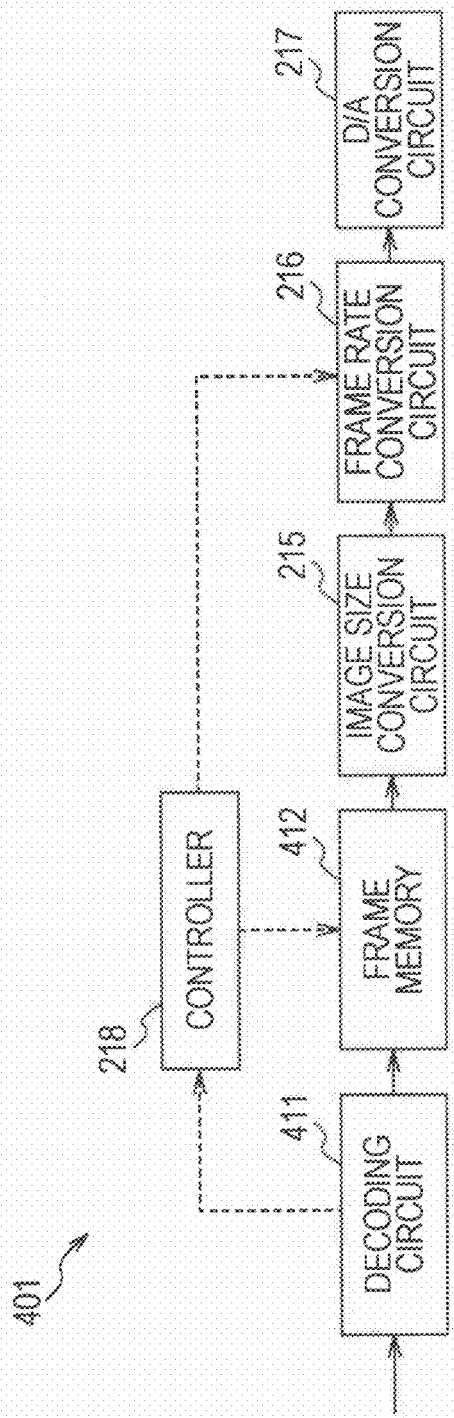
FIG. 29 is a block diagram illustrating an example configuration of a video decoding apparatus illustrated in FIG. 28.

FIG. 29 is a block diagram illustrating an example configuration of the video decoding apparatus 401 illustrated in FIG. 28.

As illustrated in FIG. 29, the video decoding apparatus 401 includes a decoding circuit 411, a frame memory 412, an image size conversion circuit 215, a frame rate conversion circuit 216, a D/A conversion circuit 217, and a controller 218. In the configuration illustrated in FIG. 29, elements that are the same as or similar to those in FIG. 20 are assigned the same numerals. Redundant descriptions are appropriately omitted.

The decoding circuit 411 decodes a bit stream output from the encoding system 300 using the scheme corresponding to the AVC encoding scheme. The decoding circuit 411 supplies image data which is a digital signal obtained as a result of decoding to the frame memory 412. Further, the decoding circuit 411 supplies the VS_TYPE and display time information obtained as a result of decoding to the controller 218.

The frame memory 412 stores the image data supplied from the decoding circuit 411. The frame memory 412 consecutively reads the image data of the L image and the image data of the R image in the L-R pair, which are stored in the frame memory 412, in accordance with the control of the controller 218, and outputs the image data of the L image and the image data of the R image to the image size conversion circuit 215.

Example Configuration of Decoding Circuit

Figure 30:
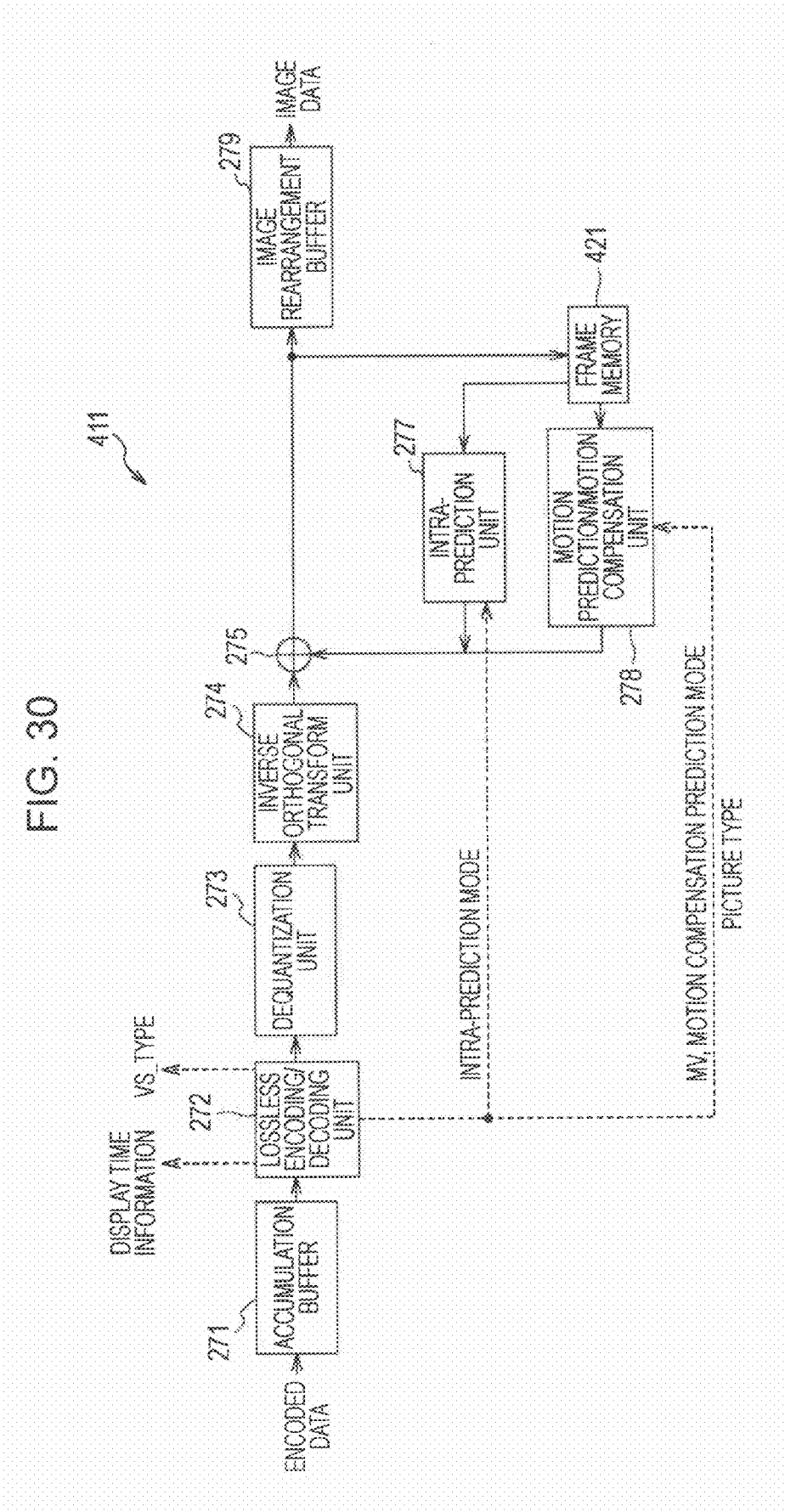
FIG. 30 is a block diagram illustrating an example configuration of a decoding circuit illustrated in FIG. 29.

FIG. 30 is a block diagram illustrating an example configuration of the decoding circuit 411 illustrated in FIG. 29.

In the configuration illustrated in FIG. 30, elements that are the same as or similar to those in FIG. 21 are assigned the same numerals. Redundant descriptions are appropriately omitted.

The configuration of the decoding circuit 411 illustrated in FIG. 30 is different from that of the video decoding circuit 212 illustrated in FIG. 21 in that a frame memory 421 is provided in place of the frame memory 276. The decoding circuit 411 illustrated in FIG. 30 is configured such that a decoded image is used only within the decoding circuit 411.

An embodiment of the present invention may provide a decoding apparatus to which only a 3D video display apparatus configured to display an L-R pair at different consecutive timings can be connected, and may also provide a decoding apparatus to which both a 3D video display apparatus configured to display an L-R pair at different consecutive timings and a 3D video display apparatus configured to simultaneously display an L-R pair can be connected. In this case, the decoding apparatus obtains information indicating the display methods of the 3D video display apparatuses from the 3D video display apparatuses, and performs the display control process described above when the display methods are methods for displaying an L-R pair at different consecutive timings.

In this embodiment, furthermore, VS_TYPE and display time information are added to (described in) encoded data. However, VS_TYPE and display time information may be transmitted (recorded) separately from image data (or a bit stream). Alternatively, VS_TYPE and display time information may be concatenated with image data (or a bit stream).

In this embodiment, the term "concatenating" is defined as follows. The term "concatenating" refers to linking image data (or a bit stream) together with VS_TYPE and display time information. Image data to be concatenated with VS_TYPE and display time information may be transmitted via a transmission path different from that of the VS_TYPE and display time information. Alternatively, image data (or a bit stream) to be concatenated with VS_TYPE and display time information may be recorded on a recording medium (or a recording area in the same recording medium) different from that of the VS_TYPE and display time information. Image data (or a bit stream) may be linked with VS_TYPE and display time information in units of, for example, encoding processes (such as in units of frames or in units of groups of frames).

Description of Computer According to Embodiment of Present Invention

The series of processes described above may be performed by hardware or software. When the series of processes is performed by software, a program constituting the software is installed into a general-purpose computer or the like.

Figure 31:
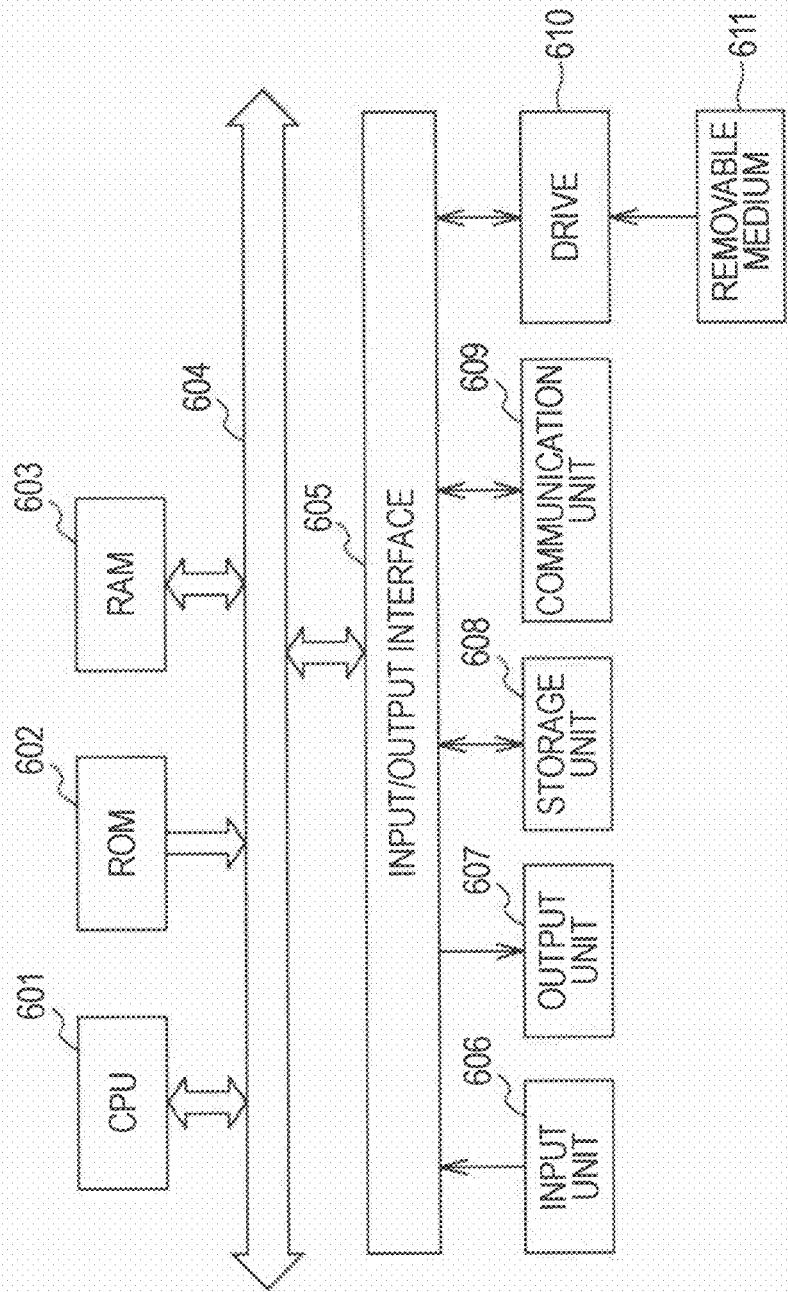
FIG. 31 is a block diagram illustrating an example configuration of a computer according to an embodiment of the present invention.

FIG. 31 illustrates an example configuration of a computer according to an embodiment into which a program for executing the series of processes described above is installed.

The program can be recorded in advance on a storage unit 608 or a read-only memory (ROM) 602 serving as a built-in recording medium of the computer.

Alternatively, the program can be stored in (recorded on) a removable medium 611. The removable medium 611 can be provided as the so-called software package. Examples of the removable medium 611 include a flexible disk, a compact disc read only memory (CD-ROM), a magneto optical (MO) disk, a digital versatile disc (DVD), a magnetic disk, and a semiconductor memory.

The program can be installed into the computer from the removable medium 611 as described above via a drive 610, or can also be downloaded to the computer via a communication network or a broadcast network and installed into the storage unit 608 provided in the computer. That is, for example, the program can be transferred from a download site to the computer through a wireless connection via an artificial satellite for digital satellite broadcasting, or can be transferred to the computer through a wired connection via a network such as a local area network (LAN) or the Internet.

The computer includes a central processing unit (CPU) 601, and the CPU 601 is connected to an input/output interface 605 via a bus 604.

In response to an instruction input via the input/output interface 605 by a user through the operation or the like of an input unit 606, the CPU 601 executes the program stored in the ROM 602 accordingly. Alternatively, the CPU 601 loads the program stored in the storage unit 608 into a random access memory (RAM) 603, and executes the program.

Therefore, the CPU 601 performs processes according to the flowcharts described above or processes performed with the configuration in the block diagrams described above. Then, the CPU 601 causes the process results to be sent as desired, through, for example, the input/output interface 605, such as to be output from an output unit 607, transmitted from a communication unit 609, or recorded on the storage unit 608.

The input unit 606 may include a keyboard, a mouse, and a microphone. The output unit 607 may include a liquid crystal display (LCD) and a speaker.

The computer may not necessarily perform processes according to the program sequentially in the order described herein in form of flowcharts. The processes performed by the computer according to the program may also include processes executed in parallel or individually (for example, parallel processes or object-based processes).

Further, the program may be processed using a single computer (processor) or may be processed in a distributed manner using a plurality of computers. The program may also be transferred to a remote computer and may be executed.

The term "system", as used herein, means an entire apparatus including a plurality of devices.

Embodiments of the present invention are not limited to the embodiments described above, and a variety of modifications can be made without departing from the scope of the present invention.

For example, the encoding system 10 (300) and the decoding system 200 (400) described above may be applied to any desired electronic apparatus. Examples of such an electronic apparatus will be described hereinafter.

Example Configuration of Television Receiver

Figure 32:
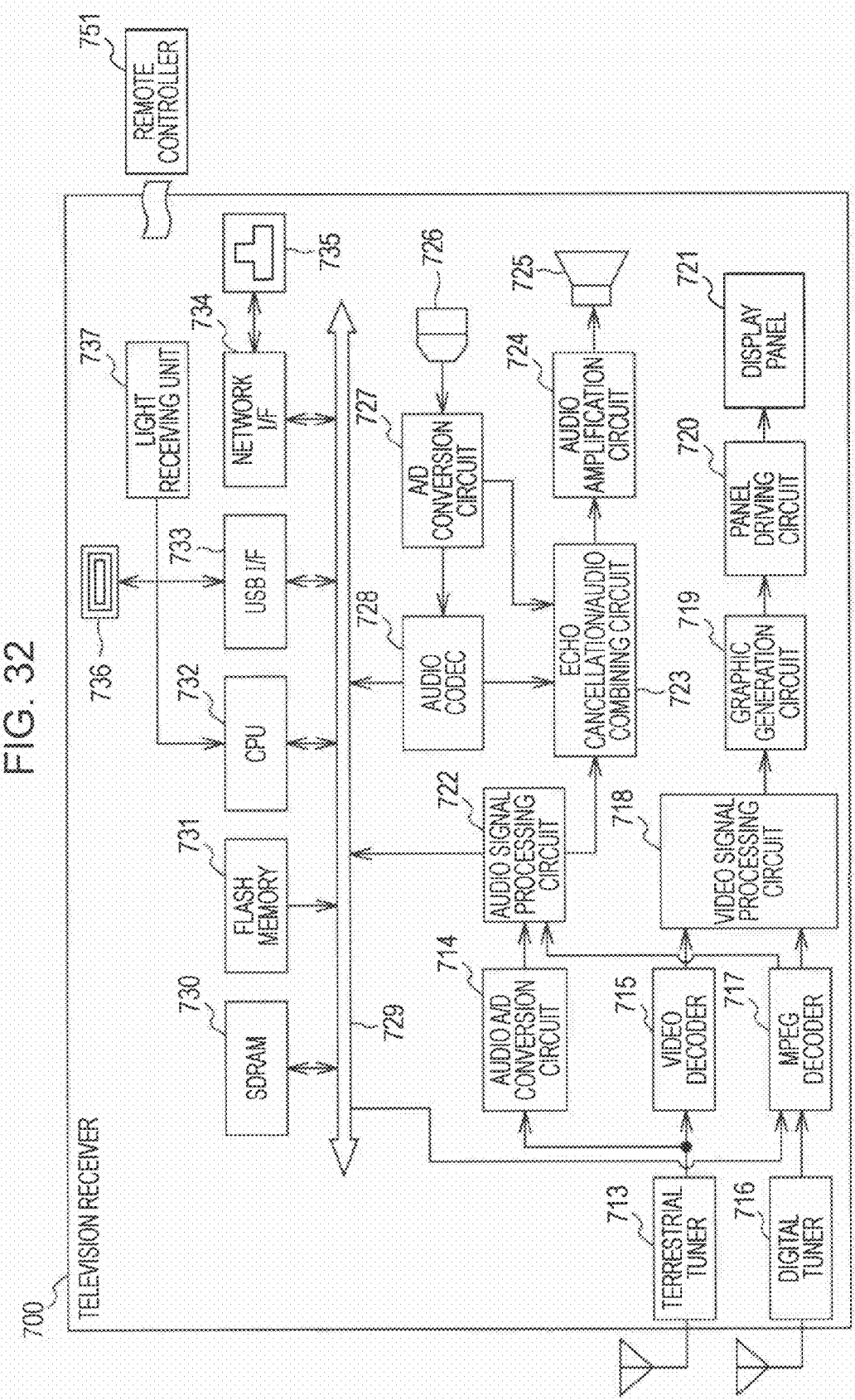
FIG. 32 is a block diagram illustrating an example configuration of main components of a television receiver according to an embodiment of the present invention.

FIG. 32 is a block diagram illustrating an example configuration of main components of a television receiver 700 including a decoding system according to an embodiment of the present invention.

The television receiver 700 illustrated in FIG. 32 obtains a bit stream produced by the encoding system 10 (300) described above as at least a portion of a broadcast signal for digital broadcasting or content data, and displays a stereoscopic image by performing processes similar to those of the decoding system 200 (400).

A terrestrial tuner 713 of the television receiver 700 receives a broadcast wave signal of a terrestrial analog broadcast via an antenna, demodulates the broadcast wave signal, obtains an image signal, and supplies the image signal to a video decoder 715. The video decoder 715 performs a decoding process on the video signal supplied from the terrestrial tuner 713, and supplies a resulting digital component signal to a video signal processing circuit 718.

The video signal processing circuit 718 performs a predetermined process such as noise removal on the video data supplied from the video decoder 715, and supplies the resulting video data to a graphic generation circuit 719.

The graphic generation circuit 719 generates video data of a program to be displayed on a display panel 721, image data produced by a process based on an application supplied via a network, or the like, and supplies the generated video data or image data to a panel driving circuit 720. The graphic generation circuit 719 further performs processes as appropriate such as generating video data (graphic data) for displaying a screen used by a user to select an item or the like, superimposing the generated video data on video data of a program to produce video data, and supplying the resulting video data to the panel driving circuit 720.

The panel driving circuit 720 drives the display panel 721 in accordance with the data supplied from the graphic generation circuit 719 to display the video of the program or various screens described above on the display panel 721.

The video of the program or the like is displayed on the display panel 721 in accordance with the control of the panel driving circuit 720.

The television receiver 700 further includes an audio A/D conversion circuit 714, an audio signal processing circuit 722, an echo cancellation/audio combining circuit 723, an audio amplification circuit 724, and a speaker 725.

The terrestrial tuner 713 obtains a video signal and an audio signal by demodulating a received broadcast wave signal. The terrestrial tuner 713 supplies the obtained audio signal to the audio A/D conversion circuit 714.

The audio A/D conversion circuit 714 performs an A/D conversion process on the audio signal supplied from the terrestrial tuner 713, and supplies a resulting digital audio signal to the audio signal processing circuit 722.

The audio signal processing circuit 722 performs a predetermined process such as noise removal on the audio data supplied from the audio A/D conversion circuit 714, and supplies the resulting audio data to the echo cancellation/audio combining circuit 723.

The echo cancellation/audio combining circuit 723 supplies the audio data supplied from the audio signal processing circuit 722 to the audio amplification circuit 724.

The audio amplification circuit 724 performs a D/A conversion process and an amplification process on the audio data supplied from the echo cancellation/audio combining circuit 723 to adjust the sound volume to a predetermined volume, and then outputs audio from the speaker 725.

The television receiver 700 also includes a digital tuner 716 and an MPEG decoder 717.

The digital tuner 716 receives a broadcast wave signal of a digital broadcast (a terrestrial digital broadcast, a broadcasting satellite (BS)/communications satellite (CS) digital broadcast) via an antenna, demodulates the broadcast wave signal, obtains a Moving Picture Experts Group-Transport Stream (MPEG-TS), and supplies the MPEG-TS to the MPEG decoder 717.

The MPEG decoder 717 descrambles the scrambled MPEG-TS supplied from the digital tuner 716, and extracts a stream including data of a program to be reproduced (viewed). The MPEG decoder 717 decodes audio packets that form the extracted stream, and supplies the obtained audio data to the audio signal processing circuit 722. In addition, the MPEG decoder 717 decodes video packets that form the stream, and supplies the obtained video data to the video signal processing circuit 718. The MPEG decoder 717 further supplies electronic program guide (EPG) data extracted from the MPEG-TS to a CPU 732 via a path (not illustrated).

The video data supplied from the MPEG decoder 717 is subjected to a predetermined process using the video signal processing circuit 718 in a manner similar to that for the video data supplied from the video decoder 715. Then, generated video data or the like is superimposed on the video data subjected to the predetermined process, as desired, using the graphic generation circuit 719, and the resulting video data is supplied to the display panel 721 via the panel driving circuit 720. The corresponding image is displayed.

The television receiver 700 performs a process for, in this manner, decoding video packets and displaying an image on the display panel 721 in a way similar to that of the multi-viewpoint decoding apparatus 201 or the video decoding apparatus 401 described above. Consequently, a natural-looking stereoscopic image of, for example, a program can be displayed.

The audio data supplied from the MPEG decoder 717 is subjected to a predetermined process using the audio signal processing circuit 722 in a manner similar to that for the audio data supplied from the audio A/D conversion circuit 714. Then, the audio data subjected to the predetermined process is supplied to the audio amplification circuit 724 via the echo cancellation/audio combining circuit 723, and is subjected to a D/A conversion process or an amplification process. Consequently, audio adjusted to a predetermined sound volume is output from the speaker 725.

The television receiver 700 further includes a microphone 726 and an A/D conversion circuit 727.

The A/D conversion circuit 727 receives a signal of user's speech captured by the microphone 726 provided in the television receiver 700 for spoken conversation. The A/D conversion circuit 727 performs an A/D conversion process on the received audio signal, and supplies obtained digital audio data to the echo cancellation/audio combining circuit 723.

When audio data of a user (user A) of the television receiver 700 is supplied from the A/D conversion circuit 727, the echo cancellation/audio combining circuit 723 performs echo cancellation on the audio data of the user A. Then, after echo cancellation, the echo cancellation/audio combining circuit 723 causes audio data obtained by, for example, combining the audio data with other audio data to be output from the speaker 725 via the audio amplification circuit 724.

The television receiver 700 further includes an audio codec 728, an internal bus 729, a synchronous dynamic random access memory (SDRAM) 730, a flash memory 731, the CPU 732, a universal serial bus (USB) interface (I/F) 733, and a network I/F 734.

The A/D conversion circuit 727 receives a signal of user's speech captured using the microphone 726 provided in the television receiver 700 for spoken conversation. The A/D conversion circuit 727 performs an A/D conversion process on the received audio signal, and supplies obtained digital audio data to the audio codec 728.

The audio codec 728 converts the audio data supplied from the A/D conversion circuit 727 into data of a predetermined format for transmission via a network, and supplies the resulting audio data to the network I/F 734 via the internal bus 729.

The network I/F 734 is connected to a network via a cable attached to a network terminal 735. The network I/F 734 transmits the audio data supplied from the audio codec 728 to, for example, another apparatus connected to the network. The network I/F 734 receives, for example, audio data transmitted from another apparatus connected via the network via the network terminal 735, and supplies the audio data to the audio codec 728 via the internal bus 729.

The audio codec 728 converts the audio data supplied from the network I/F 734 into data of a predetermined format, and supplies the resulting audio data to the echo cancellation/audio combining circuit 723.

The echo cancellation/audio combining circuit 723 performs echo cancellation on the audio data supplied from the audio codec 728, and causes audio data obtained by, for example, combining the audio data with other audio data to be output from the speaker 725 via the audio amplification circuit 724.

The SDRAM 730 stores various data necessary for the CPU 732 to perform processes.

The flash memory 731 stores the program executed by the CPU 732. The program stored in the flash memory 731 is read by the CPU 732 at a predetermined timing such as when the television receiver 700 is started. The flash memory 731 also stores EPG data obtained via digital broadcasting, data obtained from a predetermined server via a network, and the like.

For example, the flash memory 731 stores MPEG-TS including content data obtained from a predetermined server via a network under the control of the CPU 732. For example, the flash memory 731 supplies the MPEG-TS to the MPEG decoder 717 via the internal bus 729 under the control of the CPU 732.

The MPEG decoder 717 processes the MPEG-TS in a manner similar to that of the MPEG-TS supplied from the digital tuner 716. In this manner, the television receiver 700 can receive content data including video and audio via a network, decode the content data using the MPEG decoder 717, and display the video or output the audio.

The television receiver 700 further includes a light receiving unit 737 that receives an infrared signal transmitted from a remote controller 751.

The light receiving unit 737 receives infrared light from the remote controller 751, demodulates the infrared light to obtain a control code indicating the content of a user operation, and outputs the control code to the CPU 732.

The CPU 732 executes the program stored in the flash memory 731, and controls the overall operation of the television receiver 700 in accordance with the control code supplied from the light receiving unit 737 or the like. The CPU 732 is connected to the individual units of the television receiver 700 via a path (not illustrated).

The USB I/F 733 transmits and receives data to and from a device outside the television receiver 700, which is connected via a USB cable attached to the USB terminal 736. The network I/F 734 is connected to a network via a cable attached to the network terminal 735, and also transmits and receives data other than audio data to and from various apparatuses connected to the network.

Example Configuration of Mobile Phone

Figure 33:
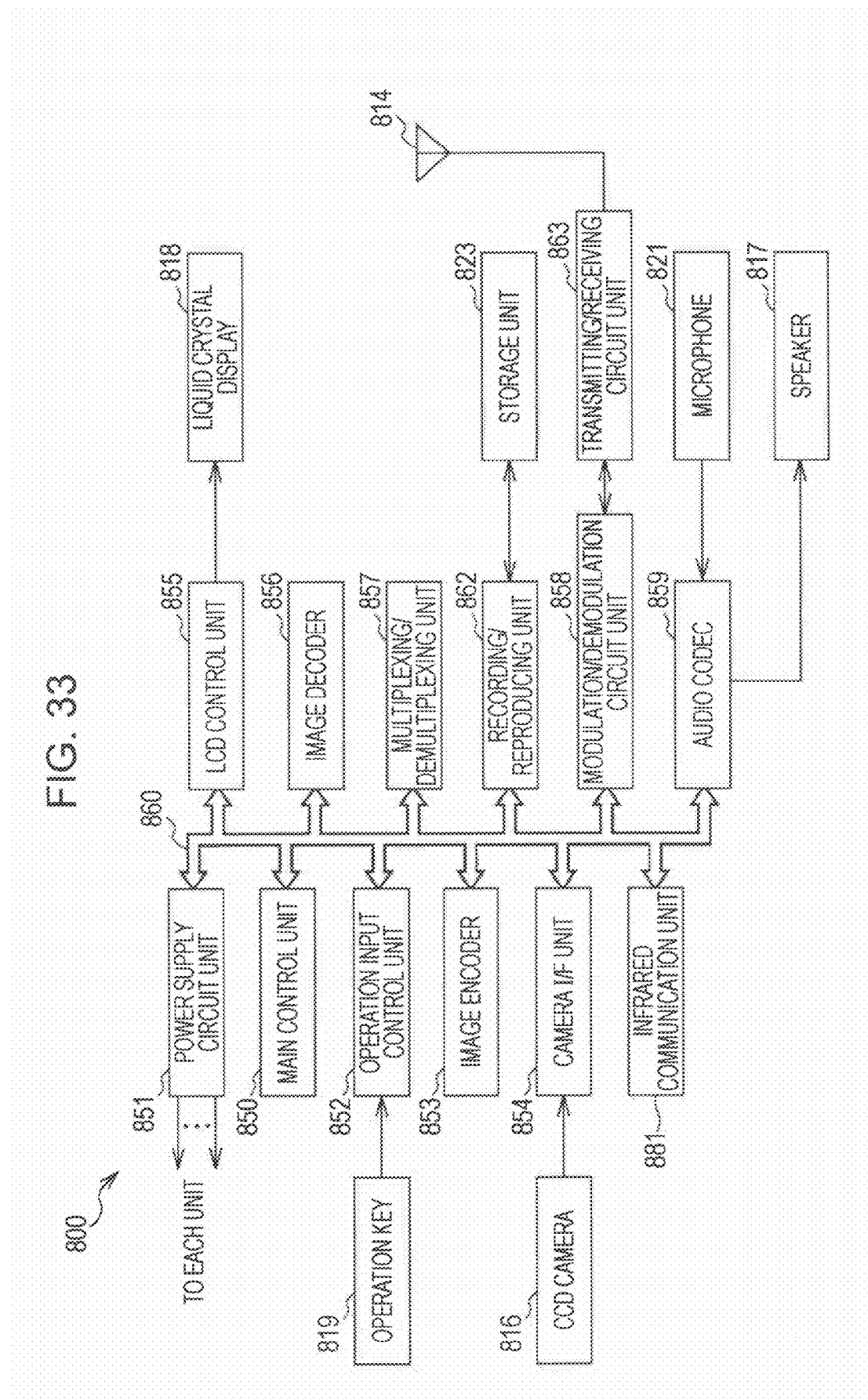
FIG. 33 is a block diagram illustrating an example configuration of main components of a mobile phone according to an embodiment of the present invention.

FIG. 33 is a block diagram illustrating an example configuration of main components of a mobile phone 800 including an encoding system and a decoding system according to an embodiment of the present invention.

The mobile phone 800 illustrated in FIG. 33 performs a process similar to that of the encoding system 10 (300) described above, and obtains a bit stream for displaying a stereoscopic image. Further, the mobile phone 800 receives a bit stream obtained by the encoding system 10 (300) described above, performs a process similar to that of the decoding system 200 (400), and displays a stereoscopic image.

The mobile phone 800 illustrated in FIG. 33 includes a main control unit 850 configured to totally control the respective units, a power supply circuit unit 851, an operation input control unit 852, an image encoder 853, a camera I/F unit 854, an LCD control unit 855, an image decoder 856, a multiplexing/demultiplexing unit 857, a recording/reproducing unit 862, a modulation/demodulation circuit unit 858, and an audio codec 859. The main control unit 850, the power supply circuit unit 851, the operation input control unit 852, the image encoder 853, the camera I/F unit 854, the LCD control unit 855, the image decoder 856, the multiplexing/demultiplexing unit 857, the recording/reproducing unit 862, the modulation/demodulation circuit unit 858, and the audio codec 859 are connected to one another via a bus 860.

The mobile phone 800 further includes an operation key 819, a charge coupled device (CCD) camera 816, a liquid crystal display 818, a storage unit 823, a transmitting/receiving circuit unit 863, an antenna 814, a microphone 821, and a speaker 817.

When a call ends and a power key is turned on by a user operation, the power supply circuit unit 851 supplies power from a battery pack to individual units, thus allowing the mobile phone 800 to operate.

The mobile phone 800 performs various operations such as transmitting and receiving an audio signal, transmitting and receiving electronic mail or image data, photographing an image, and recording data in various modes such as a phone conversation mode and a data communication mode under the control of the main control unit 850 including a CPU, a ROM, and a RAM.

In the mobile phone 800, for example, in the phone conversation mode, the audio codec 859 converts an audio signal picked up by the microphone 821 into digital audio data, and the modulation/demodulation circuit unit 858 performs a spread spectrum process on the audio data. Further, the transmitting/receiving circuit unit 863 performs a digital-to-analog conversion process and a frequency conversion process on the audio data. The mobile phone 800 transmits a transmission signal obtained by the conversion process to a base station (not illustrated) via the antenna 814. The transmission signal (audio signal) transmitted to the base station is supplied to the mobile phone on the other end of the call via a public telephone network.

In the mobile phone 800, furthermore, for example, in the phone conversation mode, the transmitting/receiving circuit unit 863 amplifies a reception signal received by the antenna 814, and further performs a frequency conversion process and an analog-to-digital conversion process. Further, the modulation/demodulation circuit unit 858 performs an inverse spread spectrum process, and the audio codec 859 converts the resulting signal into an analog audio signal. The mobile phone 800 outputs the analog audio signal obtained as a result of conversion from the speaker 817.

Furthermore, for example, in order to transmit electronic mail in the data communication mode, the operation input control unit 852 of the mobile phone 800 receives text data of the electronic mail input through the operation of the operation key 819. In the mobile phone 800, the main control unit 850 processes the text data, and the text data is displayed as an image on the liquid crystal display 818 via the LCD control unit 855.

Further, in the mobile phone 800, the main control unit 850 generates electronic mail data in accordance with the text data received by the operation input control unit 852, a user instruction, or the like. In the mobile phone 800, the modulation/demodulation circuit unit 858 performs a spread spectrum process on the electronic mail data, and the transmitting/receiving circuit unit 863 performs a digital-to-analog conversion process and a frequency conversion process. The mobile phone 800 transmits a transmission signal obtained by the conversion process to a base station (not illustrated) via the antenna 814. The transmission signal (electronic mail) transmitted to the base station is supplied to a predetermined destination via a network, a mail server, and the like.

Further, for example, when electronic mail is received in the data communication mode, the transmitting/receiving circuit unit 863 of the mobile phone 800 receives a signal transmitted from the base station via the antenna 814, amplifies the signal, and further performs a frequency conversion process and an analog-to-digital conversion process. In the mobile phone 800, the modulation/demodulation circuit unit 858 performs an inverse spread spectrum process on the received signal to recover the original electronic mail data. In the mobile phone 800, the recovered electronic mail data is displayed on the liquid crystal display 818 via the LCD control unit 855.

The mobile phone 800 can also be configured to record (or store) received electronic mail data on the storage unit 823 via the recording/reproducing unit 862.

The storage unit 823 may be any rewritable storage medium. The storage unit 823 may be a semiconductor memory such as a RAM or a built-in flash memory, a hard disk, or a removable medium such as a magnetic disk, a magneto-optical disk, an optical disk, a USB memory, or a memory card. It is to be understood that any other storage medium may also be used.

Further, for example, when image data is transmitted in the data communication mode, the CCD camera 816 of the mobile phone 800 generates image data by capturing an image. The CCD camera 816 includes optical devices such as a lens and an aperture, and a CCD sensor serving as a photoelectric conversion element, and is configured to capture an image of an object, convert the intensity of received light into an electrical signal, and generate image data of the image of the object. The image data is converted into encoded image data using the image encoder 853 via the camera I/F unit 854 by compression and encoding using a predetermined encoding scheme such as MVC or AVC.

In the above manner, the mobile phone 800 performs a process similar to that of the multi-viewpoint encoding apparatus 13 (122) or the video encoding apparatus 301 described above as a process for compressing and encoding image data generated by image capture. Consequently, a natural-looking stereoscopic image of a captured image can be displayed during decoding.

In the mobile phone 800, the multiplexing/demultiplexing unit 857 multiplexes the encoded image data supplied from the image encoder 853 and the digital audio data supplied from the audio codec 859 using a predetermined scheme. In the mobile phone 800, the modulation/demodulation circuit unit 858 performs a spread spectrum process on the resulting multiplexed data, and the transmitting/receiving circuit unit 863 performs a digital-to-analog conversion process and a frequency conversion process. The mobile phone 800 transmits a transmission signal obtained by the conversion process to a base station (not illustrated) via the antenna 814. The transmission signal (image data) transmitted to the base station is supplied to the other end of the call via the network or the like.

When no image data is transmitted, the mobile phone 800 can display image data generated by the CCD camera 816 or the like on the liquid crystal display 818 via the LCD control unit 855 without using the image encoder 853.

Further, for example, when data of a moving image file linked to a simple homepage or the like is received in the data communication mode, in the mobile phone 800, the transmitting/receiving circuit unit 863 receives a signal transmitted from the base station via the antenna 814, amplifies the signal, and further performs a frequency conversion process and an analog-to-digital conversion process. In the mobile phone 800, the modulation/demodulation circuit unit 858 performs an inverse spread spectrum process on the received signal to recover original multiplexed data. In the mobile phone 800, the multiplexing/demultiplexing unit 857 demultiplexes the multiplexed data into encoded image data and audio data.

In the mobile phone 800, the image decoder 856 decodes the encoded image data using a predetermined encoding scheme such as MVC or AVC to generate reproduction moving image data, and displays the reproduction moving image data on the liquid crystal display 818 via the LCD control unit 855. Thus, for example, moving image data included in the moving image file linked to the simple homepage is displayed on the liquid crystal display 818.

In the above manner, the mobile phone 800 performs a process for decoding encoded image data and displaying the decoded image data on the liquid crystal display 818 in a way similar to that of the multi-viewpoint decoding apparatus 201 or the video decoding apparatus 401 described above. Consequently, for example, a natural-looking stereoscopic image corresponding to the moving image file linked to the simple homepage can be displayed.

As in the case of electronic mail, the mobile phone 800 can also be configured to record (or store) received data linked to the simple homepage or the like on the storage unit 823 via the recording/reproducing unit 862.

Further, the mobile phone 800 can be configured such that the main control unit 850 analyzes a two-dimensional code obtained by the CCD camera 816 through image capture, thereby obtaining information recorded in the two-dimensional code.

Further, the mobile phone 800 can be configured to communicate with an external device via infrared transmission using an infrared communication unit 881.

While the mobile phone 800 including the CCD camera 816 has been described, the mobile phone 800 may include a complementary metal oxide semiconductor (CMOS) based image sensor (a CMOS image sensor) in place of the CCD camera 816. In this case, as in the use of the CCD camera 816, the mobile phone 800 can also capture an image of an object and can generate image data of the image of the object.

While the foregoing description has been given of the mobile phone 800, any apparatus having an image capture function or a communication function similar to that of the mobile phone 800, such as a personal digital assistants (PDA), a smartphone, an ultra mobile personal computer (UMPC), a netbook, or a notebook PC may employ the encoding system and decoding system described above in a manner similar to that of the mobile phone 800.

Example Configuration of Hard Disk Recorder

Figure 34:
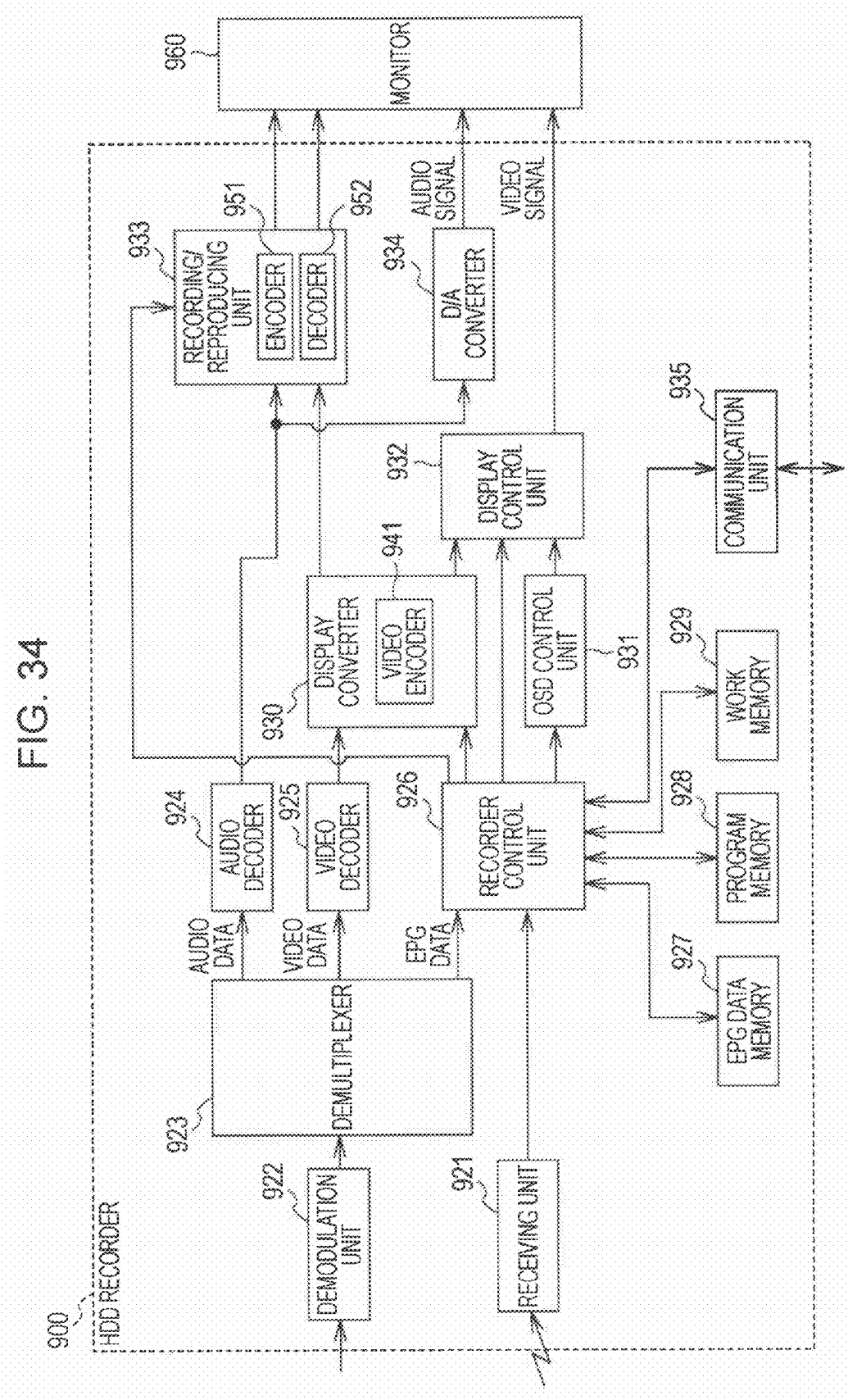
FIG. 34 is a block diagram illustrating an example configuration of main components of a hard disk recorder according to an embodiment of the present invention.

FIG. 34 is a block diagram illustrating an example configuration of main components of a hard disk recorder (HDD recorder) 900 including a decoding system according to an embodiment of the present invention and a monitor 960.

The hard disk recorder 900 illustrated in FIG. 34 obtains a bit stream produced by the encoding system 10 (300) described above as a portion of a broadcast wave signal (television signal) or the like that is received by a tuner and that is transmitted using a satellite or terrestrial antenna or any other suitable device, and saves the bit stream in a built-in hard disk. Then, the hard disk recorder 900 performs a process similar to that of the decoding system 200 (400) using the saved bit stream at a timing according to a user instruction, so that a stereoscopic image is displayed on the monitor 960.

The hard disk recorder 900 includes a receiving unit 921, a demodulation unit 922, a demultiplexer 923, an audio decoder 924, a video decoder 925, and a recorder control unit 926. The hard disk recorder 900 further includes an EPG data memory 927, a program memory 928, a work memory 929, a display converter 930, an on-screen display (OSD) control unit 931, a display control unit 932, a recording/reproducing unit 933, a D/A converter 934, and a communication unit 935.

The display converter 930 includes a video encoder 941. The recording/reproducing unit 933 includes an encoder 951 and a decoder 952.

The receiving unit 921 receives an infrared signal from a remote controller (not illustrated), converts the infrared signal into an electrical signal, and outputs the electrical signal to the recorder control unit 926. The recorder control unit 926 may be formed of, for example, a microprocessor or the like, and executes various processes in accordance with a program stored in the program memory 928. In this case, the recorder control unit 926 uses the work memory 929 as necessary.

The communication unit 935 is connected to a network, and performs a communication process with another apparatus via the network. For example, the communication unit 935 is controlled by the recorder control unit 926 to communicate with a tuner (not illustrated), and outputs a channel selection control signal mainly to the tuner.

The demodulation unit 922 demodulates a signal supplied from the tuner, and outputs the demodulated signal to the demultiplexer 923. The demultiplexer 923 demultiplexes the data supplied from the demodulation unit 922 into audio data, video data, and EPG data, and outputs the audio data, the video data, and the EPG data to the audio decoder 924, the video decoder 925, and the recorder control unit 926, respectively.

The audio decoder 924 decodes the input audio data using, for example, an MPEG method, and outputs the decoded audio data to the recording/reproducing unit 933. The video decoder 925 decodes the input video data using, for example, an MPEG method, and outputs the decoded video data to the display converter 930. The recorder control unit 926 supplies the input EPG data to the EPG data memory 927 so that the EPG data is stored in the EPG data memory 927.

The display converter 930 encodes the video data supplied from the video decoder 925 or the recorder control unit 926 into, for example, National Television Standards Committee (NTSC) video data by using the video encoder 941, and outputs the video data to the recording/reproducing unit 933.

In the above manner, the hard disk recorder 900 performs a process similar to that of the multi-viewpoint encoding apparatus 13 (122) or the video encoding apparatus 301 described above as a process for encoding video data. Consequently, a natural-looking stereoscopic image of a program can be displayed during decoding and reproduction.

Further, the display converter 930 converts the screen size of the video data supplied from the video decoder 925 or the recorder control unit 926 to the size corresponding to the size of the monitor 960. The display converter 930 further converts the video data whose screen size has been converted into NTSC video data by using the video encoder 941, converts the video data into an analog signal, and outputs the resulting signal to the display control unit 932.

Under the control of the recorder control unit 926, the display control unit 932 superimposes an OSD signal output from the OSD control unit 931 on the video signal input from the display converter 930, and outputs the resulting video signal to the display of the monitor 960 to display the corresponding image.

In the above manner, the hard disk recorder 900 performs a process similar to that of the multi-viewpoint decoding apparatus 201 or the video decoding apparatus 401 described above as a process for decoding video data and displaying an image on the monitor 960. Consequently, for example, a natural-looking stereoscopic image of a program can be displayed.

The audio data output from the audio decoder 924 is converted into an analog signal using the D/A converter 934, and the analog signal is supplied to the monitor 960. The monitor 960 outputs the audio signal from a built-in speaker.

The recording/reproducing unit 933 includes a hard disk as a storage medium on which video data, audio data, and the like are recorded.

The recording/reproducing unit 933 encodes, for example, the audio data supplied from the audio decoder 924 using an MPEG method by using the encoder 951. Further, the recording/reproducing unit 933 encodes the video data supplied from the video encoder 941 of the display converter 930 using an MPEG method by using the encoder 951. The recording/reproducing unit 933 combines the encoded audio data with the encoded video data by using a multiplexer. The recording/reproducing unit 933 performs channel coding on the combined data, amplifies the resulting data, and writes the amplified data in the hard disk using a recording head.

The recording/reproducing unit 933 reproduces the data recorded on the hard disk using a reproduction head, amplifies the reproduced data, and demultiplexes the amplified data into audio data and video data by using a demultiplexer. The recording/reproducing unit 933 decodes the audio data and the video data using an MPEG method by using the decoder

952. The recording/reproducing unit 933 performs D/A conversion on the decoded audio data, and outputs the resulting audio data to a speaker of the monitor 960. Further, the recording/reproducing unit 933 performs D/A conversion on the decoded video data, and outputs the resulting video data to the display of the monitor 960.

The recorder control unit 926 reads the latest date EPG data from the EPG data memory 927 in accordance with a user instruction indicated by the infrared signal received from the remote controller via the receiving unit 921, and supplies the EPG data to the OSD control unit 931. The OSD control unit 931 generates image data corresponding to the input EPG data, and outputs the image data to the display control unit 932. The display control unit 932 outputs the video data input from the OSD control unit 931 to the display of the monitor 960 to display an image. Thus, an EPG is displayed on the display of the monitor 960.

The hard disk recorder 900 can also be configured to obtain various data such as video data, audio data, and EPG data supplied from other apparatuses via a network such as the Internet.

The communication unit 935 is controlled by the recorder control unit 926 to obtain encoded data of video data, audio data, EPG data, and the like transmitted from other apparatuses via a network, and supplies the obtained encoded data to the recorder control unit 926. For example, the recorder control unit 926 supplies the obtained encoded video or audio data to the recording/reproducing unit 933 to store the encoded data in the hard disk. In this case, the recorder control unit 926 and the recording/reproducing unit 933 may perform a process such as re-encoding, as desired.

Further, the recorder control unit 926 decodes the obtained encoded video or audio data, and supplies the obtained video data to the display converter 930. The display converter 930 processes the video data supplied from the recorder control unit 926 in a manner similar to that for the video data supplied from the video decoder 925, and supplies the video data to the monitor 960 via the display control unit 932 to display an image of the video data.

Furthermore, in accordance with the display of the image, the recorder control unit 926 may supply the decoded audio data to the monitor 960 via the D/A converter 934 and may output sound of the audio data from the speaker.

Further, the recorder control unit 926 decodes the obtained encoded EPG data, and supplies the decoded EPG data to the EPG data memory 927.

While the hard disk recorder 900 configured to record video data or audio data on a hard disk has been described, any recording medium may be used. A recorder that uses a recording medium other than a hard disk, such as a flash memory, an optical disk, or a video tape, may also employ the encoding system and decoding system described above in a manner similar to that of the hard disk recorder 900.

Example Configuration of Camera

Figure 35:
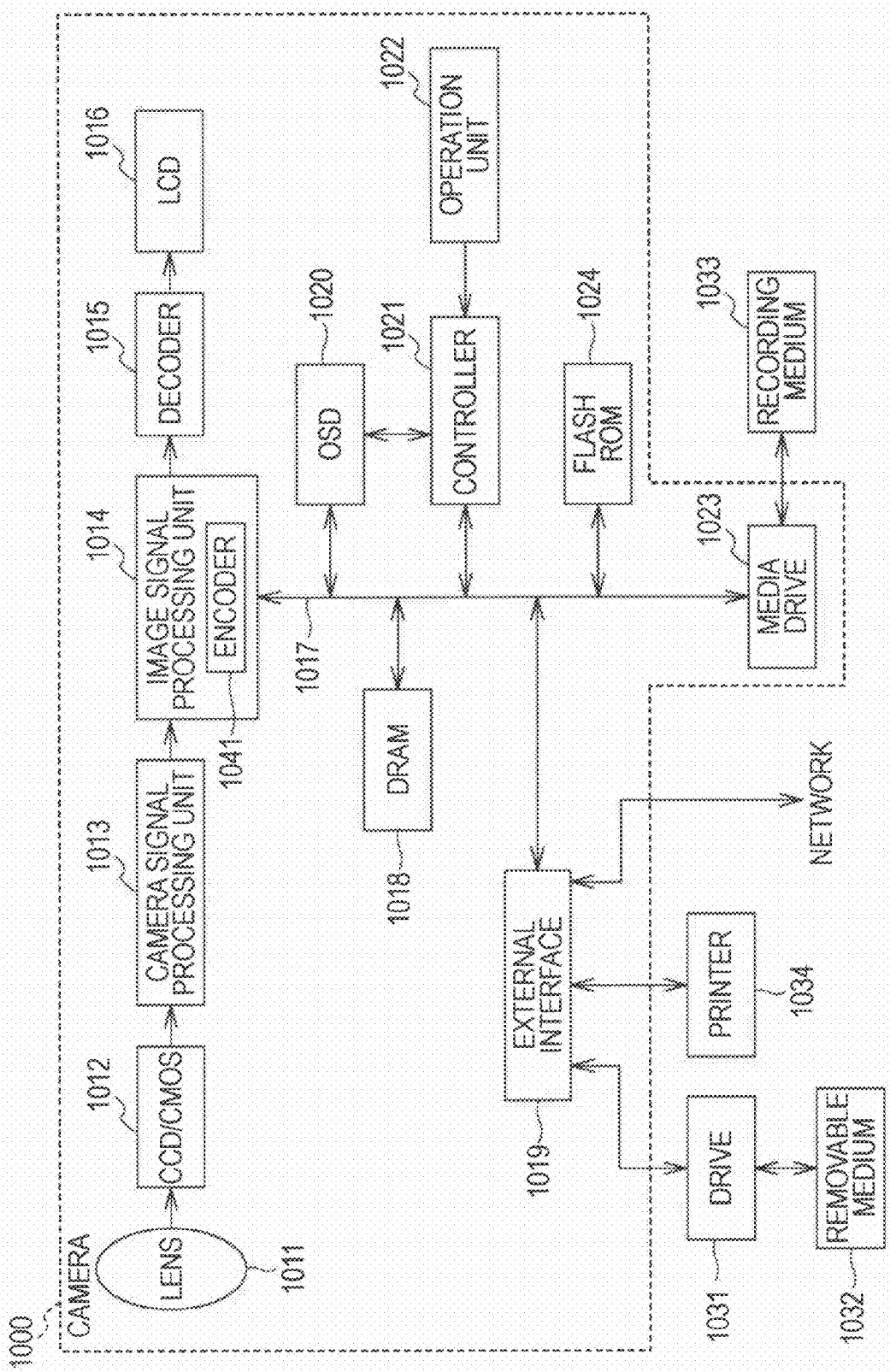
FIG. 35 is a block diagram illustrating an example configuration of main components of a camera according to an embodiment of the present invention.

FIG. 35 is a block diagram illustrating an example configuration of main components of a camera 1000 including an encoding system and a decoding system according to an embodiment of the present invention.

The camera 1000 illustrated in FIG. 35 performs a process similar to that of the encoding system 10 (300), and obtains a bit stream. The camera 1000 further performs a process similar to that of the decoding system 200 (400), and displays a stereoscopic image using the bit stream.

A lens block 1011 of the camera 1000 allows light (that is, video of an object) to enter a CCD/CMOS 1012. The CCD/CMOS 1012 may be a CCD- or CMOS-based image sensor, and is configured to convert the intensity of the received light into an electrical signal and to supply the electrical signal to a camera signal processing unit 1013.

The camera signal processing unit 1013 converts the electrical signal supplied from the CCD/CMOS 1012 into color difference signals, namely, Y, Cr, and Cb signals, and supplies the color difference signals to an image signal processing unit 1014. Under the control of a controller 1021, the image signal processing unit 1014 performs a predetermined image process on the image signals supplied from the camera signal processing unit 1013 or encodes the image signals using a scheme such as AVC or MVC using an encoder 1041.

In the above manner, the camera 1000 performs a process similar to that of the multi-viewpoint encoding apparatus 13 (122) or the video encoding apparatus 301 described above as a process for encoding an image signal generated by image capture. Consequently, a natural-looking stereoscopic image of a captured image can be displayed during decoding.

The image signal processing unit 1014 supplies encoded data generated by encoding the image signals to a decoder 1015. The image signal processing unit 1014 further obtains display data generated by an OSD 1020, and supplies the display data to the decoder 1015.

In the above process, the camera signal processing unit 1013 uses a dynamic random access memory (DRAM) 1018 connected via a bus 1017, as appropriate, and holds image data, encoded data produced by encoding the image data, or the like in the DRAM 1018.

The decoder 1015 decodes the encoded data supplied from the image signal processing unit 1014, and supplies obtained image data (decoded image data) to an LCD 1016. Further, the decoder 1015 supplies the display data supplied from the image signal processing unit 1014 to the LCD 1016. The LCD 1016 appropriately combines an image of decoded image data supplied from the decoder 1015 and an image of the display data supplied from the decoder 1015, and displays a resulting combined image.

In the above manner, the camera 1000 performs a process similar to that of the multi-viewpoint decoding apparatus 201 or the video decoding apparatus 401 described above as a process for decoding encoded data and displaying a resulting image on the LCD 1016. Consequently, for example, a natural-looking stereoscopic image of a captured image can be displayed.

Under the control of the controller 1021, the OSD 1020 outputs display data such as a menu screen or an icon, including symbols, characters, and figures, to the image signal processing unit 1014 via the bus 1017.

The controller 1021 executes various processes in accordance with a signal indicating an instruction given by a user using an operation unit 1022, and controls the image signal processing unit 1014, the DRAM 1018, an external interface 1019, the OSD 1020, a media drive 1023, and other suitable devices via the bus 1017. A Flash ROM 1024 stores a program, data, and other information necessary for the controller 1021 to execute various processes.

For example, the controller 1021 instead of the image signal processing unit 1014 or the decoder 1015 can encode image data stored in the DRAM 1018 or can decode encoded data stored in the DRAM 1018. In this case, the controller 1021 may perform an encoding and decoding process using a scheme similar to that of the encoding and decoding process of the image signal processing unit 1014 or the decoder 1015, or may perform an encoding and decoding process using a scheme that is not supported by the image signal processing unit 1014 or the decoder 1015.

Further, for example, when an instruction to start printing an image is issued from the operation unit 1022, the controller 1021 reads image data from the DRAM 1018, and supplies the image data to a printer 1034 connected to the external interface 1019 via the bus 1017 to print an image corresponding to the image data.

Further, for example, when an instruction to record an image is issued from the operation unit 1022, the controller 1021 reads encoded data from the DRAM 1018, and supplies the encoded data to a recording medium 1033 attached to the media drive 1023 via the bus 1017 to store the encoded data in the recording medium 1033.

The recording medium 1033 may be any readable and writable removable medium such as a magnetic disk, a magneto-optical disk, an optical disk, or a semiconductor memory. The recording medium 1033 may be any kind of removable medium, and may be a tape device, a disk, or a memory card. A contactless IC card or the like may also be used.

Furthermore, the media drive 1023 and the recording medium 1033 may be integrated into, for example, a non-portable storage medium such as a built-in hard disk drive or a solid state drive (SSD).

The external interface 1019 may be formed of, for example, a USB input/output terminal or the like, and may be connected to the printer 1034 when an image is printed. Further, a drive 1031 may further be connected to the external interface 1019, as desired. A removable medium 1032 such as a magnetic disk, an optical disk, or a magneto-optical disk may be attached to the drive 1031, as desired, so that a computer program read from the removable medium 1032 is installed into the Flash ROM 1024 as necessary.

The external interface 1019 further includes a network interface that is connected to a predetermined network such as a LAN or the Internet. For example, in accordance with an instruction from the operation unit 1022, the controller 1021 can read encoded data from the DRAM 1018, and can supply the read data from the external interface 1019 to another apparatus connected via a network. The controller 1021 can further obtain encoded data or image data supplied from another apparatus via a network through the external interface 1019, and can hold the obtained data in the DRAM 618 or supply the obtained data to the image signal processing unit 1014.

Image data captured by the camera 1000 may be a moving image or a still image.

It is to be understood that the encoding system 10 (300) and the decoding system 200 (400) described above may also be used in an apparatus other than that described above or in a system.

The present application contains subject matter related to that disclosed in Japanese Priority Patent Application JP 2009-239708 filed in the Japan Patent Office on Oct. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
receiving processing circuitry configured to receive an encoded stream, an image capture type, and image capturing order information, the encoded stream being produced by encoding image data of multi-viewpoint images including images from a first viewpoint and images from a second viewpoint that form a stereoscopic image, the image capture type indicating that the images from the first viewpoint have been captured at different timings than the images from the second viewpoint, the image capturing order information indicating an image capturing order in which the multi-viewpoint images have been captured;
decoding processing circuitry configured to decode the encoded stream received by the receiving processing circuitry to generate image data; and
control processing circuitry configured to control a display apparatus to display the multi-viewpoint images corresponding to the image data generated by the decoding processing circuitry in the same order as the image capturing order in accordance with the image capture type and image capturing order information received by the receiving processing circuitry.

2. The image processing apparatus according to claim 1, further comprising determining processing circuitry configured to determine display times at which the multi-viewpoint images corresponding to the image data generated by the decoding processing circuitry are displayed in accordance with the image capture type and image capturing order information received by the receiving processing circuitry,
wherein the control processing circuitry is configured to control the display apparatus to display the multi-viewpoint images in accordance with the display times determined by the determining processing circuitry.

3. The image processing apparatus according to claim 1, wherein the receiving processing circuitry is configured to receive an addition type of display times at which multi-viewpoint images corresponding to the image data are displayed, and also to receive the display times according to the addition type, and
wherein the control processing circuitry is configured to control the display apparatus to display the multi-viewpoint images corresponding to the image data generated by the decoding processing circuitry in the same order as the image capturing order in accordance with the addition type and display times received by the receiving processing circuitry.

4. The image processing apparatus according to claim 3, wherein the addition type includes,
a type in which no display time is added to image data of images from any of the multiple viewpoints in the stereoscopic image,
a type in which an identical display time is added to image data of images from all the multiple viewpoints in the stereoscopic image,
a type in which a display time is added to image data of an image of one of the multiple viewpoints in the stereoscopic image, and
a type in which different display times are added to image data of the images from the multiple viewpoints in the stereoscopic image.

5. The image processing apparatus according to claim 1, wherein when a display method of the display apparatus is a method in which the multi-viewpoint images are displayed at different consecutive timings, the control processing circuitry is configured to control the display apparatus to display the multi-viewpoint images corresponding to the image data generated by the decoding processing circuitry in the same order as the image capturing order in accordance with the image capture type and image capturing order information received by the receiving processing circuitry.

6. The image processing apparatus according to claim 1, wherein the image capture type and the image capturing order information are included in the encoded stream, and wherein the receiving processing circuitry obtains the image capture type and the image capturing order information from the encoded stream.

7. The image processing apparatus according to claim 1, wherein the image capture type indicates that the multi-viewpoint images have been captured at different consecutive timings.

8. The image processing apparatus according to claim 1, wherein the multi-viewpoint images are images captured at different consecutive timings.

9. The image processing apparatus according to claim 1, wherein the multi-viewpoint images form a stereo image including a left image observed with a left eye and a right image observed with a right eye.

10. An image processing method for an image processing apparatus, comprising the steps of:
receiving an encoded stream, an image capture type, and image capturing order information, the encoded stream being produced by encoding image data of multi-viewpoint images including images from a first viewpoint and images from a second viewpoint that form a stereoscopic image, the image capture type indicating that the images from the first viewpoint have been captured at different timings than the images from the second viewpoint, the image capturing order information indicating an image capturing order in which the multi-viewpoint images have been captured;
decoding the encoded stream received in the step of receiving to generate image data; and
controlling a display apparatus to display the multi-viewpoint images corresponding to the image data generated in the step of decoding in the same order as the image capturing order in accordance with the image capture type and image capturing order information received in the step of receiving.

11. An image processing apparatus comprising:
encoding processing circuitry configured to encode image data of multi-viewpoint images including images from a first viewpoint and images from a second viewpoint that form a stereoscopic image to generate an encoded stream; and
transmitting processing circuitry configured to transmit the encoded stream generated by the encoding processing circuitry in such a manner that an image capture type and image capturing order information are concatenated with the encoded stream, the image capture type indicating that the images from the first viewpoint have been captured at different timings than the images from the second viewpoint, the image capturing order information indicating an image capturing order in which the multi-viewpoint images have been captured.

12. The image processing apparatus according to claim 11, wherein the transmitting processing circuitry is configured to transmit the encoded stream generated by the encoding processing circuitry in such a manner that an addition type of display times at which images corresponding to the image data are displayed and the display times according to the addition type are concatenated with the encoded stream.

13. The image processing apparatus according to claim 12, wherein the addition type includes,
a type in which no display time is added to image data of images from any of the multiple viewpoints in the stereoscopic image,
a type in which an identical display time is added to image data of images from all the multiple viewpoints in the stereoscopic image,
a type in which a display time is added to image data of an image of one of the multiple viewpoints in the stereoscopic image, and
a type in which different display times are added to image data of the images from the multiple viewpoints in the stereoscopic image.

14. The image processing apparatus according to claim 12, further comprising:
image capture information generating processing circuitry configured to generate the image capture type and the image capturing order information in accordance with input timings at which the image data is input for the respective viewpoints from an image capture apparatus that captures the multi-viewpoint images at different timings; and
display time generating processing circuitry configured to generate the display times in accordance with the input timings.

15. The image processing apparatus according to claim 12, further comprising:
image capturing order information generating processing circuitry configured to generate the image capturing order information in accordance with image capture times at which the images of the respective viewpoints have been captured, the image capture times being input from an image capture apparatus that captures the multi-viewpoint images at different timings; and
display time generating processing circuitry configured to generate the display times in accordance with the image capture times.

16. An image processing method for an image processing apparatus, comprising the steps of:
encoding image data of multi-viewpoint images including images from a first viewpoint and images from a second viewpoint that form a stereoscopic image to generate an encoded stream; and
transmitting the encoded stream generated in the step of encoding in such a manner that an image capture type and image capturing order information are concatenated with the encoded stream, the image capture type indicating that the images from the first viewpoint have been captured at different timings than the images from the second viewpoint, the image capturing order information indicating an image capturing order in which the multi-viewpoint images have been captured.

17. An image processing apparatus comprising:
receiving processing circuitry configured to receive image data of multi-viewpoint images including images from a first viewpoint and images from a second viewpoint that form a stereoscopic image, an image capture type indicating that the images from the first viewpoint have been captured at different timings than the images from the second viewpoint, and image capturing order information indicating that an image capturing order in which the multi-viewpoint images have been captured; and
control processing circuitry configured to control a display apparatus to display the multi-viewpoint images corresponding to the image data received by the receiving processing circuitry in the same order as the image capturing order in accordance with the image capture type and image capturing order information received by the receiving processing circuitry.

18. An image processing method for an image processing apparatus, comprising the steps of:
receiving image data of multi-viewpoint images including images from a first viewpoint and images from a second viewpoint that form a stereoscopic image, an image capture type indicating that the images from the first viewpoint have been captured at different timings than the images from the second viewpoint, and image capturing order information indicating that an image capturing order in which the multi-viewpoint images have been captured; and controlling a display apparatus to display the multi-viewpoint images corresponding to the image data received in the step of receiving in the same order as the image capturing order in accordance with the image capture type and image capturing order information received in the step of receiving.

19. An image processing apparatus comprising:

receiving means for receiving an encoded stream, an image capture type, and image capturing order information, the encoded stream being produced by encoding image data of multi-viewpoint images including images from a first viewpoint and images from a second viewpoint that form a stereoscopic image, the image capture type indicating that the images from the first viewpoint have been captured at different timings than the images from the second viewpoint, the image capturing order information indicating an image capturing order in which the multi-viewpoint images have been captured;

decoding means for decoding the encoded stream received by the receiving means to generate image data; and control means for controlling a display apparatus to display the multi-viewpoint images corresponding to the image data generated by the decoding means in the same order as the image capturing order in accordance with the image capture type and image capturing order information received by the receiving means.

20. An image processing apparatus comprising:

encoding means for encoding image data of multi-viewpoint images including images from a first viewpoint and images from a second viewpoint that form a stereoscopic image to generate an encoded stream; and transmitting means for transmitting the encoded stream generated by the encoding means in such a manner that an image capture type and image capturing order information are concatenated with the encoded stream, the image capture type indicating that the images from the first viewpoint have been captured at different timings than the images from the second viewpoint, the image capturing order information indicating an image capturing order in which the multi-viewpoint images have been captured.

21. An image processing apparatus comprising:

receiving means for receiving image data of multi-viewpoint images including images from a first viewpoint and images from a second viewpoint that form a stereoscopic image, an image capture type indicating that the images from the first viewpoint have been captured at different timings than the images from the second viewpoint, and image capturing order information indicating that an image capturing order in which the multi-viewpoint images have been captured; and control means for controlling a display apparatus to display the multi-viewpoint images corresponding to the image data received by the receiving means in the same order as the image capturing order in accordance with the image capture type and image capturing order information received by the receiving means.

* * * * *